(12) United States Patent
Raue et al.

(10) Patent No.: US 10,474,137 B2
(45) Date of Patent: Nov. 12, 2019

(54) CONFIGURING OR CONTROLLING A DEVICE VIA SERIALIZED EVENT DATA

(71) Applicant: Cedalo AG, Kirchzarten (DE)

(72) Inventors: Kristian Raue, Kirchzarten (DE); Michael Raue, Plittersdorf (DE)

(73) Assignee: CEDALO AG, Kirchzarten (DE)

( * ) Notice: Subject to any disclaimer, the term of this patent is extended or adjusted under 35 U.S.C. 154(b) by 77 days.

(21) Appl. No.: 15/821,271

(22) Filed: Nov. 22, 2017

(65) Prior Publication Data
US 2018/0101163 A1 Apr. 12, 2018

Related U.S. Application Data

(63) Continuation-in-part of application No. 15/598,789, filed on May 18, 2017.

(30) Foreign Application Priority Data

May 20, 2016 (DE) .................. 10 2016 006 342
Nov. 8, 2017 (EP) ..................... 17001830

(51) Int. Cl.
*G05B 19/418* (2006.01)
*G06F 11/07* (2006.01)
(Continued)

(52) U.S. Cl.
CPC ....... *G05B 19/4182* (2013.01); *G05B 19/056* (2013.01); *G06F 11/0709* (2013.01);
(Continued)

(58) Field of Classification Search
CPC .............. G05B 19/056; G05B 19/4182; G05B 2219/13004; G05B 2219/13136;
(Continued)

(56) References Cited

U.S. PATENT DOCUMENTS 6,204,763 B1 * 3/2001 Sone .................... A47G 29/141
221/2
6,246,998 B1 * 6/2001 Matsumori ............ G06Q 30/06
705/26.8

(Continued)

FOREIGN PATENT DOCUMENTS

GB 2354620 A 3/2001

OTHER PUBLICATIONS

European Search Report dated Oct. 9, 2017 in European Patent Application No. 17000841.1, 8 pages.

*Primary Examiner* — Chun Cao
(74) *Attorney, Agent, or Firm* — Shook, Hardy & Bacon L.L.P.

(57) ABSTRACT

A computer-implemented method for configuring or controlling a device is provided. In addition, a computer program product, and a device are provided. The method comprises detecting, by the device, an event, generating serialized event data in response to the event, receiving the event data from the device, identifying, via an expression, at least one element of the event data, wherein the element indicates a state of the device, performing at least one operation on the element of event data, wherein the operation includes determining the state of the device, displaying a result of the operation, determining whether an indication of an error in the result is received, and when a determination is made that there is no error and the result indicates that the state of the device is a specified state, performing, by the device, a task.

15 Claims, 66 Drawing Sheets

(51) Int. Cl.
*G05B 19/05* (2006.01)
*G06F 17/24* (2006.01)
*H04L 12/28* (2006.01)
*H04W 4/38* (2018.01)
*H04L 29/08* (2006.01)
*H04W 4/50* (2018.01)
*G06N 3/00* (2006.01)
*G06F 3/0482* (2013.01)
*G05B 19/042* (2006.01)

(52) U.S. Cl.
CPC ...... *G06F 11/0736* (2013.01); *G06F 11/0751* (2013.01); *G06F 17/245* (2013.01); *G06F 17/246* (2013.01); *H04L 12/2827* (2013.01); *H04L 67/12* (2013.01); *H04W 4/38* (2018.02); *H04W 4/50* (2018.02); *G05B 19/042* (2013.01); *G05B 2219/13004* (2013.01); *G05B 2219/13136* (2013.01); *G05B 2219/45063* (2013.01); *G06F 3/0482* (2013.01); *G06N 3/006* (2013.01)

(58) Field of Classification Search
CPC ....... G05B 2219/45063; G06F 11/0709; G06F 11/0736; G06F 11/0751; G06F 17/245; G06F 17/246; G06F 3/0482; G06Q 10/087; G06Q 10/0875; G06Q 20/202; G06Q 20/203; G06Q 30/0226; G06Q 30/06; G06Q 30/0635
See application file for complete search history.

(56) References Cited

U.S. PATENT DOCUMENTS

| | | | |
|---|---|---|---|
| 2007/0016429 A1* | 1/2007 | Bournas | G06F 8/20 700/91 |
| 2008/0052200 A1 | 2/2008 | Bodin et al. | |
| 2012/0278190 A1 | 11/2012 | Brown | |
| 2013/0077534 A1* | 3/2013 | Hu | H04L 41/5054 370/259 |
| 2014/0143567 A1 | 5/2014 | Anderson | |
| 2016/0057394 A1* | 2/2016 | Marutani | F25D 23/04 348/143 |
| 2017/0039511 A1* | 2/2017 | Corona | G06K 9/6267 |
| 2017/0293964 A1* | 10/2017 | Xie | F21S 8/033 |

\* cited by examiner

FIG. 1

Transactor Settings

Inject Data Object

6401 — Data Source: [▷] ☐ Show Data Samples

Replace Attribute:

Start Processing

6403 — Select Trigger: [▷]

Time Code:

☐ Eject Data Object when processed

Database Query

Collection: [Refresh Query] [▷]

JSON Filter:

Processing Options ~6405

☐ Enable Loop:
○ Trigger Single Recalculation
○ Repeat Recalculation for each Loop Element
○ Repeat Recalculation until STOP()

[OK] [Abbrechen]

FIG. 64

| 6501 | Metadata | {"ID":"ID232323","Label":"Order 12312","Topic".... |
|---|---|---|
| | ID | "ID232323" |
| | Label | "Order 12312" |
| | Topic | "cedalo/test" |
| | Arrival time | "2017-09-29T16:11:42.678Z" |
| | Provider | "AWS IoT (MQTT)" |
| | Adapter | "AWS Central Europe" |
| | Feeder | "AWS Device 1" |
| | Sample payload | false |
| 6503 | Data | {"CustomerName":{"FirstName":"Chris",.... |
| | CustomerName | {"FirstName":"Chris", "LastName":"Maier"} |
| | CustomerName | 123454 |
| | Positions | [{"PosNo":1,"ArticleNo":"A343434","Preis":23},.... |

FIG. 65

CONFIGURING OR CONTROLLING A DEVICE VIA SERIALIZED EVENT DATA

CROSS-REFERENCE TO RELATED APPLICATIONS

This Non-Provisional patent Application is a Continuation-in-Part of co-pending U.S. patent application Ser. No. 15/598,789, filed May 18, 2017, and titled "Controlling a Device Using Tabular Data," which claims priority to German Patent Application No. 102016006342.4, foreign filed on May 20, 2016, and titled "Controlling a Device Using Tabular Data." The contents of these referenced applications are incorporated herein by reference in their entirety.

TECHNICAL FIELD

The technical field of the present application is configuring or controlling a device.

SUMMARY

In particular, the application relates to enabling devices to communicate via serialized event data as well as configuring and controlling devices via serialized event data. Each device may communicate with other devices via messages sent over a network. Aspects of the application relate to a computer implemented method for configuring or controlling a device, a computer program product that performs operations according to the method, and a manufacturing system.

The continuously expanding Internet input structure and the trend toward increasingly smaller microprocessors, increasing numbers of sensors and expanding network connectivity enables the connection of almost all physical objects (e.g., computers, electronic devices, vehicles, and other items) via the Internet to collect and exchange data. The resulting system is sometimes referred to as the Internet of Things. It has been predicted that up to 50 billion physical objects will be connected via the Internet of Things by 2020.

Since each device connected to the Internet of Things may be produced by a different vendor, and each vendor may implement different communication protocols, different data formats, and different APIs, it will be a challenge to enable devices in the Internet of Things to communicate such that any one of the devices can interact with any other of the devices. In particular, because different vendors may produce devices that have different requirements when it comes to sending and receiving data, it may be a challenge to enable arbitrary interactions between one of the devices and any other of the devices. However, even more challenging than standardizing protocols, data formats, and APIs to enable communication between devices, is the amount of programming work needed to instruct the devices to carry out tasks and interactions.

In practice, it is unlikely that every device in the Internet of Things will interact with every other device in the Internet of Things; this would lead to an immensely high number of combinations. However, even with a far lower number of realistic combinations, the number of potential interactions between devices in the Internet of Things will be extremely high, and so will be the amount of programming work needed to be done in order to control the interactions between the devices.

Since there is already a shortage of qualified programmers, it is a problem to simplify programming of devices (e.g., in the Internet of Things). In particular, it would be desirable if programming of devices (e.g., in the Internet of Things) could be done by non-programmers. Aspects of the present application may enable people familiar with building spreadsheets to program devices in the Internet of Things. In particular, it is possible that there are more people who are able to build spreadsheets than write procedural code (for example in Java, JavaScript, PHP or C++). Accordingly, aspects of the present application enable devices to be instructed and controlled using spreadsheet functionality, i.e. without having to write lines of procedural code. In particular, it may be desirable to program or control or instruct devices without writing a single line of procedural code.

An advantage of operating on human-readable serialized data (e.g. building/configuring a spreadsheet) is that a user can immediately and visually control and test what is being built as it is being built. In particular, it may be possible to see an application execute and watch results of execution even though the application is not fully functional. In contrast, when a programmer works on procedural code for an application or program, the programmer must first write the code completely and ensure that the code is syntactically and semantically correct before running the code to see possible errors. Before the application/program is completely written and functional, the programmer may have to debug the code in his mind or imagine code execution in order to perceive how the code may be executed and what results may be generated.

Further, when writing procedural code, data structures and process logic might not be materially visible in a program development environment. In other words, when writing procedural code the programmer may have to finish writing the entire program and compile the program successfully before being able to see any results of execution of the program. In contrast, when operating on human-readable serialized data (e.g. building/configuring the spreadsheet), the user may be able to see the results of performing operations even though some of the operations are unsuccessful or incomplete (e.g. there are errors in the operations).

Aspects of the application describe how to visualize the performance of operations on serialized data and give the user immediate visual feedback regarding the operations. The visualization is provided in spite of errors, unsuccessful operations, or incomplete operations. Accordingly, communication between different devices and control of a particular device can be more easily achieved. In particular, a non-programmer or a user with minimal training can control a device or control the interaction of the device with other devices. Aspects of the application may make it easier to program devices in the Internet of Things and greatly increase the number of people that can carry out programming tasks.

In the context of the Internet of Things, the "thing" may be understood as a physical device embedded with electronics, software, and network connectivity. The device may also include one or more sensors. The network connectivity may enable the device to exchange data (e.g., messages) with other devices. Examples of devices are manufacturing equipment (e.g., conveyers, handlers, lifts, pushers), heart monitoring implants, biochip transponders, electric clamps, automobiles, DNA analysis devices, field operation devices to assist fire fighters, and household or office appliances.

Operating on serialized human-readable data provides the advantage of simplicity. In particular, serialized human-readable data may be more easily understood and manipulated than other data formats, e.g., procedural code. This is particularly the case when the serialized data is operated on in an array (e.g., an operations array) such as a spreadsheet.

According to an aspect, a computer-implemented method for configuring or controlling a device is provided. The method comprises detecting, by the device, an event. The method further comprises generating serialized event data in response to the event. In addition, the method comprises receiving the event data from the device. The method further comprises identifying, via an expression, at least one element of the event data, wherein the element indicates a state of the device. The element may indicate a change in the state of the device. The method further comprises performing at least one operation on the element of event data, wherein the operation includes determining the state of the device. The method further comprises displaying a result of the operation. The method further comprises determining whether an indication of an error in the result is received. When a determination is made that there is no error and the result indicates that the state of the device is a specified state, the method further comprises performing, by the device, a task.

In some cases, the method further comprises supplementing the event data with metadata. Determining whether an indication of an error in the result is received may further comprise determining whether the metadata indicates an error.

Accordingly, the metadata may include one or more of the following: an identifier of the event data, an identifier of a source device of the event data, an identifier of a source operator of the source device, an identifier of an adapter for processing the event data, wherein the adapter converts the event data to a format that can be processed by a target device. The target device may host the adapter.

The metadata may include an identifier of a messaging protocol of a provider. The messaging protocol may be one of the following: Message Queue Telemetry Transport (MQTT), Representational State Transfer (REST), Advanced Message Queuing Protocol (AMQP), Object Linking and Embedding for Processing Control Unified Architecture (OPC UA) protocol.

The metadata may include an arrival time of the event data, and/or a label that describes the event data.

The method may further comprise, for each device, receiving a selection of a field (i.e., a selected field) within the event data that describes the event data. Supplementing the event data with metadata may comprise copying the selected field to the label field of the metadata.

Supplementing the event data with metadata may comprise searching the event data for an identifier of the event data. When the identifier of the event data is found in the event data, the supplementing may comprise mapping a field of the identifier in the event data to the identifier of the event data in the metadata. When no identifier is found in the event data, the supplementing may comprise generating an identifier as the identifier of the event data in the metadata. The generated identifier may be a unique identifier.

Determining whether the metadata indicates an error may comprise comparing an identifier in the metadata with an identifier of a previously received element of event data, and/or determining whether at least one messaging protocol used by the device has been used to send any event data received from the device during a specified period. The specified period may be a specified number of minutes (e.g., at least 30 minutes) hours (e.g., 1-24 hours, at least 12 hours or at least 24 hours, etc.) or a specified number of days (e.g., 2-4 days).

The event may be a change of the environment of the device. In particular, a change in an external temperature of the device, a change in the surroundings of the device, or a change in a location of the device. The event may be detection of a type of item on the device.

The event may be a change of an operational state of the device. The operational state may indicate whether the device is fully functional or the operational state may indicate an extent of partial functionality.

The event may be an indication of the passing of a period of time, or a change in the contents of the device (e.g., an item added to or an item removed from the device).

The event may be a change of energy use of the device. The change of energy use may be characterized by increased energy use, use of a specified amount of energy independently of the passage of time or use of a specified amount of energy within a specified period of time (e.g., at least 12 hours, at least 24 hours, etc.).

The event may be a request received from a virtual assistant. The virtual assistant (sometimes called a "chatbot") may be a software agent using artificial intelligence that can perform tasks or services for an individual. The virtual assistant may be Ski, Google Assistant, or Amazon Alexa.

The event data may be an array or an object. The object may be an associative array. The element of the event data may be at least one (name,value) pair of the object, or at least one value in the array.

The operation may be specified within an array. The array may be configured for analysis and storage of data in tabular form. Cells of the array may include text, numeric data, or the results of formulas. In particular, the array may be an operations array, i.e., a spreadsheet. An operation for at least one other device may be specified within the array.

The device may be one of a group of devices cooperatively engaged in a process or undertaking, such as a manufacturing process. The devices in the group of devices perform different sets of actions to further the manufacturing process.

The task may comprise a plurality of tasks. Each of the tasks in the plurality of tasks may be the same (e.g., each of the tasks is a milling task). The tasks may be manufacturing tasks. Performing the task comprises sending a message to one of a plurality of nodes according to a distribution mechanism. Each of the nodes may be a device or an array associated with a device. Each array may be associated with a different device.

The distribution mechanism may be load balancing or quality-based distribution. The quality based distribution may comprise determining a quality of an output of each device and sending the message according to the quality. A higher quality may be preferred to a lower quality.

For example, a plurality of computer numerical control (CNC) machines may each be engaged in the same task, i.e., a milling task. After each machine performs a single milling task, the quality of the output is assessed and a corresponding message is generated. Distribution of further tasks is performed according to historical quality, such that more tasks are distributed to CNC machines that performed earlier tasks at a higher quality in comparison to the quality of tasks performed by other CNC machines. Sending messages to the arrays of the CNC machines may enable some filtering to be performed, e.g., to ensure that a CNC machine is not given too many tasks within a specified period (e.g., at least 1 minute).

The task may include changing a configuration of the device affecting future operation of the device. In particular, the task may include changing a power setting of the device (e.g., activating a low power mode). The task may include furthering a manufacturing process. Further the manufacturing process may include placing an item on one of multiple conveyers and/or sending a message to another device that causes the other device to place the item on the conveyer. The conveyor device may convey the item to another device (e.g., a mill) to perform further tasks. The task may include sending a message to another device. The message may be sent via a network. Instructions may be included in the message. Sending the message may comprise ordering an item.

The specified state may be one or more of the following: an occurrence of a specified time, a condition of the contents of the device, a condition of the environment of the device, or use of a specified amount of energy by the device.

For example, the specified state may be when the specified time arrives (e.g., 3:00 on Wednesday) and the following condition of the contents of the device (e.g., a refrigerator) arises: there are less 2 cartons of milk in the device.

As another example, the specified state may be when the following condition of the environment of the device is met: an item is placed on the device. In this case, the device may be a conveyor.

The event data may be in a human-readable data serialization format. The event data may be encoded according to a character encoding standard, such as ASCII text, or Unicode text. The event data may be in a hierarchical format.

In some cases, the format of the event data may be XML or JSON. When the format of the event data is JSON, the element of the event data may be a (name,value) pair of a JSON object.

Alternatively, the event data may be in a binary serialization format, e.g., Binary JSON (BSON). In this case, the event data may be converted to a human readable format for display.

The expression may specify a name of the element of the event data. For example, the event data may be represented as an associative array or JSON object, the name may be associated with a value and the combination of the name and the value may be the element. Alternatively, the expression may specify a path, e.g., via XPath or JPath.

The operation may be mathematical (e.g., arithmetic), relational, or logical. The operation may include adding the element of event data to an object or an array.

In some cases, the determining of whether an indication of an error in the result is received comprises receiving user input after displaying the result.

When the indication of the error in the result is received, the method may further comprise receiving, via user input, a modification of the operation. The method may further comprise performing the modified operation on the element of the event data. The method may further comprise displaying a result of the modified operation. The method may further comprise determining whether the result of the modified operation indicates an error. When no error is indicated and the result indicates that the state of the device is the specified state, the method may further comprise performing the task.

According to another aspect, a computer program product is provided. The computer program product may comprise computer-readable instructions, which, when loaded and executed on a computer system, cause the computer system to perform operations according to the method discussed above.

According to yet another aspect, a device is provided. The device comprises a sensor. The sensor is operable to detect an event. The device further comprises a computing unit. The computing unit is operable to generate serialized event data in response to the event. The computing unit is further operable to identify, via an expression, at least one element of the event data, wherein the element indicates a state of the device. The computing unit is further operable to perform at least one operation on the element of event data, wherein the operation includes determining the state of the device. The computing unit is further operable to determine whether an indication of an error in the result is received. When a determination is made that there is no error and the result indicates that the state of the device is a specified state, the computing unit is operable to perform a task. The device further comprises a display to display a result of the operation. The display may be provided on a computer separate from the device.

According to a further aspect, a manufacturing system is provided. The manufacturing system comprises a control system, a programmable logic controller, a gateway for translating messages from the control system to the programmable logic controller, at least one conveyor, and at least one industrial robot. The control system may be configured to send a message to the programmable logic control system via the gateway. The robot is configured to: place an item on the conveyor, possibly in response to the message. The conveyor is configured to detect placement of the item as an event, and generate serialized event data in response to the event. The control system is configured to receive the event data from the conveyor, and identify, via an expression, at least one element of the event data. The element indicates a change in the state of the conveyor. The change of state may be detection of the item on the conveyor, e.g., via a sensor.

The control system is further configured to perform at least one operation on the element of event data. The operation includes determining the change in the state of the conveyor. The control system is further configured to display a result of the operation, and determine whether an indication of an error in the result is received. When a determination is made that there is no error and the result indicates that the state of the conveyor is a specified state, the control system is configured to perform a task.

For example, the task may include sending a message to the conveyor to specify which direction the item should be conveyed. The conveyor may be capable of conveying the item to one of three different destinations.

In some cases, the serialized event data may be tabular data. Thus, each row of the tabular data may be generated (or produced) in response to an event.

Accordingly, aspects of the application relate to a device controllable via tabular data. The device comprises a timer for generating events to indicate the passage of periods of time. The device further comprises a sensor for generating events upon detection of specified (i.e., pre-determined or pre-determinable) changes in the device or in an environment of the device. The device also comprises a computing unit. The computing unit comprises a memory for storing an input array, an operations array, and an output array, wherein each array includes at least one cell. The computing unit further comprises a receiver configured to receive the operations array, the operations array including a first reference to a cell of the input array. The receiver is also configured to receive tabular data from an input source. The device also comprises a processor configured to perform operations on multiple rows of the tabular data, wherein at least one of the rows of the tabular data was produced in response to an event detected by the sensor or the timer.

The operations comprise inserting one of the rows of the tabular data into the input array, and determining a value of a second cell of the operations array based on the referenced cell of the input array. The operations also comprise storing one of the following in a cell of the output array: the determined value, i.e. of the second cell, of the operations array, or a value of the referenced cell of the input array. The processor may be further configured to copy the output array to an output destination.

The device may be a household or office appliance, such as a refrigerator. The pre-determined time may be a time when the device is not generally in use, e.g., 3:00 am. A pre-determined (i.e., specified in advance) change in the device might be movement of a part of the device or removal of a part of the device.

A pre-determined change in the environment of the device might be bringing another object into contact with the device, placing another object (e.g., an RFID-tagged food item) inside the device or removing an object from the device. For example, when an RFID tagged yogurt container is removed from the device, this may be detected by the sensor as an event, and a row of tabular data may be produced in response to the event.

According to a further aspect, a computer-implemented method for interactively performing operations on tabular data is provided. The operations may comprise instructions to process events detected by a device and/or instructions to formulate instructions for another device. Further, the operations may involve processing event data generated by a first device (e.g., a refrigerator) in order to formulate instructions for a second device (e.g., a grocery distribution processor).

Each device may be connected to other devices. For example, each operation may be an instruction to the device. The device may be a household appliance, such as a vacuum cleaner. A first instruction may cause the vacuum cleaner to move itself to a specific location at a specific time. A second instruction may cause the vacuum cleaner to start vacuuming at a specific time. A third instruction may cause the vacuum cleaner to stop vacuuming at a specific time.

The method comprises providing an input array, an operations array, and an output array. Each array includes at least one cell. The names of the arrays are intended to facilitate identification and distinction. The arrays may also be referred to as a first array, a second array, and a third array.

The input array and/or the output array may be separate from the operations array. Alternatively, the input array and/or the output array may be part of the operations array.

The method may further comprise receiving input in the operations array. The input may comprise a first input in a first cell of the operations array. The first input may be a first reference to a cell of the input array. The input may be provided by a user via a keyboard. The first reference to the cell of the input array may include a row and column of the input array. The first reference may also include a name of the input array.

The method further comprises receiving tabular data from an input source. In addition, the method comprises performing operations on multiple rows of the tabular data.

The operations may be performed according to the received input in the operations array. In other words, the received input, e.g., the first input, specifies how to process multiple rows of the tabular data. For example, the first input may comprise the first reference. Accordingly, the first input may specify a source and destination to copy a column of the tabular data.

The operations comprise inserting one of the rows of the tabular data into the input array. In some cases, the input array may be arbitrarily expanded to accommodate a row of the tabular data. In other cases, the input array may have a pre-determined size, and the size of the row of tabular data may be less than the size of the input array. In particular, the input array may have a certain number of columns and the row of tabular data may have fewer columns than the input array.

The method further comprises determining a value of a second cell of the operations array based on the referenced cell of the input array. In some cases, the operations array has at least two cells, and the second cell is different from the first cell. Each element of the following may be a cell: the operations array, the input array, and the output array.

The method further comprises storing one of the following in a cell of the output array: the determined value (i.e., of the second cell) of the operations array, or a value of the referenced cell of the input array. The storing step may comprise copying the value of the second cell of the operations array to the cell of the output array.

The input array, the operations array, and the output array may be stored in separate memory areas. Further, it is possible that the input array, the output array, and the operations array do not overlap.

The method may further comprise displaying the output array. Displaying the output array may be carried out by causing a display device, e.g., a computer monitor, to display the output array to a user. The method further comprises copying the output array to an output destination.

The method or the device may comprise one or more of the following, in various combinations. The output array may reflect information or status of the device. Copying the output array to the output destination may include providing or distributing information about a state of the device. The input source or data source may be a device, a machine (e.g., a process on a device), a file, a data stream, a queue, a file on the device, or a data stream received from the device. The input source may also be a transactor. The data stream may be understood as a sequence of data packets made available over time. The file may be stored in memory, e.g., flash memory or a hard disk.

The method may further comprise (or the device may be coupled to a display configured for) displaying the input array before determining the value of the second cell. In some cases, the input array is initially displayed as a blank series of cells. Accordingly, upon insertion of one of the rows of the tabular data into the input array, the values of the fields in the row may be displayed in the cells of the input array. Upon insertion of a new row of tabular data into the input array, the values of the fields of the new row of tabular data may be displayed in the cells of the input array.

In some cases, the determined value of the second cell of the operations array is a value of the referenced cell of the input array. In other words, determining the value of the second cell of the operations array based on the referenced cell of the input array involves copying the value of the referenced cell of the input array to the second cell of the operations array. Alternatively, the determined value of the second cell of the operations array may be a derived value based on the value of the referenced cell of the input array. In this case, the derived value differs from the value of the referenced cell of the input array.

A re-calculation of the operations array may be performed after the inserting of one of the rows of the tabular data into the input array. The re-calculation may comprise the determination of the value of the second cell of the operations array based on the referenced cell of the input array. The re-calculation may further comprise the storage of the determined value in the cell of the output array. The re-calculation may further comprise the display of the output array. Also, the re-calculation may comprise the copying of the output array to an output list.

The first input may be a formula referring to the referenced cell of the input array. In other words, receiving the first reference in the operations array may comprise receiving a formula that includes the first reference. In particular, the first reference may specify a row and column of the input array. For example, the first reference may consist of one or two case insensitive letters to identify a column of the input array followed by a row number. The first reference may also include an identifier of the input array.

The value of the second cell of the operations array may be determined by copying the value of the referenced cell (i.e., the cell of the input array referred to by the first reference) to the first cell of the operations array. The second cell in the operations array may include another formula specifying a calculation that refers to the first cell of the operations array. The determined value of the second cell of the operations array may be the result of applying the calculation specified by the other formula to the copied value. The calculation may include at least one of the following: an arithmetic operation, a relational operation, and a function. For example, applying the calculation to the copied value may involve multiplying the copied value by two. The determined value of the second cell of the operations array would then be the value of the referenced cell of the input array multiplied by two.

The method may further comprise at least one of the following. Displaying the content of each cell in the operations array before performing the operations. Displaying the content of each cell in the operations array may include displaying each formula in the operations array. Accordingly, for each cell containing a formula, the formula itself is displayed rather than the result of applying the formula. Displaying the value of each cell in the operations array after determining the value of the second cell in the operations array. Displaying the values may comprise evaluating each formula in the operations array and displaying the results of the evaluations. Accordingly, rather than the formulas themselves, the results of applying formulas are displayed. For example, if the operations array included a reference (i.e., a formula including the reference) to cell B1 of the input array, rather than the reference to cell B1 in the input array the operations array would display the value of cell B1 in the input array. In some cases, the input array and the output array each have the same number of cells. The input array may consist of a single row and multiple columns. The output array may consist of a single row and multiple columns. In some cases, the input array and the output array may be different sizes. In particular, the output array may have twice the number of columns as the input array.

In addition to determining the value of the second cell of the operations array, further operations may be performed on the tabular data in the input array. The results of these operations may be stored in further cells of the output array before the output array is displayed.

The output array may then be copied to the output destination. Alternatively, the output array may be copied to an output list, which may be copied to an output destination when it is full or after operations on the tabular data are complete.

The input (e.g., the first reference) received in the operations array may further comprise a second input in a third cell of the operations array. For example, the receiving step may comprise receiving a second reference in the third cell of the operations array. The second input (e.g., second reference) may specify the cell of the output array in which to store the determined value. For example, the second input (e.g., second reference) may specify one or more cells of the operations array. In addition, the second input (e.g., second reference) may identify the output array. Also, the second input (e.g., second reference) may specify one or more cells of the output array. Moreover, the second input may specify whether to add a row to an output list before writing the output array to the output list (i.e., writing the output array to the newly added row of the output list).

The cell of the output array may be in the same position with respect to other cells of the output array in comparison to the position of the referenced cell of the input array with respect to other cells of the input array. For example, the referenced cell may be in row 1 and column B of the input array. Accordingly, the cell of the output array is in row 1 and column B of the output array. Alternatively, the cell of the output array may be in a different position with respect to other cells of the output array in comparison to a position of the referenced cell of the input array with respect to other cells of the input array. For example, the cell of the output array in which the determined value is stored may be in row 1 and column C of the output array. In contrast, the referenced cell of the input array may be in row 1 and column B of the input array.

The tabular data may consist of rows of delimited values. In particular, the tabular data may be in comma separated value (CSV) format. For example, the tabular data may be formatted according to request for comments (RFC) 4180. Alternatively, the tabular data may be in markup language format. In particular, the tabular data may be in extensible markup language (XML) format.

The insertion of one of the rows of tabular data into the input array may trigger the determination of the value of the second cell of the operations array. Further, the insertion of one of the rows of tabular data into the input array may trigger evaluation of each cell in the operations array. In other words, the insertion of one of the rows of tabular data into the input array may trigger re-calculation of the operations array. The multiple rows of tabular data may consist of all the rows of tabular data in the input source. For example, if the input source is a data stream, tabular data may be received from the data stream until there is no more data in the data stream. Accordingly, operations may be performed on each row of tabular data in the data stream.

Performing the operations on the input array may comprise triggering re-calculation of a further operations array from the operations array. The re-calculation of the further operations array may comprise performing operations on a single row of tabular data received from a further input source in a further input array. Alternatively, the re-calculation of the further operations array may comprise performing operations on multiple rows of tabular data received from the further input source in the further input array. In both cases, the operations may be performed according to input received in the further operations array.

The multiple rows of tabular data received from the further input source may include all tabular data of the further input source. In particular, the operations performed on the tabular data received from the further input source may correspond to or may be identical to the operations performed on the multiple rows of tabular data received from the input source. The further operations array may include a reference to a cell of the operations array. The referenced cell may contain a value. The value may be copied to the further operations array during the re-calculation.

One or more of the following may apply: each array may include multiple cells, each array may include a row and a column, the operations array may include multiple rows and/or multiple columns, each of the cells of the input array, the operations array, and the output array may be addressable by any cell of the operations array, or each of the cells of the operations array may be a placeholder for a value or a formula.

Inserting one of the rows of tabular data into the input array may further comprise determining whether an existing row of the tabular data is in the input array. When the existing row of the tabular data is in the input array, removing the existing row of tabular data from the input array before inserting the row of tabular data into the input array. Alternatively, inserting one of the rows of tabular data into the input array may further comprise determining if a pre-determined number of rows of tabular data are in the input array. When the pre-determined number of rows of tabular data are in the input array, removing one of the rows already in the input array before inserting the (new) row of tabular data into the input array.

The predetermined number of rows may be less than the number of rows in the operations array.

The operations array may comprise a function for storing a determined value to a cell of the output array. The function may cause a row of values to be stored in the output array. The function may cause a row to be added to an output list before the output array is copied to the output list. The function may fill the output array with values from the operations array.

As an alternative to the output array, an output object may be used. The operation array may comprise a function for storing and creating an attribute in the output object and/or storing a value in the output object. The output object may be copied to the output destination.

The output destination may be a file, a data stream, a device, or a machine (e.g., a process on the device). In other words, possible output destinations may correspond to possible input sources, i.e., the same entities may serve as input sources or output destinations. The output destination may be the same as the input source. In particular, the input source may be a process on a device and the output destination may be a different process on the device. Further, when the output destination is the same as the input source, copying the output array to the output destination may cause a row of the input source to be overwritten.

Alternatively, copying the output array to the output destination may cause a row of data to be added to the input source (or a file at the input source). Which alternative is carried out may depend on the function used for storing the determined value to the cell of the output array. When the output destination is a data stream and the output destination is the same as the input source, the method may include streaming data back to the source of the input data stream. When the input source and the output destination are the same file, the file may be opened for reading and writing.

In some cases, the input source is a device (e.g., the device controllable via tabular data or a device communicatively connected to the controllable device). Accordingly, the method may further comprise detecting, by the device (or a component of the device), events. A row of the tabular data inserted into the input array may have been produced in response to the event. Each row of the tabular data may have been produced in response to events detected by the device.

One or more of the events may be detected in view of a change in a state of the device, e.g., a change in the environment of the device or because the device detects that a specified point in time has been reached (e.g., it is now 3:00 a.m.). The change in the state of the device may be one of the following: a door of the device being opened, the door of the device being closed, an item being removed from the device, an item being added to the device, or an item being placed in the device.

The change in the device or the environment of the device may have been brought about by an action of a user.

Changes in the state of the device may be detected in other ways. For example, a smart shelf may detect that a product has been removed and may generate a row of tabular data specifying the product and a quantity of the product to be ordered. Another change in the state of the device may also be caused by the change in the device or the environment of the device.

According to another aspect, a computer program product comprising computer-readable instructions is provided. The instructions, when noted and executed on a computer system, cause the computer system to perform operations according to one or more of the method steps discussed above. The computer program product may be tangibly embodied in a computer-readable medium.

According to yet another aspect, a computer system for interactively performing operations on tabular data is provided. The system comprises a memory for storing an input array, an operations array, and an output array. Each array includes at least one cell.

The system may further comprise an input receiving device for receiving input in the operations array. The input may comprise a first input in a first cell of the operations array. The first input may reference a cell of the input array. For example, the input may include a first reference to a cell of the input array.

The input receiving device may be a keyboard or a touchscreen or another device suitable for providing alphanumeric characters to a computer. The system further comprises a processor configured to carry out the following: receiving tabular data from an input source, and performing operations on multiple rows of the tabular data.

The operations may be performed according to the received input in the operations array.

The operations comprise: inserting one of the rows of the tabular data into the input array, determining a value of a second cell of the operations array based on the referenced cell of the input array, storing the determined value in a cell of an output array, and causing a display device to display the output array. The processor may be further configured to copy the output array to an output destination.

Further aspects are as follows. A software-implemented software object (e.g., a computer program product) called an input transactor may be provided. The software object can process list style data grids (i.e., tabular data). The software object may comprise an input list (i.e. tabular data received from an input source). The input list may be a row and column based data grid of cells with cells which each contain numerical or string data. The software object may further comprise a spreadsheet (i.e., an operations array). The spreadsheet may be a multi-row and multi-column based data grid with internally and externally referable cells. A row-by-row and left to right calculation order may be used to evaluate internal and external cell references, mathematical formulas, functions, and values in each of the cells of the spreadsheet.

The software object may further comprise an input reader (i.e., an input array). The input reader may be a single-row and multi-column based data grid of cells capable of reading the input list row-by-row while holding the values of the currently processed row in its cells. The cells of the input reader are referable cells that can be referenced by other objects inside and outside of the input transactor.

The software object may further comprise an output writer (i.e., output array). The output array may be a single-row and multi-column based data grid of cells initially reading the same data row as the input reader. The output writer may be capable of copying its current cell values back to the same location of the input source that is currently being read by the input reader when triggered to do so by the re-calculation of the spreadsheet.

The software object may further comprise a copy function. The copy function may be a spreadsheet function or a likewise implemented functionality that copies values from specified cells of the spreadsheet to the cells of the output writer.

The input reader may be configured to read the input list row-by-row and trigger, after each row advance, a re-calculation cycle of the spreadsheet. The re-calculation of the spreadsheet may include execution of the copy function to copy values from the spreadsheet to the output writer. The input reader may also trigger, for each row advance, a write action in the output writer, which copies the current cell values of the output writer to the same row in the input list which has just been read by the input reader.

According to a second further aspect, a software implemented software object called an output transactor that can generate a list style data grid (i.e., tabular data) may be provided. The output transactor may comprise an output list. The output list may be a row and column based data grid of cells with cells which each contain numerical or string data. The output transactor may also comprise the spreadsheet, the input reader, and the output writer.

The output transactor may further comprise an add function. The add function may be a spreadsheet function or a likewise implemented functionality that creates an empty output list (i.e., a placeholder for tabular data) in case the output list does not exist in the output transactor. In addition, the add function may add a new row to the newly or previously created output list, advance the output list in the output writer to the new row, and then copy the values from specified cells of the spreadsheet to the data cells of the output writer.

The software object may further comprise an eject function. The eject function may be a spreadsheet function or a likewise implemented functionality that ejects an output list from the output transactor when one or more specified value conditions are met in the spreadsheet.

When externally called to do so, the output transactor may trigger a re-calculation cycle of the spreadsheet. The re-calculation cycle may include the execution of the add function to copy values from the spreadsheet to the output writer. The re-calculation cycle may also include an execution of a write action in the output writer. The write action may copy the current cell values of the output writer to the current new row in the output list of the output writer. The write action may gradually result in an output list that is growing row-by-row until the eject function is executed in the spreadsheet.

According to a third further aspect, a software-implemented software object called a replication transactor is provided. The replication transactor may be configured to generate list style data grids by processing and transforming data from existing data grids. The replication transactor may comprise the input transactor, the output transactor, and an execute function.

The execute function is a spreadsheet function or likewise implemented functionality that enables the input transactor to trigger one re-calculation cycle of the spreadsheet of the attached output transactor. The re-calculation cycle results in the generation of one new row in the output list, as described above.

The input reader may read the input list row-by-row and, after each row advance, trigger one re-calculation cycle of the spreadsheet inside the input transactor. The re-calculation cycle may include execution of the execute function to trigger re-calculation of the spreadsheet inside the output transactor as described above. Re-calculation of the spreadsheet inside the output transactor may result in a row-by-row production and final ejection of the output list with values resulting from the processing of the formulas of the spreadsheets of the input and/or output transactors.

Aspects of the present application may lead to one or more of the following advantages. For example, it may be possible to determine whether a task will be performed correctly before the task is performed. This is accomplished by performing an operation on event data and displaying the result of the operation performed on the event data before the task is performed. If the result indicates that the task will not be performed correctly, an indication of an error can be given, e.g., via user input.

Further, it may be possible to evaluate results of processing event data generated in response to a first event before evaluating results of processing event data generated in response to a second event, and before processing event data generated in response to a third event. In particular, it may be possible to see results of processing intermediate event data in order to determine whether a desired result will be achieved, e.g., after a series of events has occurred and corresponding event data for those events has been generated. Accordingly, a user can determine if each intermediate result fits in with the desired overall result.

In the context of operations performed on human-readable data in an operations array, by referencing a cell of the input array including tabular data and determining a value of a cell of the operations array based on the reference cell, cell values in the operations array can be determined or modified more easily, particularly in comparison to the determination or modification of values via procedural code.

Accordingly, less user training is required and fewer programming resources are required. The reduction in training and programming resources is particularly apparent when formulas are specified in the operations array. Moreover, the use of spatial relationships (e.g., relative position, absolute position, named locations, etc.) that is possible via cell referencing may make it easier for a user to write useful programs, e.g., to control a device, particularly when the device is networked to other devices.

Also, once operations have been interactively performed on the event data and the user can see that the desired result will be achieved, operations performed on the event data received from an input source can be carried out without displaying the result and without any further user interaction. The elimination of user interaction and/or display of data may be advantageous for performance reasons.

Technical Definitions

The following definitions are provided in order to aid in the understanding of terms used in the present application. The terms should also be understood in the light of common general knowledge.

A machine may be a processing device, e.g., a household appliance. In other words, a machine may be a standalone device that may be communicably connected to other devices. Alternatively, the machine may be implemented as a process on the device.

Event data may be generated by the device in response to an event. The event data may indicate a state of the device, for example, the state of a clock of the device.

Serialized data is data in a serialization format. Serializing (i.e., serialization or marshalling) may involve translating data into a format that can be stored (for example, in a file or memory buffer) or transmitted (for example, across a network) and re-constructed later (possibly in a different computer environment). When the resulting series of bits is re-read according to the serialization format, it can be used to create a semantically identical clone of the original data. The serialization format may be human-readable or binary. Examples of serialization formats are JavaScript Object Notation (JSON), Extensible Markup Language (XML), and Binary JSON (BSON).

The serialized data may be tabular data. The tabular data may be in the form of a list. Tabular data may include multiple rows and multiple columns of data or a single row with multiple columns. Tabular data may also be multi-dimensional, e.g., the data may have three or more dimensions. The list may be understood as a tabular data object or a collection or a set of tabular data.

An element of serialized event data may be an identifiable part of the event data. For example, the element may be an object or an array (e.g., in the context of JSON or BSON) or a row (e.g., in the context of tabular data specified via XML). The element may also be a (name,value) pair of the object, identifiable via the name.

An expression is a means of identifying the element. For example, in the context of JSON or BSON, the expression may be a name identifying a (name,value) pair of an object. In the context of an array, the expression may be a reference identifying a cell holding a value in the array.

A transactor may be a basic processing unit on the machine. The transactor may be capable of processing data. The transactor may be implemented via a thread, e.g., in the case when the machine is implemented as a process. Alternatively, a transactor may be implemented as a process or within a process. In particular, a transactor may perform operations on (i.e., processing) serialized event data according to input received in an operations array. The transactor may be capable of processing the event data independently or in combination with other transactors. A transactor may process tabular data in first-in first-out (FIFO) order. Last-in first-out (LIFO) processing is also possible. The transactor may be associated with an identifier (e.g., T1) that can be referred to by other transactors.

A cell may be understood as a box or placeholder for holding data. Data may be a value or a formula. In other words, the contents of a cell may be a value or a formula. The cell can be referenced, e.g., via row and column designations/identifiers. The cell may contain a value, or a formula, or the cell may be empty.

A range may be a group of cells, possibly contiguous.

A value may be raw data. In particular, the value may be numeric or text data. The value may be a result of applying a formula. The value can be contrasted with a formula.

A formula may identify a calculation needed to place a result in the cell containing the formula. The formula describes how to compute a new value from one or more existing values or formulas. The formula may assign a value to a cell or assign values to a range of cells. The formula may include an expression. The expression may include one or more of the following: a value, a reference to another cell, an arithmetic operator, a relational operator, and/or a function.

The content of a cell may refer to input provided to the cell. The content of the cell may be a value, a formula, or nothing (i.e., the cell may be empty). If the input is a formula, then the content is the formula itself rather than the result of applying the formula.

An array may be a collection of elements (i.e., cells) selectable via indices. The array may be multi-dimensional. A table and a grid are examples of arrays. Cells of the array may reference other cells in the same array or cells in other arrays. The array may be implemented as a sheet, i.e., a grid of cells.

An associative array may be a data structure composed of (name,value) pairs, such that each possible name (i.e., key) appears no more than once.

Interactive may refer to software or a program which accepts and responds to input from a user. The input may include data or a command.

Re-calculation of an array may involve evaluating each cell in the array. Each formula contained in the cells is applied (e.g., if the formula specifies a calculation then the calculation is performed). Applying a formula may be understood as performing the operations specified by the formula. For example performing a calculation or executing a function.

A reference may be understood as a pointer. Accordingly, input referencing a cell may be pointing to the cell or addressing the cell. For example, a reference may specify a row and column of a cell. The reference may be included in a formula.

Alternatively, an input array may provide a window into the input source. For example, displaying the input array to a user may enable the user to see data from the input source before the data is processed. In other words, the input array may enable a user to see the tabular data from the input source before operations are performed on the tabular data. The input array may hold tabular data from the input source upon which operations are being performed. Cells of the input array may be addressable (i.e., the cells can be referenced) from an operations array (discussed below). In some cases, the input array may be part of the operations array. The input array may be referred to as an input reader.

Instead of reading all data from the input source row-by-row into the input array, individual values of event data may be identified. For example, the event data may be received from the device in the form of an object (e.g., a JSON object) or associative array. An element (or "name,value" pair) of the object may be identified via an expression, and the expression may specify a name (or key) of the name,value pair. Spreadsheet functions may be provided to identify the element. Spreadsheet functions may be used in the operations array.

An output array may provide a window into an output destination. In particular, displaying the output array to the user may enable the user to see tabular data before the tabular data is sent to the output destination. The output array may hold tabular data determined based on the input array. The output array may hold tabular data copied from the operations array. In some cases, the output array may be part of the operations array. The output array may be referred to as an output writer.

Instead of the output array, in the context of objects, a write function may be used. For example, the WRITEJ- SON() spreadsheet function can be used to write values (e.g., values of a JSON object) to an output destination.

The operations array may receive user input. In particular, user input may be entered in cells of the operations array. Cells of the operations array may refer to the input array or the output array. Cells of the operations array may also refer to other cells of the operations array and perform calculations including references to those cells. The operations array may also include relational functions, functions for performing mathematical calculations, functions for manipulating (reading and writing) objects, functions for storing cell values in the output array, functions to trigger the re-calculation of other operations arrays, and list manipulation functions. The operations array may also include functions that carry out other actions. The operations array may be referred to as a spreadsheet.

The subject matter described in this application can be implemented as a method or on a device, possibly in the form of one or more computer program products. The subject matter described in the application can be implemented in a data signal or in a machine-readable medium, where the medium is embodied in one or more information carriers, such as a CD ROM, a DVD ROM, a semiconductor memory, or a hard disk. Such computer program products may cause a data processing apparatus to perform one or more operations described in the application.

In addition, subject matter described in the application can be implemented as a system including a processor, and a memory coupled to the processor. The memory may encode one or more programs to cause the processor to perform one or more of the methods described in the application. Further subject matter described in the application can be implemented using various devices.

Details of one or more implementations are set forth in the exemplary drawings and description below. Other features will be apparent from the description, the drawings, and from the claims.

BRIEF DESCRIPTION OF THE DRAWINGS

The subject matter of this disclosure is described in detail herein with reference to the attached drawing figures, which are intended to be exemplary and non-limiting in nature, wherein:

FIG. 1 shows lists.

FIG. 64 shows an alternative way to control settings of a transactor.

FIG. 65 shows an exemplary object.

DETAILED DESCRIPTION

In the following text, a detailed description of examples will be given with reference to the drawings. It should be understood that various modifications to the examples may be made. In particular, one or more elements of one example may be combined and used in other examples to form new examples.

In some figures, a value view (i.e., a display of cell values) and a content view (display of cell formulas) are mixed in the interest of clarity and conciseness. Such a mixed view might not reflect what is actually displayed to a user.

Figure 1:
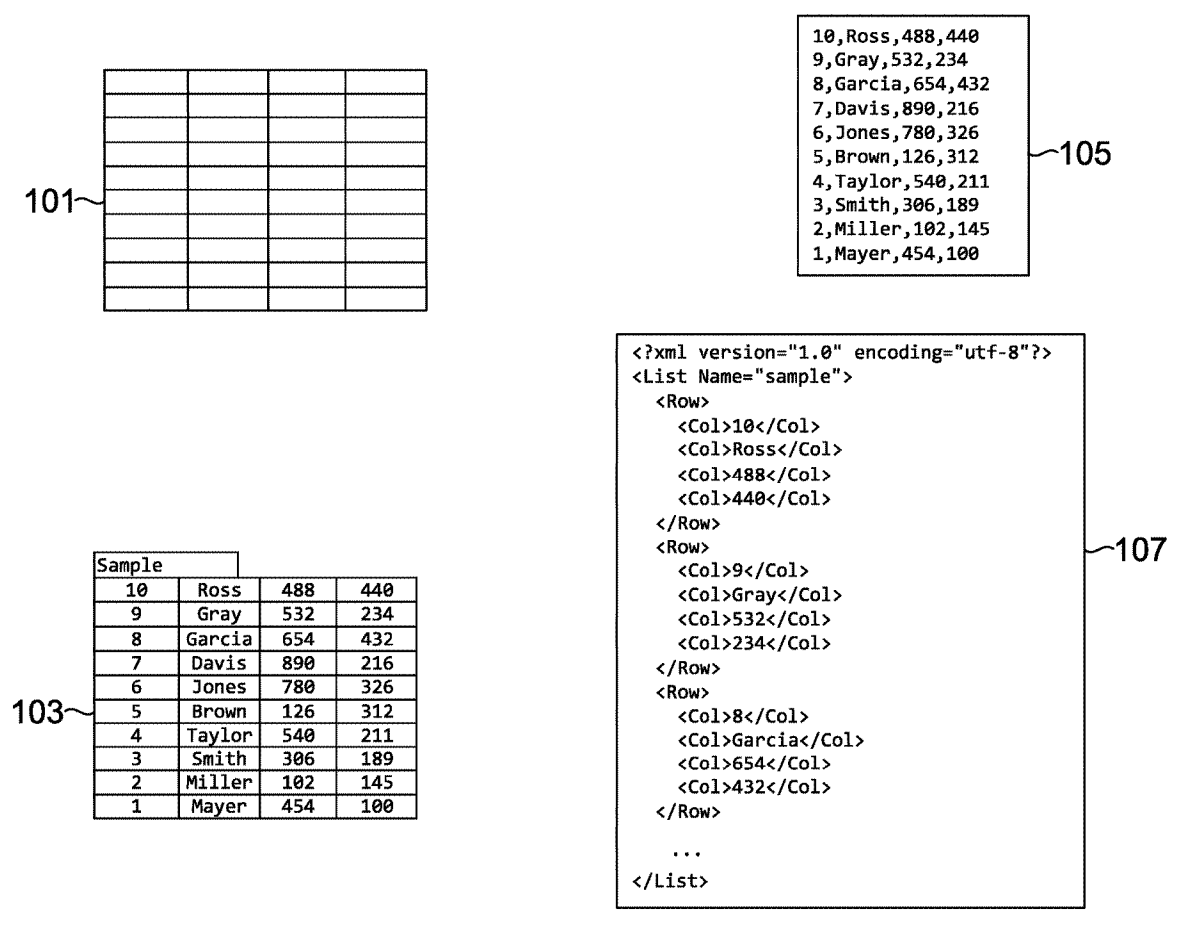

FIG. 1 shows examples of tabular data. The tabular data may be received as serialized event data from an input source. Serialized event data may take forms other than tabular data, for example, as an object. The object may include data and metadata.

In an exemplary object, using JSON as a serialization format, the metadata may be specified as follows:
{"ID":"ID232323","Label":"Order 12312","Topic": "cedalo/test","Arrivaltime": "2017-09-29T16:11:42.678Z", "Provider":"AWS IoT (MQTT)","Adapter":"AWS Central Europe", "Feeder":"AWS Device 1","Sample payload": false}

In particular, the metadata may include one or more of the following fields: an identifier (ID) of the event data, a label for the event data; the label may be the same across multiple events, a message topic (e.g., an MQTT topic), an arrival time, a provider, which may identifier a source operator of a source device of the event data and/or a messaging protocol, an adapter, which may identify an adapter for converting the event data to a format that can be processed by a target device, and/or a feeder, which may identify the source device of the event data.

The exemplary object may include the following data in addition to the metadata specified above:
{"CustomerName": {"FirstName":"Chris","LastName": "Meyer" }, "CustomerNumber":123454,"Positions": [{"PosNo":1,"ArticleNo":"A343434", "Preis":23}, {"PosNo":2,"ArticleNo":"B121212","Price":43} . . . 1}

Additionaldata may also be included in the object.

Serialized event data for a set of events may be included on a list. The list may include objects and/or tabular data.

A first exemplary list 101 is empty. The list 101 may be represented via a set of null values. In particular, since the list 101 has ten rows and four columns, the list 101 may be represented by a ten row and four column set of null values.

A second exemplary list 103 shows tabular data displayed in rows and columns and identified by a list name. In the second example 103, the list name is "sample". The tabular data may be received from the input source as rows of delimited values. In particular, the tabular data may be received in the form of a set of comma separated values (CSV). For example, the tabular data may be received as a sample.csv file 105.

In addition, the tabular data may be a list 107 in a serialization format, e.g., XML format.

Figure 2:
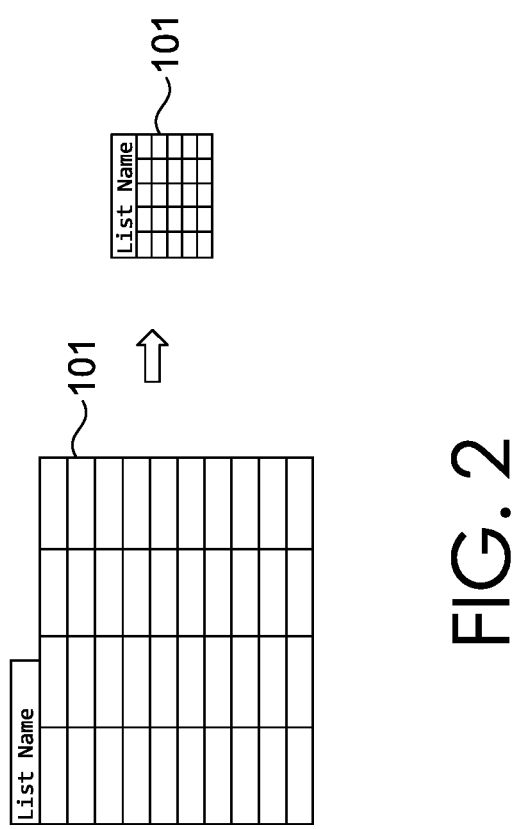
FIG. 2 shows a symbolic representation of an array.

FIG. 2 shows a symbolic representation of tabular data in the form of the list 101. In the example of FIG. 2, the list 101 is empty, e.g., filled with null values. The tabular data may be stored in a file. In particular, receiving serialized event data from the device may involve extracting the serialized event data (e.g., tabular data) from a file stored on the device.

Figure 3:
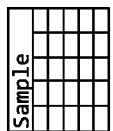
FIG. 3 shows tabular data being sent as an email attachment.

FIG. 3 shows tabular data being sent as an attachment of an email message. In particular, in the context of FIG. 3, the list 107 in XML format is sent as the attachment of an email message from machine1 to machine2. Machine1 and machine2 may both include one or more transactors. Machine1 and machine2 may be different processes (i.e., programs in execution) on the same device or different processes on different devices.

Thus, the serialized event data may be received in the form of an email message.

Tabular data may also be sent or distributed using other protocols suitable for transferring data between devices or processes, particularly Internet protocols such as Hypertext Transfer Protocol (HTTP), File Transfer Protocol (FTP), rsync, Secure Shell (ssh), Secure Copy (scp).

Figure 4:
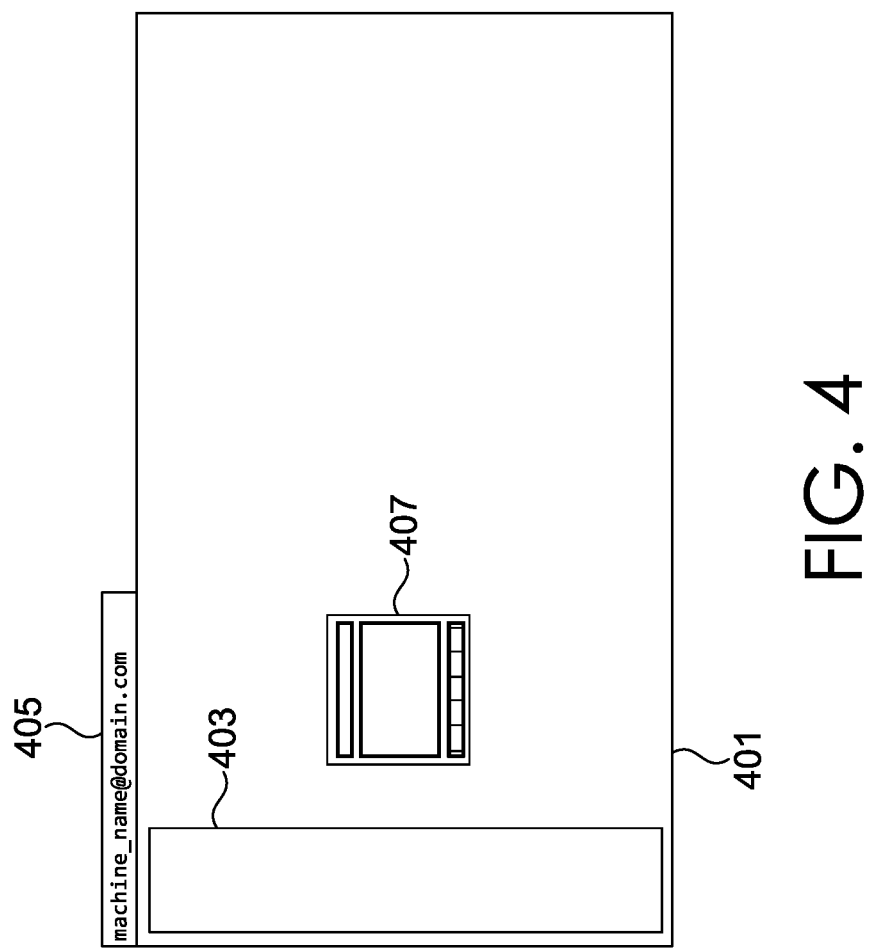
FIG. 4 shows a machine and components of the machine.

FIG. 4 shows an example of a machine 401. The machine 401 includes an inbox 403, a machine address 405, and a transactor 407.

The inbox 403 may receive serialized event data from a device (e.g., a data stream from another machine) in the form of tabular data. In particular, the inbox 403 may contain one or more lists. The lists in the inbox 403 may be contained in files and/or data streams. For example, the inbox 403 may include a pointer to a file containing a list or a pointer to a location in a file containing a list. Multiple lists may be contained within a file or each file may include only one list. Each list may include serialized event data for multiple events.

The machine 401 may be a device or a process executing on a device. For example, the machine 401 may be a process executing on an electronic device, such as a household or office device.

The transactor 407 may perform processing of the machine 401. In particular, the transactor 407 may perform operations on serialized event data (e.g., multiple rows of tabular data) received from a device. The machine address 405 may be a unique address of the machine 401. The machine address 405 may be used to send or receive a list. The machine address 405 may function in much the same way that an email address functions. In particular, when a list is sent to the machine 401 via the machine address 405, the list may be added to the inbox 403. The inbox 403 may function like a queue.

Figure 5:
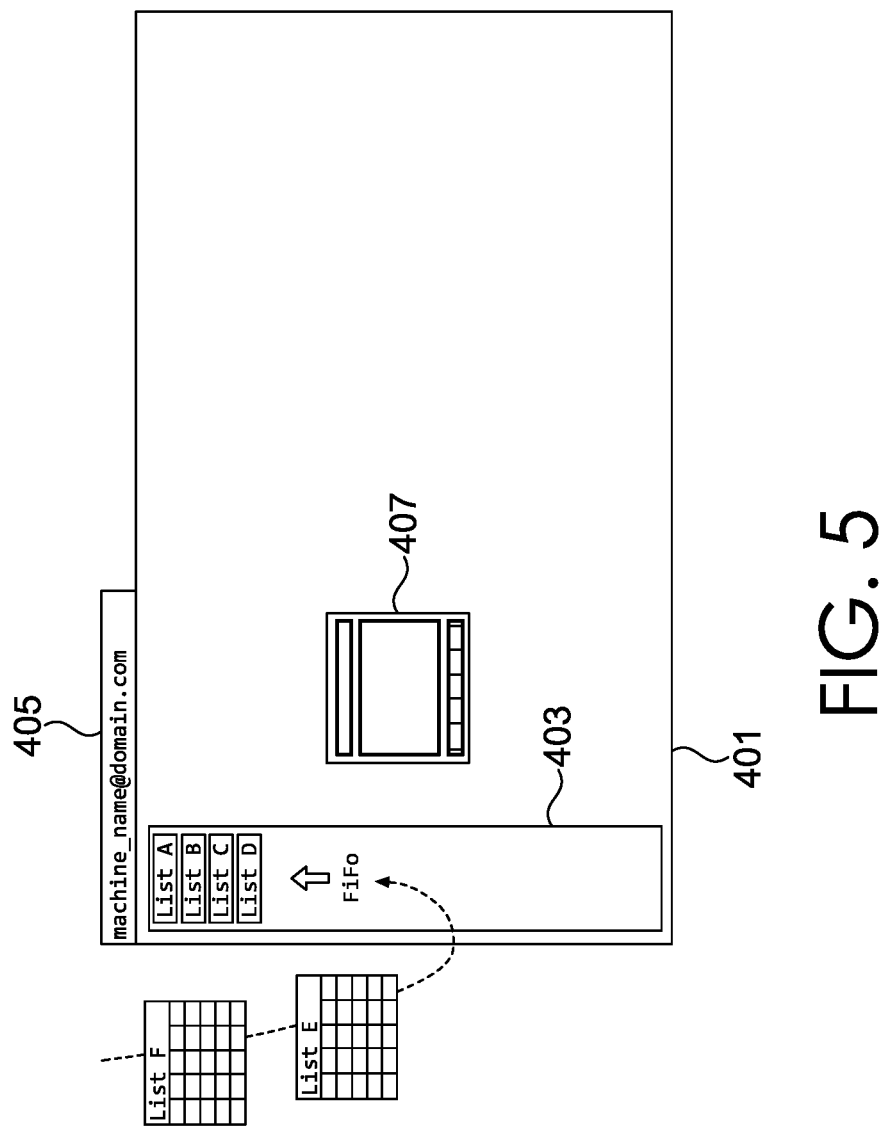
FIG. 5 shows lists queued for processing by a transactor.

FIG. 5 shows lists being added to the inbox 403. In the example of FIG. 5, as soon as there is one list in the inbox 403, the list is received from the inbox 403 at the transactor 407. Accordingly, the transactor 407 performs operations on serialized event data in the list. When the serialized event data is tabular data, the tabular data may be processed row by row through the transactor.

Figure 6:
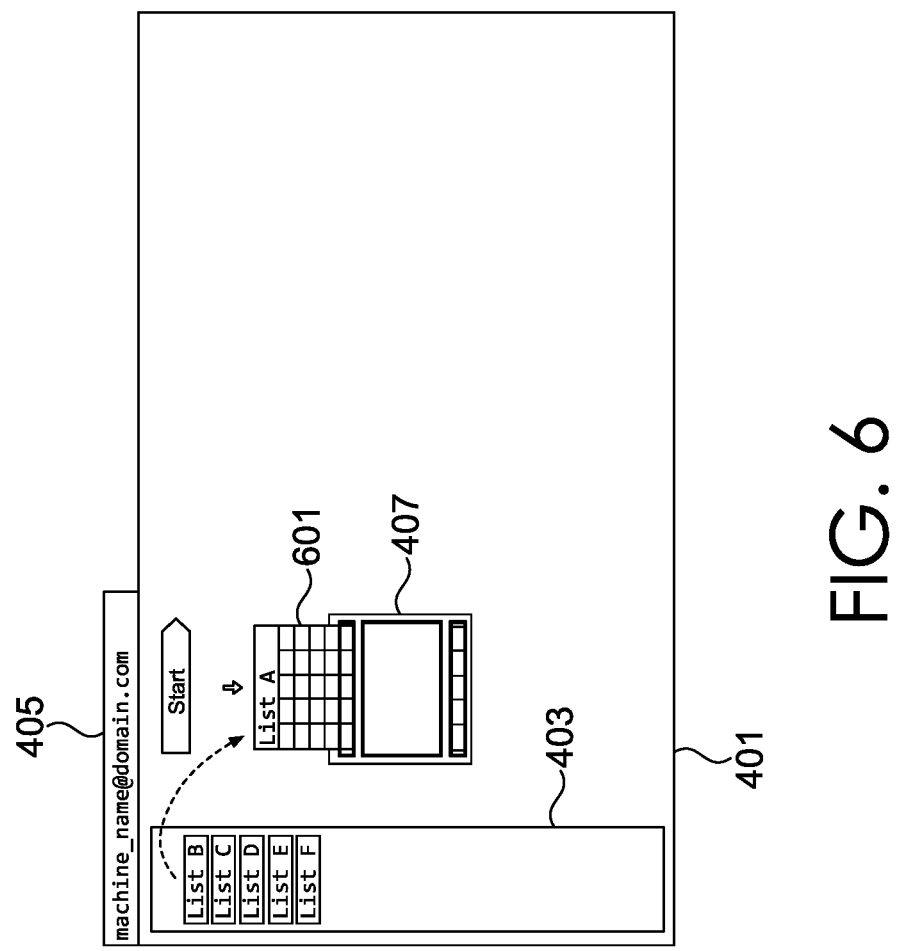
FIG. 6 shows a list being processed by the transactor while other lists await processing.

FIG. 6 shows the transactor 407 processing one of the lists from the inbox 403, i.e., a list 601. Accordingly, one of the rows of tabular data in the list 601 (depicted as "List A") has been inserted into an input array of the transactor 407. Operations may be performed on all the rows of the list 601. In particular, each row of the list 601 may be inserted into the input array of the transactor 407. Operations may be performed on the inserted row, e.g., according to received input in an operations array. Results of the performance of the operations may be copied to an output array. The output array may be displayed and then copied to an output destination, e.g., at another device.

Figure 7:
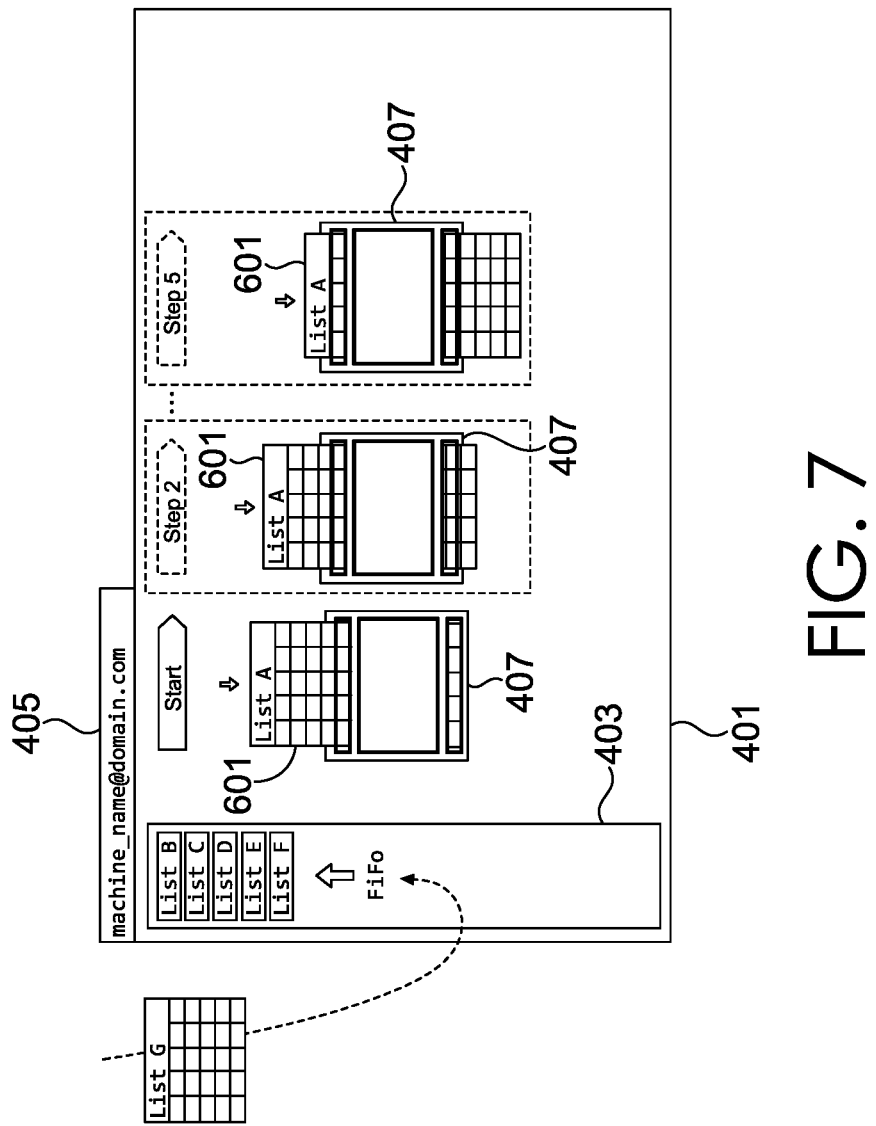
FIG. 7 shows steps of processing tabular data in the list by the transactor.

FIG. 7 shows processing of the list 601 by the transactor 407 in step-by-step fashion. In particular, each row of tabular data in the list 601 may be processed until operations have been performed on all the rows of tabular data in the list 601. Further, during processing of the list 601, a further list may be added to the inbox 403. After all rows of the list 601 have been processed the list 601 may be ejected from the transactor 407 and from the machine 401. Ejecting the list 601 may involve closing a file containing the list 601 or closing a data stream containing the list 601. Ejecting the list 601 may also involve calling an eject function, discussed in more detail below. The list 601 may be sent to another machine for further processing.

Figure 8:
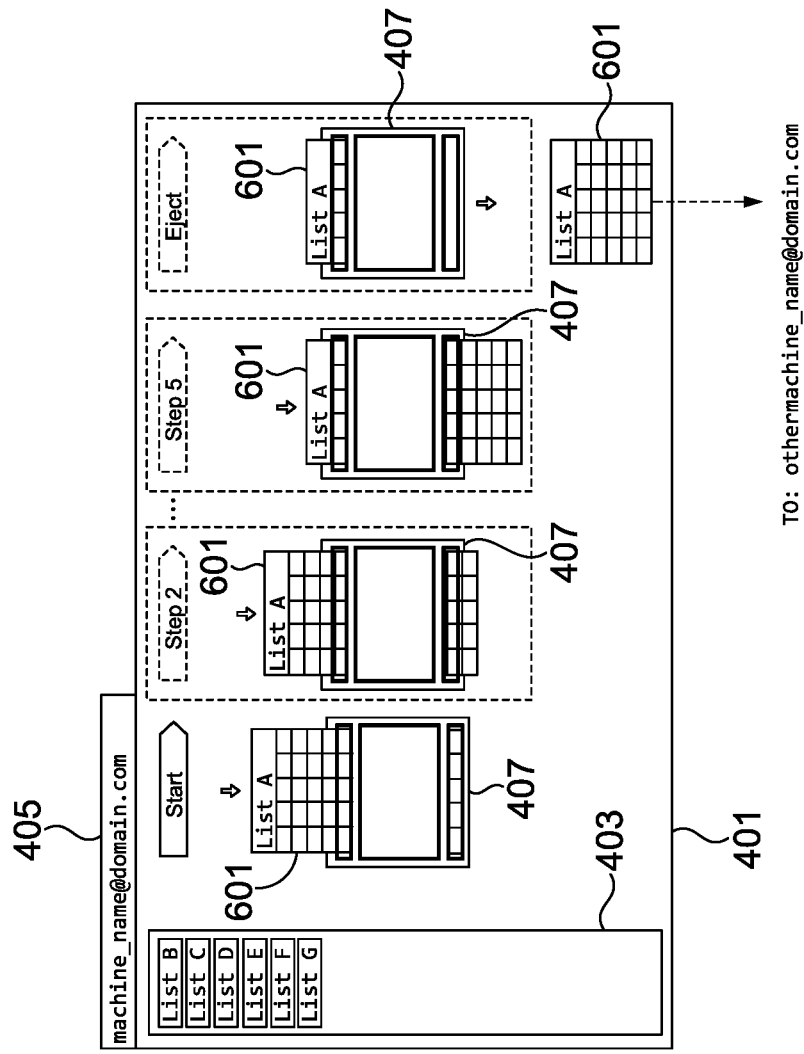
FIG. 8 shows processing, ejection, and distribution of the list.

FIG. 8 shows the list 601, i.e., "List A", being sent to another machine for further processing after the transactor 407 has performed operations on the rows of the list 601 and the list 601 has been ejected from the transactor 407.

Figure 9:
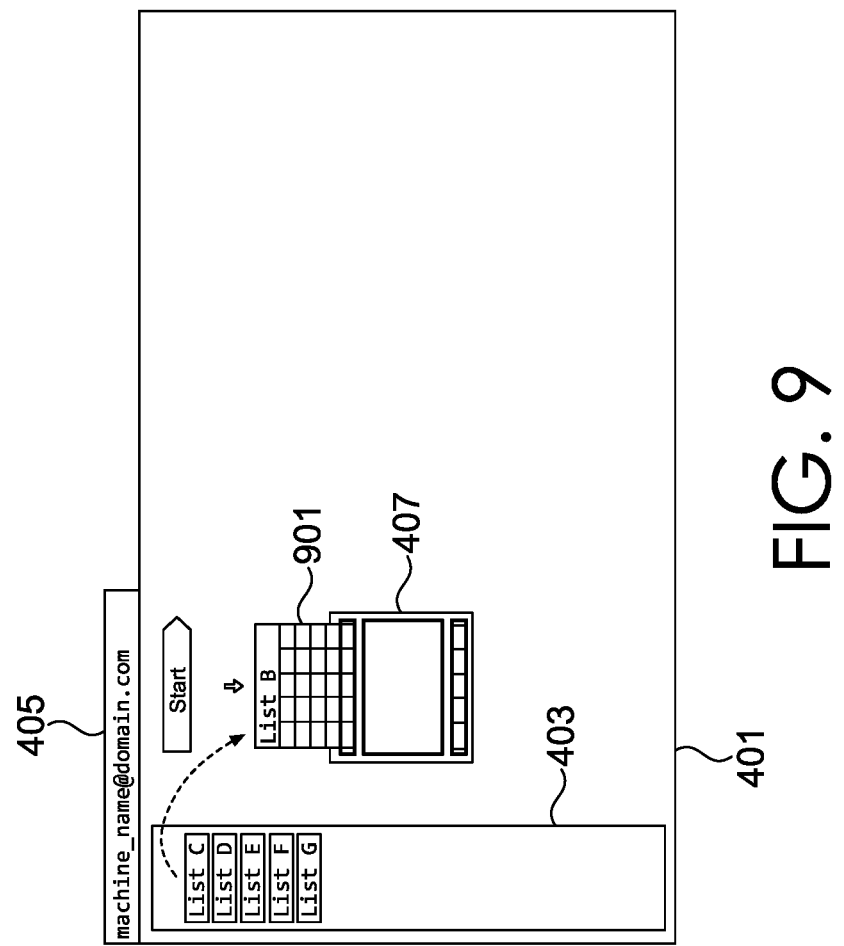
FIG. 9 shows the start of processing of a further list by the transactor.

FIG. 9 shows the beginning of performing operations on tabular data in a list 901 after the performance of operations on the tabular data of the list 601 (i.e., "List A") has been completed. The list 901 was retrieved from the inbox 403.

Figure 10:
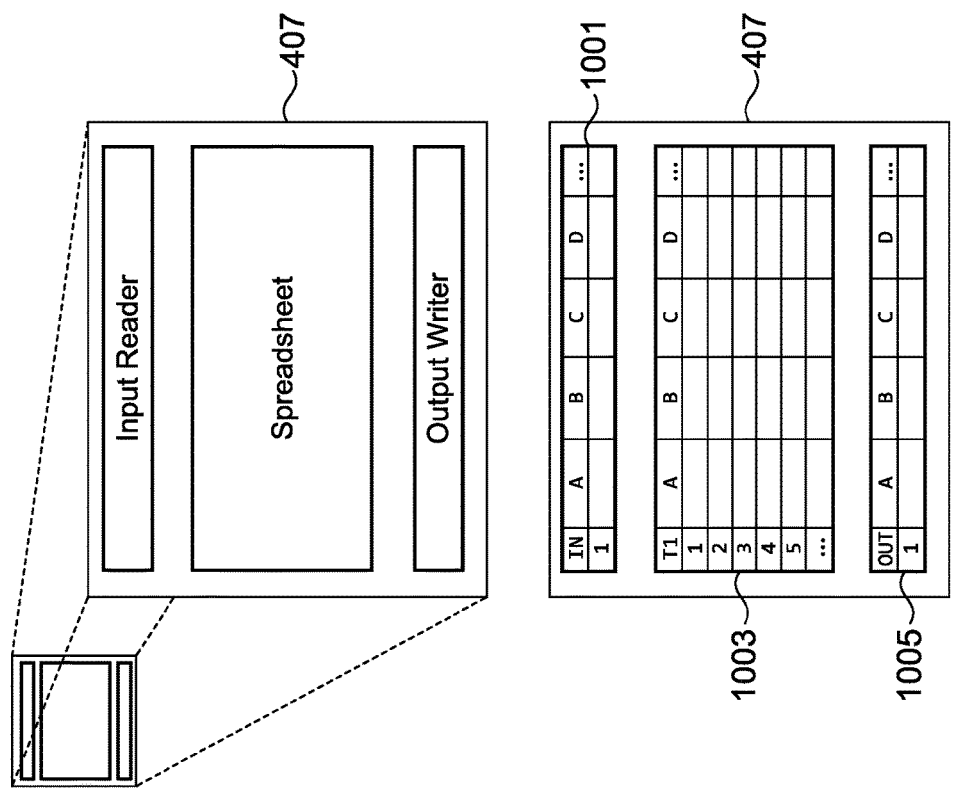
FIG. 10 shows components of the transactor.

FIG. 10 shows elements and functionality of the transactor 407. In particular, the transactor 407 may include an input array 1001, an operations array 1003, and an output array 1005. The input array 1001 may be referred to as an input reader. The operations array 1003 may be referred to as a sheet or a spreadsheet. The output array 1005 may be referred to as an output writer.

The operations array 1003 may also function as a spreadsheet independently of the input array 1001 and the output array 1005. In particular, operations on serialized event data that is not tabular data (e.g., event data in JSON format) may be specified in the operations array 1003.

The transactor 407 performs processing in the machine 401. The machine 401 can contain only the transactor 407 or multiple transactors. If there are multiple transactors in the machine 401, they may be attached to each other and interact with each other. Attaching transactors may be understood as providing a reference in one transactor to another transactor.

The input array 1001, the operations array 1003, and the output array 1005 each include at least one cell. In the example of FIG. 10, the input array 1001 includes at least four cells. Further, according to the example, the operations array 1003 includes at least twenty cells. Also, according to the example, the output array includes at least four cells.

In order to perform operations on tabular data received from the input source, a row of the tabular data may be inserted into the input array 1001. After being received from the input source, the tabular data may first be stored in the inbox 403 before a row of the tabular data is inserted into the input array 1001. Functionality connected to the input array 1001 may read cells of the tabular data upon which operations are to be performed. Accordingly, the input array 1001 exposes values of a row of tabular data received from the input source to the operations array 1003 and the output array 1005.

The operations array 1003 is able to perform operations on cells in the input array 1001. In particular, the operations array 1003 is able to process and transpose values of cells in the input array 1001. The output array 1005 is connected to functionality that copies values from the cells of the output array 1005 to an output list and an output destination. Copying the output array to an output destination may include copying the output array to the output list and sending the output list to the output destination.

For example, the output array is connected to functionality that is able to write values from the output array 1005 back to a list currently being processed by the transactor 407. Accordingly, the input source may be the same as the output destination. Once the output list is complete, the output list may be sent back to the input source. Accordingly, values in a row of the tabular data received from the input source can be changed and result in a change of the tabular data at the input source. Further, new rows can be added to the received tabular data or inserted among rows of the received tabular data. In addition, rows can be deleted from the received tabular data, the additions, insertions, and deletions also resulting in changes to the tabular data at the input source.

The input array 1001, the operations array 1003, and the output array 1005 can each store tabular data. Further, tabular data in the input array 1001, the operations array 1003, and the output array 1005 can be displayed. In the example of FIG. 10, the input array 1001, the operations array 1003, and the output array 1005 have row ordinates 1, 2, 3, . . . and column ordinates A, B, C, . . .

Each cell of the input array 1001, the operations array 1003, and the output array 1005 can be referenced via its cell ordinates. Each of the arrays may be labelled. For example, the input array 1001 is labelled "IN". The operations array 1003 is labelled "Tr. The output array 1005 is labelled "OUT".

Accordingly, cells in the input array 1001 can be referenced via the expression "=IN!" followed by the cell ordinates of the cell being referenced. For example, "=IN!A1"

would reference the leftmost cell of the input array 1001. Input received in the operations array 1003 can reference other cells of the operations array simply by referring to the cell ordinates. For example, "=A2" refers to row 2 column A of the operations array 1003. A reference to cell A2 of the operations array 1003 from a further operations array would need to include the name of the operations array 1003 before the ordinates of the cell. For example, since the operations array 1003 is identified with the label "T1", cell A2 could be referred to from the further operations array with the reference "=T1!A2".

In the example of FIG. 10, the output array 1005 has the label "OUT". Accordingly, cells of the output array 1005 may be referenced from the operations array 1003 by using the expression "=OUT!" followed by ordinates of the cell being referenced. For example, to reference cell A1 of the output array 1005, the expression "=OUT!A1" could be used.

Figure 11:
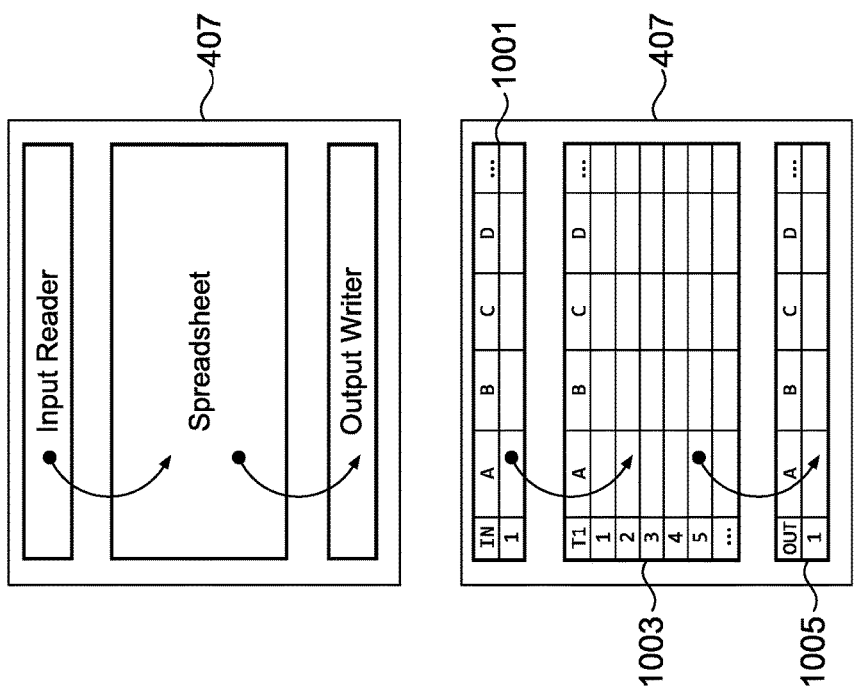
FIG. 11 shows interaction between the components of the transactor.

FIG. 11 shows how values of one or more cells of the input array 1001 may be copied to the operations array 1003. After the cells of the input array 1001 are copied to the operations array 1003, values of further cells in the operations array 1003 may be determined based on the copied values (not shown). In addition, determined values of the operations array 1003 may be copied to the output array 1005. In other words, determined values of the operations array 1003 may be stored in cells of the output array 1005.

Figure 12:
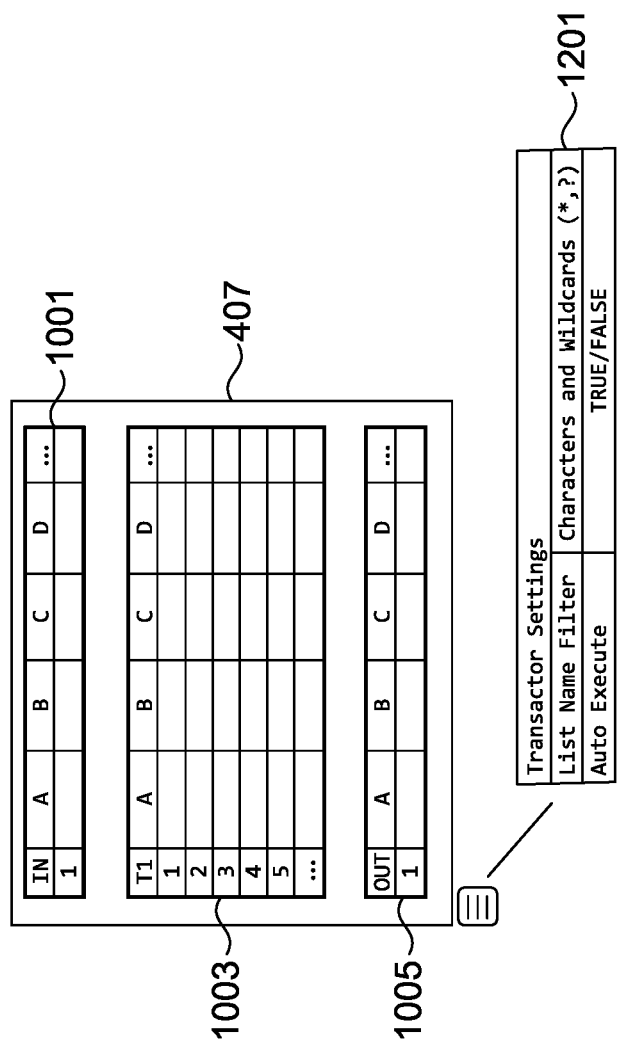
FIG. 12 shows settings to control operations of the transactor.

FIG. 12 shows transactor settings 1201 for the transactor 407. In the example of FIG. 12, the transactor 407 has two settings to control its operation. A first setting, "List Name Filter", may define which lists in the inbox 403 can be processed by the transactor 407. The transactor settings 1201 indicates that characters and wild cards may be used to specify which lists in the inbox 403 can be processed by the transactor 407. When a list from the inbox 403 is processed by the transactor 407, operations are performed on multiple rows of tabular data in the list.

For example, in order to process all lists with list names starting with "0010", then the List Name Filter of the transactor settings 1201 should be set to "0010*". If the processor should only process lists with list names "001" to "009" then the List Name Filter of the transactor settings 1201 should be set to "00?". Other wild cards and regular expressions may also be used to specify list names of lists to be processed. If the transactor 407 should not accept lists from the inbox 403, then the List Name Filter of the transactor settings 1201 should be left blank.

An "Auto Execute" setting of the transactor settings 1201 determines whether the transactor 407 automatically starts processing when new lists arrive in the inbox 403 of the transactor 407. The Auto Execute setting may also control operation of other transactors in addition to the transactor 407.

Figure 13:
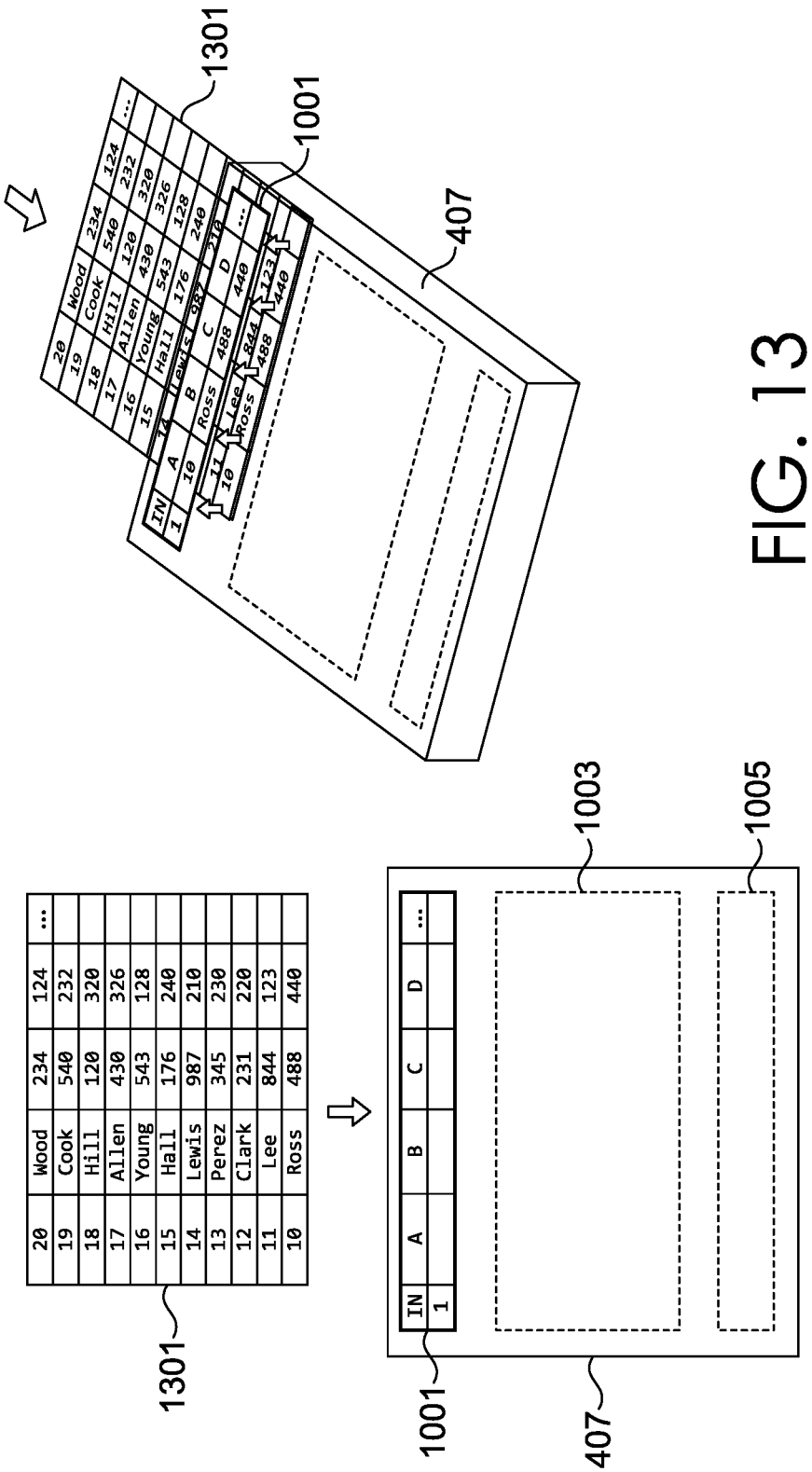
FIG. 13 demonstrates functionality of an input array when performing operations on the tabular data.

FIG. 13 shows a list 1301 being processed by the transactor 407. When processing the list 1301, the transactor 407 may perform operations on multiple rows of the tabular data in the list 1301. Each row of the list 1301 may be inserted into the input array 1001. Insertion of the row of the list 1301 into the input array 1001 may trigger re-calculation of the operations array 1003. The re-calculation of the operations array 1003 may occur for each row of the list 1301 inserted into the input array 1001. The operations array 1003 may include a reference to a cell of the input array 1001. Re-calculation of the operations array 1003 may include determining a value of a second cell of the operations array 1003 based on the referenced cell of the input array 1001. Re-calculation of the operations array 1003 may also include storing the determined value in a cell of the output array 1005, and displaying the output array 1005 including displaying the determined value in the cell of the output array 1005. Re-calculation of the operations array 1003 may also include copying the output array 1005 to an output list and ultimately to an output destination.

As an alternative to the input array, an object reading function may be used. The object reading function may be a spreadsheet function. The following examples introduce the spreadsheet functions JSONKEY() and READJSON() The output of the functions is generated with respect to the exemplary object introduced in the context of FIG. 1.

The JSONKEY() function is a helper function that may be used to identify a value in a JSON object. The JSONKEY() function may be used with various other functions including READJSONO( ).

The following example refers to the exemplary object discussed in connection with FIG. 1: "=JSONKEY("CustomerName";"FirstName")" returns the string "CustomerName. FirstName."

As another example, again with reference to the exemplary object discussed in connection with FIG. 1: "=JSONKEY(C6:C8)" returns the contents of the range of cells C6:C8 as a string.

By default, the JSONKEY() function acts upon a first object in the inbox. If this is not desired, then a name of an object (or an expression specifying the object) in an outbox can be specified as a first argument. The name of the object should be enclosed in square brackets. The outbox may be a temporary storage location for holding an object before sending the object to the output destination.

The READJSON() function may be used to identify elements of event data. In this example, the elements of event data are name, value pairs of a JSON object. For example, the following formula may be called to identify an element of event data: "=READJSON(JSONKEY("Data", "CustomerName":"FirstName");C6;"String")."

When the READJSON() and JSONKEY() functions are used to identify an element of metadata, the string "Data" above could be replaced with "Metadata".

In the example above, JSONKEY("Data","CustomerName":"FirstName") returns the string "CustomerName. FirstName".

If the READJSON() function in the example above is called with respect to the exemplary object discussed above in the context of FIG. 1, the following output is produced in cell C6 of the spreadsheet: "Chris".

Another example of the use of the READJSON() and JSONKEY() functions is as follows: "=READJSON(JSONKEY(;"PosNo");C12;"Number")."

In this example, if the JSONKEY() and READJSON() functions are called with respect to the exemplary object of FIG. 1, then JSONKEY(;"PosNo") returns the string "Positions.0.PosNo" and READJSON() returns 1 in cell C12. Since the first argument of READJSON() is undefined, a previously selected object attribute is used (i.e., Positions.0 in this case).

Yet another example of the use of JSONKEY() and READJSON() follows: "=READJSON(JSONKEY("[Object0001]";"Positions";0;"PosNo");C26;"Number"). In this case, a JSON object in the outbox is referenced, rather than the default object of the inbox (as in the previous examples). However, the object has the same data and metadata as the exemplary object of FIG. 1.

In this case, JSONKEY("[Object0001]";"Positions",0; "PosNo") returns "Positions.0.PosNo", and the READJSON() function returns 1 in cell C26. A further example of the use of JSONKEY() and READJSON() follows: "=READJSON(JSONKEY("[Object0001]";"Positions";0); C23:D25;"DICTIONARY")." In this case, JSONKEY("[Object0001]";"Positions";0) returns "Positions.0" and READJSON() returns a 2×3 grid in cells C23:D25 After call READJSON(), cells C23 and D23 contain "PosNo" and "1" respectively; cells C24 and D24 contain "ArticleNo" and the quoted string "343434" respectively; and cells C25 and D25 contain "Price" and "23,43" respectively.

It would also be possible to call READJSON() to transfer all values of an array in an object to a range (e.g., a grid) of cells in the spreadsheet.

Figure 14:
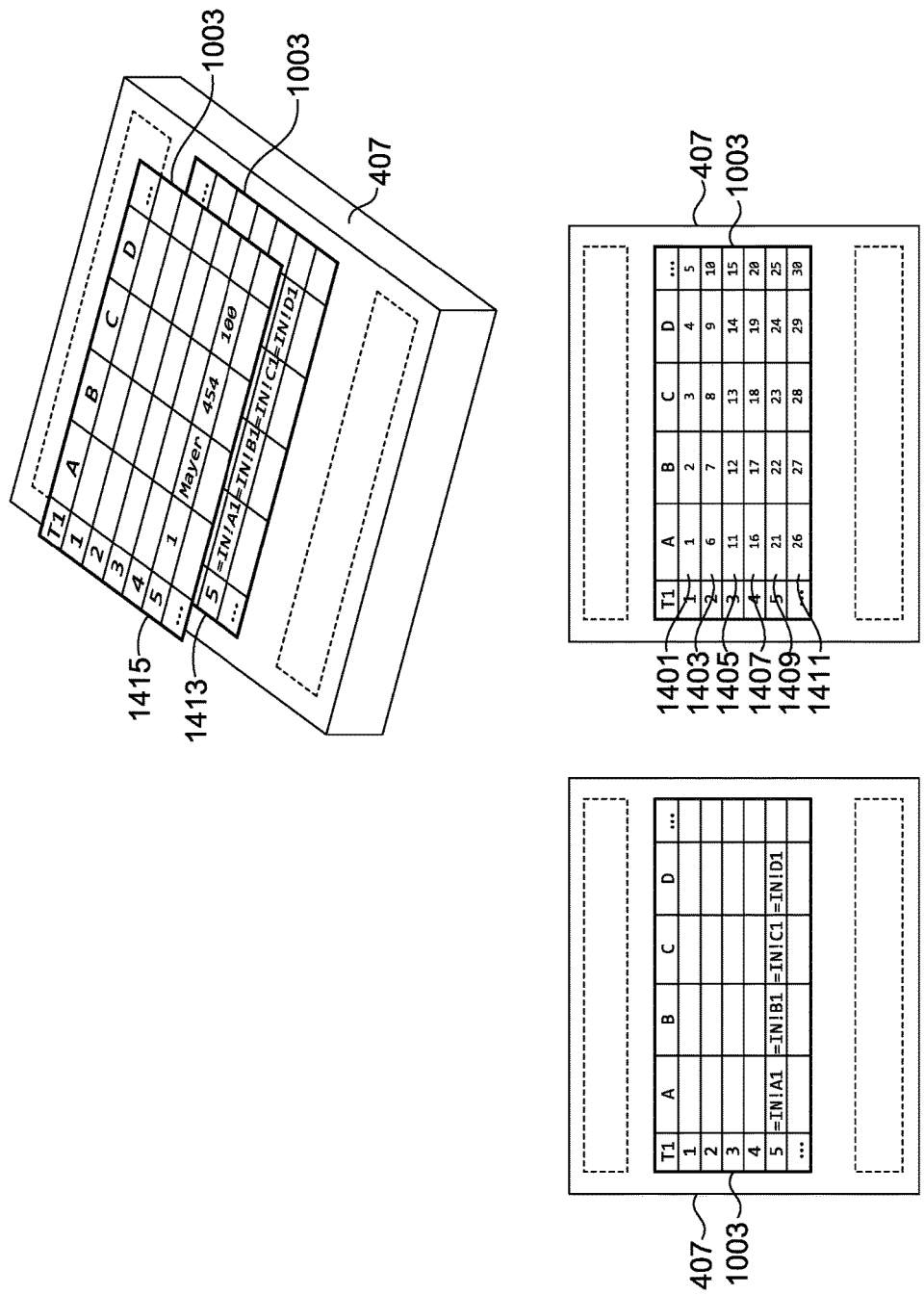
FIG. 14 shows performing operations on the tabular data in an operations array.

FIG. 14 shows the operations array 1003 in the transactor 407. The operations array 1003 includes computational and transactional logic of the transactor 407. The operations array 1003 is capable of performing typical spreadsheet calculations. In addition, the operations array 1003 is capable of generating, transforming, and exchanging serialized event data, possibly in the form of lists of tabular data.

As noted above, a spreadsheet may be implemented using the operations array 1003, independently of the input array 1001 and the output array 1005. In particular, the operation performed on the element of event data may be specified in the operations array 1003. The result of the operation may be displayed in the operations array 1003.

The operations array 1003 may have the following functionality. Each cell of the operations array 1003 may be capable of storing a value and content. The value and the content of a cell may be identical, e.g., when the content of the cell is a number value or a string value. The value of each cell in the operations array 1003 may be initially set to empty, i.e., null. The content of each cell in the operations array 1003 may be a number value, a string value, or another type of value or a formula. Other types of content are also possible.

It may be possible for a user to display the value or the content of a cell in the operations array 1003. For example, when performing operations on tabular data, the operations array 1003 may display values of cells. When receiving input (e.g., a reference to a cell of the input array 1001), the operations array 1003 may typically display cell content (e.g., references and formulas). It may be possible for a user to switch between the display of values and content (e.g., by processing a combination of keys) in the operations array 1003 as desired.

Formulas may start with an "=" sign and may contain values, functions, mathematical operators, brackets, and cell references. Formulas may also start with a different symbol. Each cell in the operations array 1003 may be referable (i.e., addressable) by any other cell in the operations array 1003, even from itself. For example, the cell "A3" in the operations array 1003 may refer to the cell "A3" in the operations array 1003.

A re-calculation cycle may be performed on the operations array 1003. This may include determining values of cells in the operations array, possibly by executing functions defined in those cells. Performing the re-calculation cycle may include calculating the value of all cells in the operations array 1003 one after the other in a row-by-row order. Performing the re-calculation cycle may be carried out by re-calculating cells in left-to-right order.

During re-calculation, if a cell of the operations array 1003 has a numerical value, a string value, or something other than a formula as content, then the value of the cell is set to this value. If the cell of the operations array 1003 has formula content, then the formula is evaluated and the result of evaluating the formula is stored as the cell value of the cell.

The operations array 1003 may be capable of processing a variety of functions. Each of these functions may be contained within a formula. An example of a function that can be processed by the operations array 1003 is the IF() function. The IF() function may have the following syntax "=IF(condition, then-expression, else-expression)".

Other exemplary functions that can be processed within the operations array 1003 are string functions, mathematical functions, statistical functions, and/or financial functions. Other types of functions are also possible. In particular, any function that excepts numerical or string input and returns a value may be received as input in the operations array and processed accordingly.

Re-calculation of the operations array 1003 may be triggered by receiving serialized event data from a device. The device may be associated with the operations array 1003 and the event data may be received from another device.

In some cases, performing the re-calculation cycle may include determining a value of a second cell in the operations array 1003 based on a referenced cell of the input array 1001 (e.g., deriving the value of the second cell by means of a calculation including the value of the referenced cell). Performing the re-calculation cycle may also include storing the determined value in a cell of the output array 1005. Performing the re-calculation cycle may further include displaying the output array 1005, e.g., so the user can verify an intermediate result.

Performing the re-calculation cycle may also include copying the output array 1005 to an output destination, e.g., by copying the output array 1005 to an output list and then sending the output list to the output destination when performance of operations is finished. Performing the re-calculation cycle may also include calculating the values of other cells in the operations array 1003.

In one example provided in FIG. 14, the operations array 1003 includes rows of numbers 1401 to 1411 illustrating an exemplary order in which cells of the operations array 1003 may be re-calculated. Alternative re-calculation ordering is also possible.

Row 1413 of the operations array 1003 shows four cells, each having a formula as cell content. Row 1415 of the operations array 1003 shows the corresponding values for the formulas in row 1413 after a re-calculation cycle.

Re-calculation of the operations array 1003 may be triggered by inserting a row of tabular data into the input array 1001. In particular, re-calculation of the operations array 1003 may be triggered after inserting a first row of tabular data from the input source into the input array and again after insertion of each subsequent row of tabular data from the input source into the input array 1001. Accordingly, the operations array 1003 may be re-calculated one time for each row of tabular data received from the input source. For example, for the list 1301 shown in FIG. 13, the operations array 1003 would be re-calculated eleven times, since there are eleven rows in the list 1301.

Figure 15:
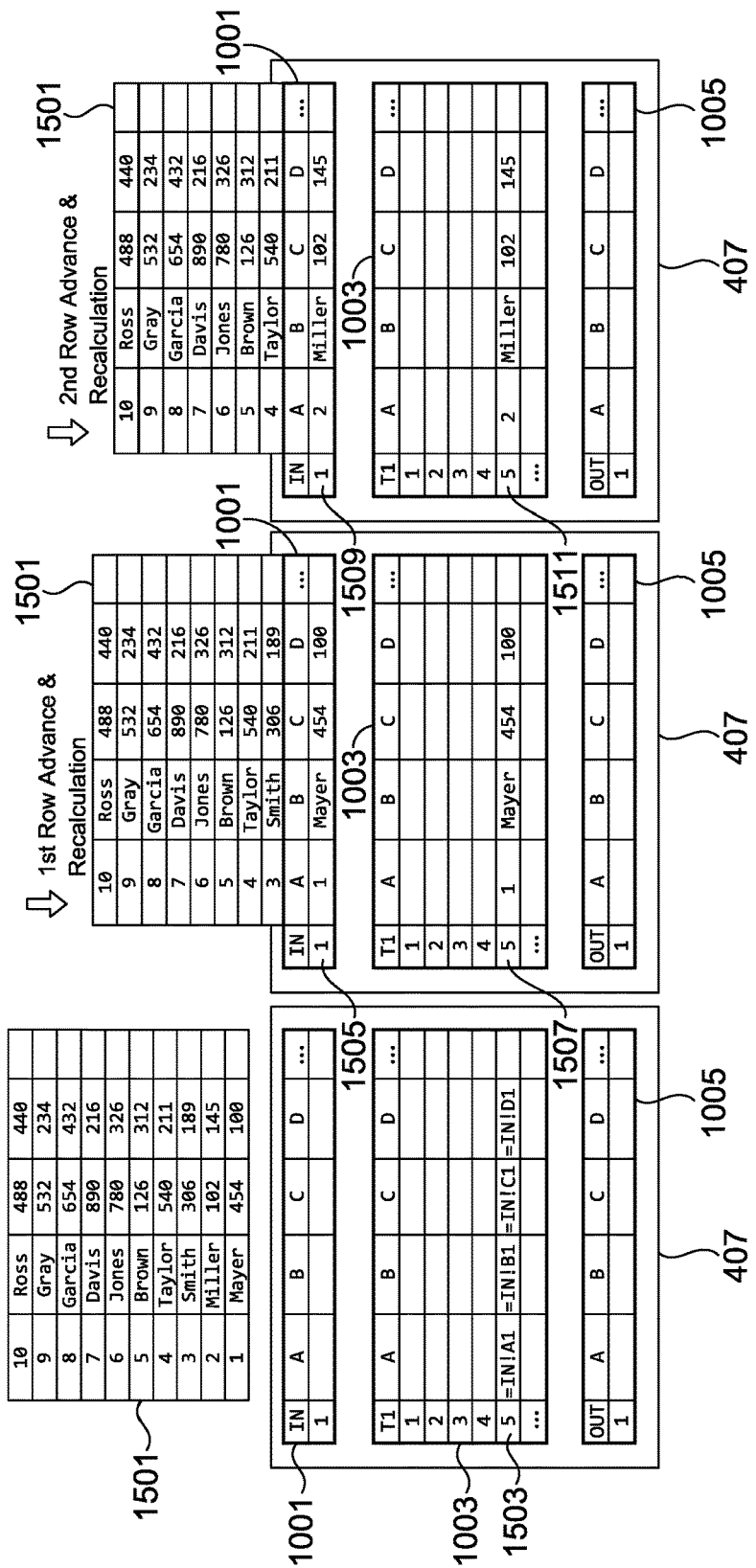
FIG. 15 shows the transactor receiving the tabular data from an input source and performing operations on multiple rows of the tabular data.

FIG. 15 shows performance of operations on a list 1501. Initially, input is received in the operations array 1003. The input comprises four formulas in four cells of row 1503 of the operations array 1003. Accordingly, input is provided in cells A5:D5 (A5,B5,C5,D5).

A row 1505 of tabular data from the list 1501 is inserted into the input array 1001. A row 1507 shows the result of applying the formulas in the row 1503 of the operations array 1003 to the row of tabular data 1505 in the input array 1001. The values in the row 1507 may be determined as a result of performing a first re-calculation of the operations array 1003.

A second row 1509 of the tabular data in the list 1501 is inserted into the input array 1001. Applying the formulas in the row 1503 results in values shown in row 1511

Re-calculation of the operations array 1003 can also be triggered by a function in a cell of another operations array. In particular, an execute function in a cell of another operations array can trigger re-calculation of the operations array 1003.

Figure 16:
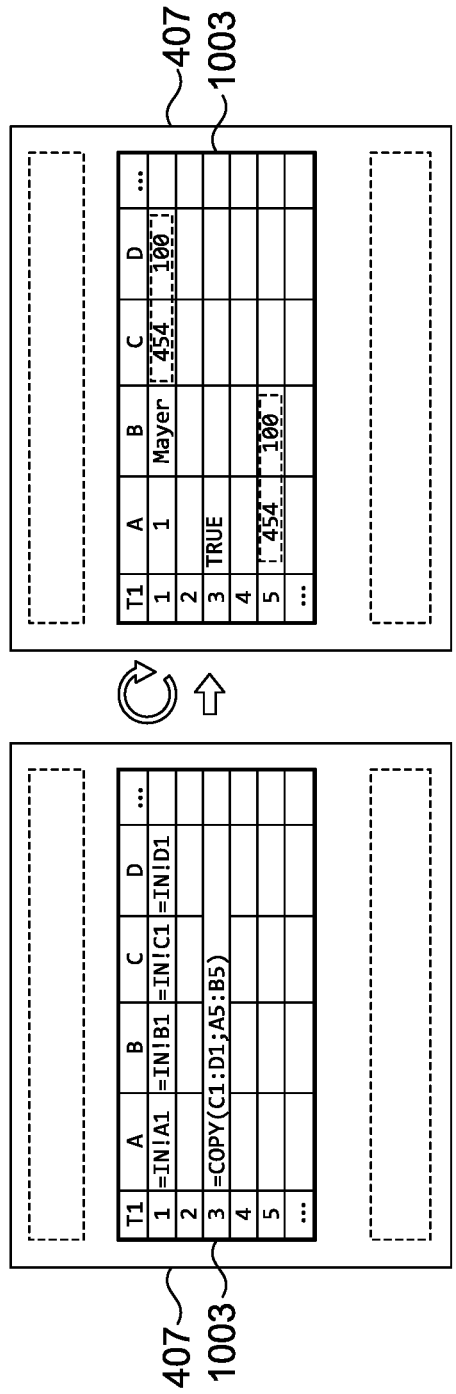
FIG. 16 shows a copy function for storing determined values of the operations array in an output array.

FIG. 16 shows the use of the copy function in the operations array 1003. The copy function can be used to store values of the operations array 1003 in the output array 1005. In particular, after determining a value of a second cell of the operations array based on a reference cell of the input array, the copy function can be used to store the determined value in a cell of the output array 1005. The copy function can be used to copy values from the operations array 1003 to the output array 1005 within the transactor 407. Alternatively, the copy function can be used to copy values from the operations array 1003 to an array in another transactor.

The copy function may be used to copy values from a source range of the operations array 1003 to a target range of cells in another array. The copying may be carried out between arrays on the same machine. A copy action carried out by the copy function may be performed when the operations array 1003 is re-calculated. If the copy function is embedded in an IF function, then the copy function will only execute when the corresponding IF condition is TRUE. In the example, the values "454" and "100" are copied from cells C1 and D1 to cells A5 and B5. Accordingly, the copy function as shown in FIG. 16 copies the values of two cells in the operations array 1003 to two different cells in the operations array 1003.

As an alternative to the copy function, an object writing function may be used. For example, the WRITEJSON() spreadsheet function may be used to write a JSON Object to the output destination. The following examples of the WRITEJSON() function may be better understood with reference to the exemplary object discussed in connection with FIG. 1. In the examples, the WRITEJSON() spreadsheet function is used to create and populate an associative array in an output object, e.g., a JSON object. In the following examples, "Object 0001" is the output object. Cell references may be understood in the context of the operations array 1003 or another spreadsheet. For "=WRITEJSON(JSONKEY("[Object 0001]";"Positions");"Array")" the result of the function is to create a "Positions" array in "Object 0001".

Another example of the WRITEJSON() function follows: "=WRITEJSON(JSONKEY("[Object 0001]";"Positions"; 0);"Dictionary")." The result of the function is to create an associative array (dictionary) within the positions array in "Object 0001".

Yet another example of the WRITEJSON() function follows: "=WRITEJSON(JSONKEY("[Object 0001]";"Positions";0;"PosNo");C19;"Number")." In this example, a value of type "Number" from cell C19 is associated with the attribute "PosNo" of the associative array "0" in the array "Positions".

A further example of the WRITEJSON() function follows: "=WRITEJSON(JSONKEY("[Object 0001]";"Positions";0;"ArticleNo");C20; "String")." In this example, a value of type "String" from cell C20 is associated with the attribute "ArticleNo" (Article number) of the associative array "0" in the array "Positions".

A last example of the WRITEJSON() function follows: "=WRITEJSON(JSONKEY("[Object 0001]":"Positions";0; "Price");C21;"Number")." In this example, a value of type "Number" from cell C21 is associated with the attribute "Price" in the associative array "0" in the array "Positions".

Once the output object has been populated, e.g., via use of the WRITEJSON() function, the output object may be published to an output destination. In this case, the PUBLISH( ) function may be used. An example of the PUBLISH( ) function follows: "=PUBLISH("Object 0001"; "AWS Device 2";"cedalo/testtopic")." The function has the effect of copying or publishing the "Object 0001" to the target device (or feeder) "AWS Device 2 ". "cedalo/testtopic" is an MQTT topic. Topics may be used to send different types of messages (e.g., instructions for operating different components) to the same device.

Figure 17:
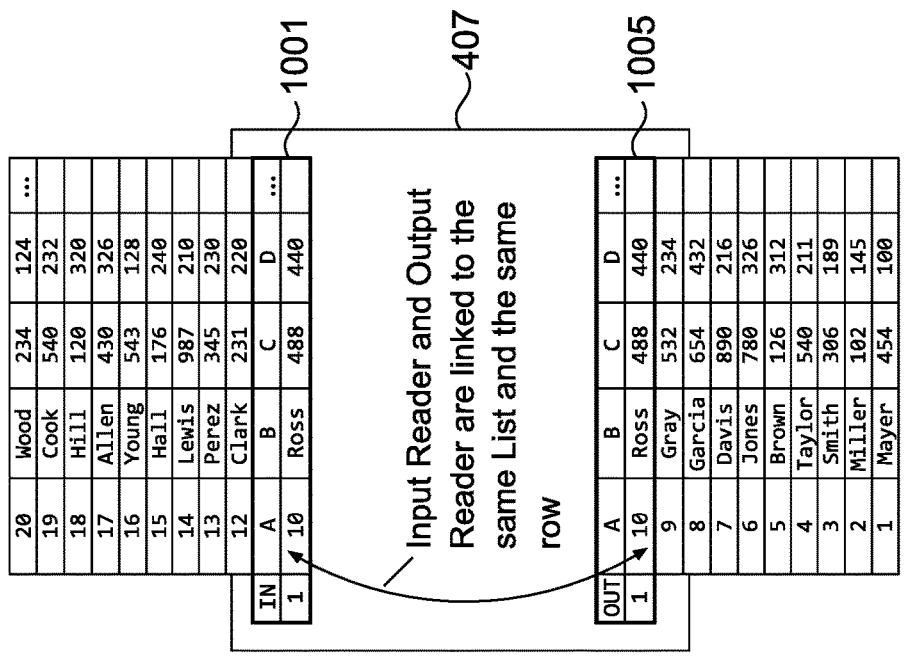
FIG. 17 demonstrates functionality of the input array and the output array.

FIG. 17 shows the transactor 407 performing operations on tabular data and the output destination is the same as the input source. In other words, the transactor 407 writes data back to the list currently being processed and the list is sent back to the source from which it was received. According to the example, if operations are being performed on tabular data of a list, the output array 1005 displays a row of data derived from a row of data displayed by the input array 1001.

In some cases, the copy function may be used to copy cells from the operations array 1003 to the output array 1005 resulting in updated data for the row of tabular data currently being processed. According to the example, values that the copy function stores in the output array 1005 are written back to the output destination. When the output destination is the same as the input source, then the copy function results in the copying of values back to the input source.

Figure 18:
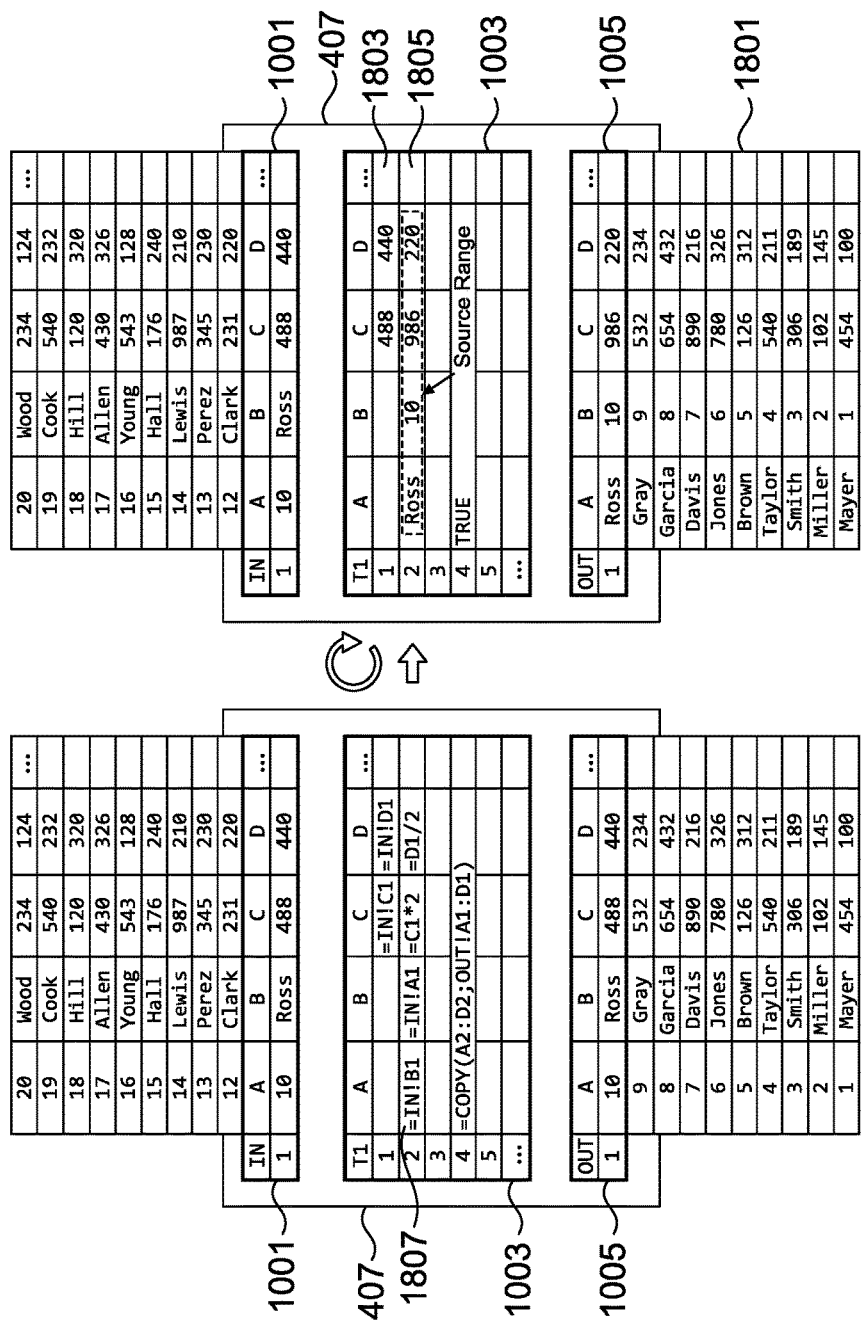
FIG. 18 demonstrates functionality of the copy function.

FIG. 18 shows use of the copy function to store determined values from the operations array 1003 in the output array 1005. In particular, in comparison to the tabular data received from the input source, the values 1801 copied to the output destination are modified. In particular, the value in column A is swapped with the value in column B. In addition, mathematical operations are performed on the values in columns C and D. Row 1803 shows values copied from the input array 1001 to the operations array 1003. Row 1805 shows the results of applying the formulas in row 1807 of the operations array 1003 to the values in the input array 1001. The values in the row 1805 are also present in the output array 1005.

Figure 19:
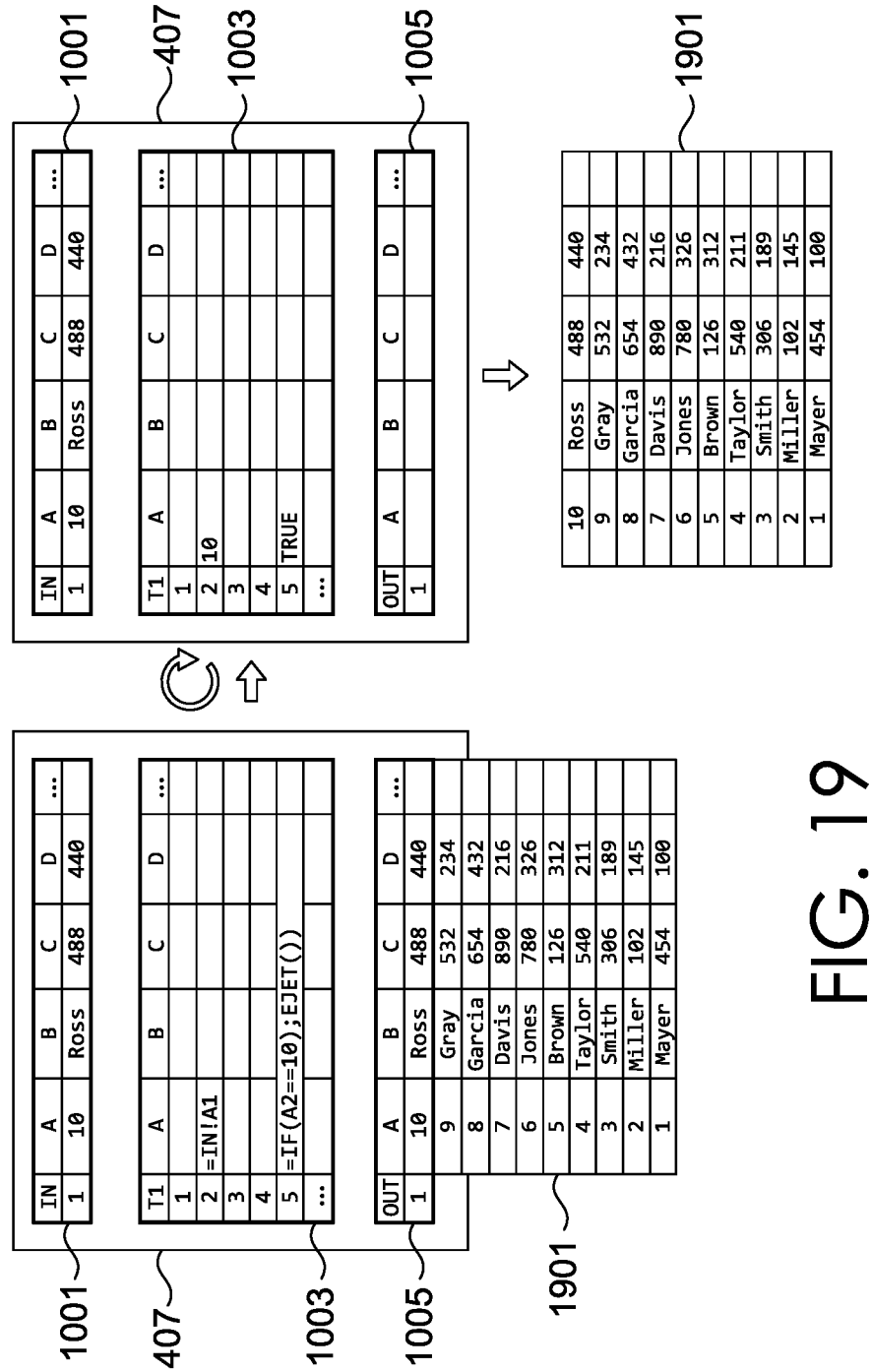
FIG. 19 shows a function to stop the performance of operations on event data.

FIG. 19 shows a function that can be used to stop the performance of operations on event data. Various functions may be used to stop performance of operations on event data.

For example, a stop function may be used to stop the performance of operations on event data. The stop function may cause processing of a transactor to stop and may cause event data being processed by the transactor to be ejected. In particular, the stop function may cause processing of an object (e.g., a JSON object) to be stopped and cause the object to be ejected from the transactor.

In the example of FIG. 19, an eject function is depicted. The eject function may be used to stop the performance of operations on event data, particularly tabular data. For example, the eject function may stop performance of operations on the tabular data of a list currently being processed. The eject function may then delete the list. The eject function could also send the list to another machine for further processing. Other options are also possible. The eject function may be embedded in an IF function, such that the eject function only executes when the IF condition of the IF function evaluates to TRUE. The example of FIG. 19 shows that the operations array 1003 includes a formula (i.e., a reference) in cell A2 to copy the value of cell A1 of the input array 1001 to cell A2 of the operations array 1003. The operations array 1003 also includes an IF function. The IF function specifies that if cell "A2" of the operations array 1003 has a value of "10", then the list currently being processed will be ejected. Accordingly, since the value in cell "A1" of the input array is "10", once this value is copied to cell "A2" of the operations array 1003, the IF condition in cell "A5" of the operations array 1003 evaluates to TRUE and the list 1901 is ejected, i.e., performance of operations on the list stops.

According to one example, the eject function may have an optional argument to assign a new name to the list that is ejected. If this argument is omitted, the name of the list that is ejected stays unchanged. A second possible optional argument of the eject function is the name of the target machine to send a list to after it is ejected. It is also possible to send the list to the same transactor that it was ejected from.

Figure 20:
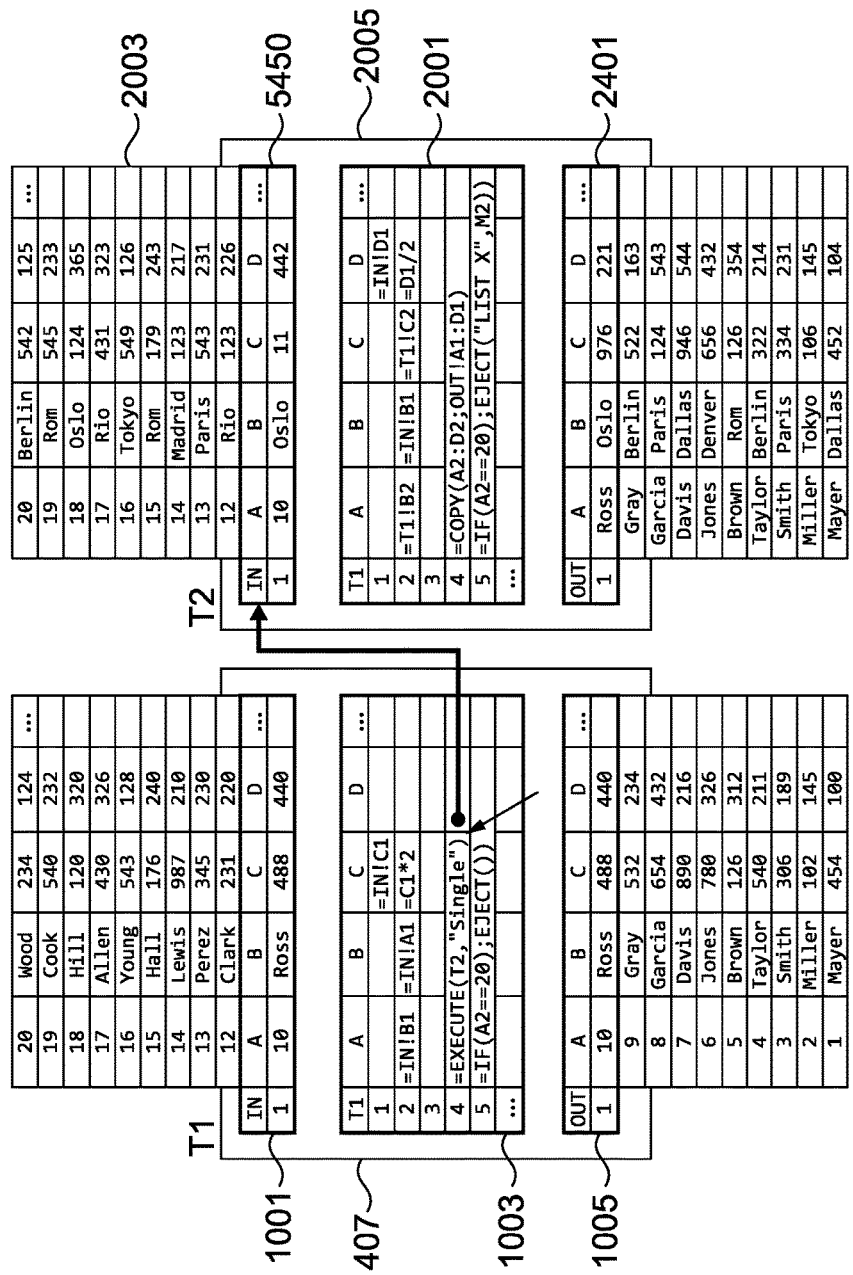
FIG. 20 shows operation of an execute function to trigger re-calculation of the operations array.

FIG. 20 shows operation of an execute function. The execute function may be used to trigger re-calculation of a further operations array from an operations array that is currently processing event data (e.g., tabular data in a list). Accordingly, the execute function can be used to link multiple transactors on one machine. The execute function may operate by halting execution of a transactor from which it is called until the transactor called by the execute function finishes processing.

Typically, the execute function may have two arguments: a transactor name (e.g., "T2") and a quantity indicating the number of times to repeat execution. For example, the execute function may be called from the operations array 1003 with the following syntax: "=EXECUTE (transactor name, repetitions)." The "repetitions" parameter may be optional.

Alternatively, when using the execute function in the context of tabular data as depicted in FIG. 20, a primary transactor may trigger the processing of all rows in a secondary transactor one time for each row in the primary transactor. The execute function can also enable the processing of two lists in parallel with a primary transactor triggering processing of a single row of tabular data by a secondary transactor for each row in the list being processed by the primary transactor. The latter option is shown in the example depicted in FIG. 20. In particular, for each row of the list processed by the operations array 1003, the operations array 2001 is re-calculated. Accordingly, for each row processed in the operations array 1003, a single row of a list 2003 is processed by the operations array 2001.

According to the alternative, a first argument of the execute function may identify a transactor for execution. In the example of FIG. 20, a transactor 2005 is identified via "T2". A second argument of the execute function is a processing mode parameter that controls whether the execute function triggers execution of one row (argument value "single") or all rows (argument value "all") of the transactor specified in the first argument.

Figure 21:
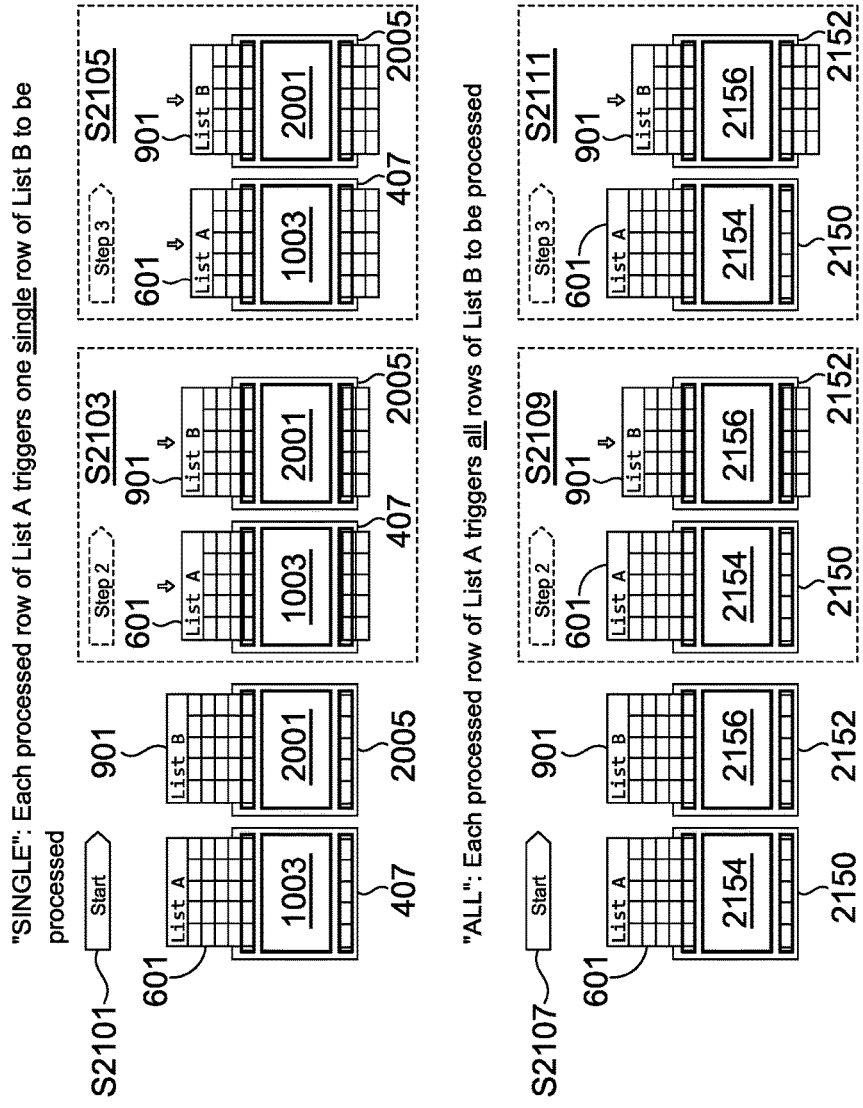
FIG. 21 shows different ways of triggering re-calculation of the operations array.

FIG. 21 shows exemplary operating modes of the execute function in the context of performing operations on tabular data. In particular, returning to the example of FIG. 20, the execute function may be used to trigger re-calculation of the further operations array 2001 from the operations array 1003.

At step S2101, the transactor 407 and the transactor 2005 are each configured to process separate lists. Further, the operations array 1003 triggers re-calculation of the operations array 2001. The operations array 2001 may be considered an example of a further operations array. At step S2103, it can be seen that the transactor 407 and the transactor 2005 are processing separate lists (i.e., list 601 and list 901) in parallel. At step S2105, a further row of tabular data in each list is processed by the transactor 407 and the transactor 2005.

Steps S2107, S2109, and S2111 show an alternative way to use the execute function to trigger re-calculation of a further operations array from a first operations array. In particular, at step S2107, an operations array 2154 of a transactor 2150 triggers re-calculation of an operations array 2156 of a transactor 2152. As shown in steps S2109 and S2111, once re-calculation of the operations array 2156 is triggered, the transactor 2152 processes all rows of tabular data from its input source before processing of tabular data by the transactor 2150 resumes. This processing can be triggered by calling the execute function with the argument "all". When triggering re-calculation of a further operations array from the operations array 1003 or the operations array 2154, a further input source may be selected. The further input source may be a machine. For example, the further input source may be specified as a third argument for the execute function. Other mechanisms for specifying the further input source are also possible.

A third argument of the execute function may specify a name or a list to be selected from the inbox 403. If a list having the specified name is in the inbox 403, then operations are performed on multiple rows of tabular data in the list, e.g., according to input received in the further operations array. If the specified list is not in the inbox 403, then execution may be stopped until the list arrives in the inbox 403. Other mechanisms for specifying the further input source can also be used. If a specific list is not specified for processing by the further operations array (e.g., the operations array 2001), then a list matching a List Name Filter specified in the transactor settings 1201 may be selected from the inbox 403. In particular, the first list in the inbox 403 matching the filter criteria specified in the transactor settings 1201 may be selected.

Figure 22:
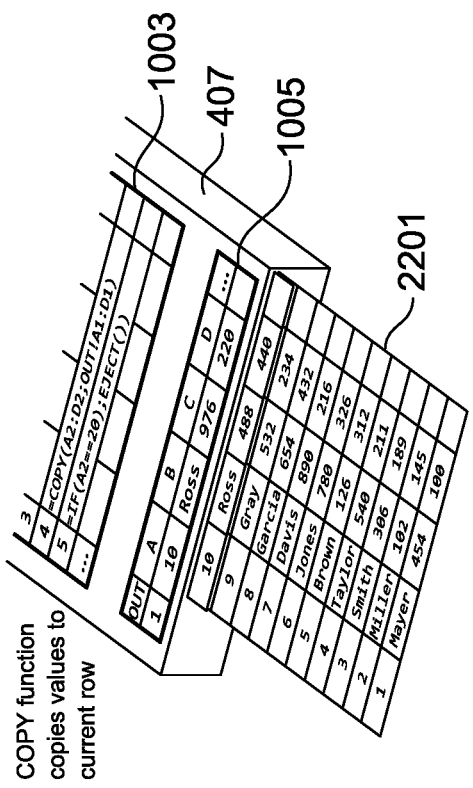
FIG. 22 shows use of the copy function.

FIG. 22 shows an exemplary function for storing a determined value of the operations array 1003 to a cell of the output array 1005. According to the example, a row of the operations array 1003 is stored in the output array 1005. This is carried out via the copy function. Thus, continuing the example, the copy function may be used to change or override a row of a list 2201 currently being processed by the transactor 407.

Figure 23:
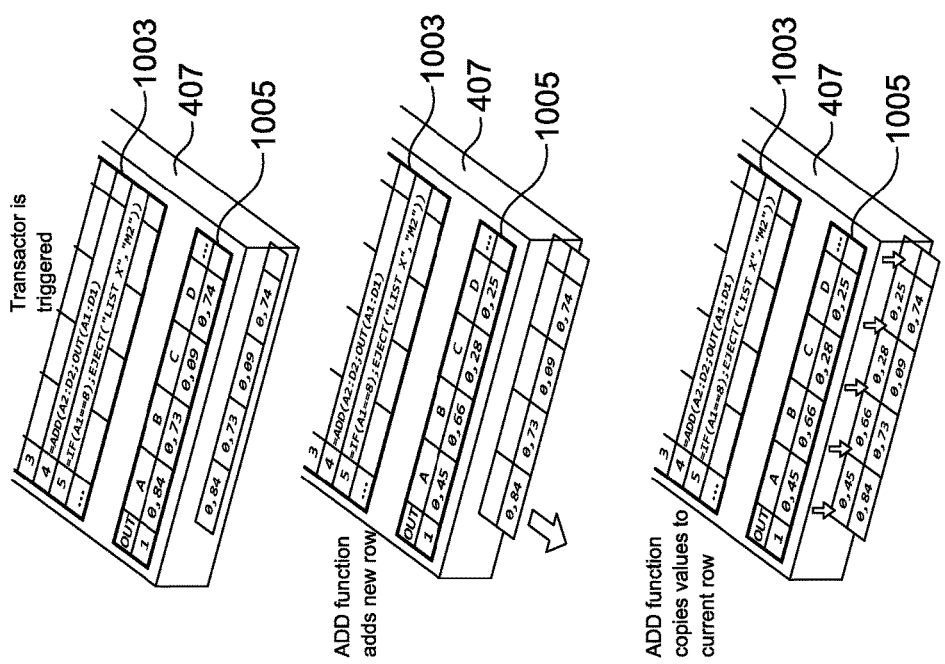
FIG. 23 shows functionality for storing values from the operations array in the output array and adding a row to an output list before copying the output array to the output list.

FIG. 23 shows another exemplary function that can be used in the operations array 1003 to store a determined value of a cell of the operations array 1003 to a cell of the output array 1005. In the example of FIG. 23, the add function is used.

The add function includes a first argument specifying a row of the operations array 1003 and a second argument specifying a row of the output array 1005. By means of the add function, a row is first inserted into the output destination, and then the values in the cells of the operations array 1003 specified in the first argument of the add function are copied to the cells of the output array 1005 specified in the second argument of the add function. The add function differs from the copy function in that the add function causes a new row to be added to the output destination before writing the row in the output array 1005 to the output destination. In contrast, the copy function causes a row of the tabular data to be overwritten by the row in the output array 1005. The add function can also be used to cause data to be copied to the output destination even if an empty set of tabular data is received from the input source.

Figure 24:
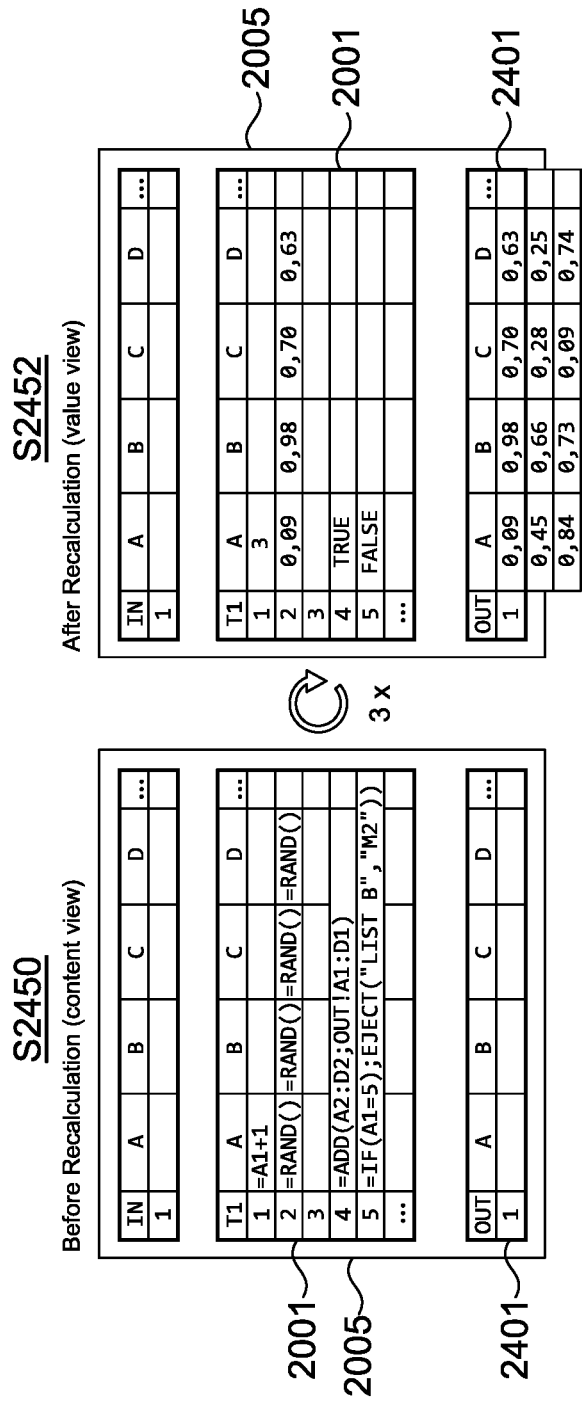
FIG. 24 shows use of the add function in combination with use of the execute function for re-calculation of the operations array.

FIG. 24 shows use of the add function in the operations array 2001 to store determined values of the operations array to cell of an output array 2401. At step S2450, a view of the contents of the cells of the operations array 2001 is shown. In particular, a row of random values is calculated in cells A2 to D2. Row 5 of the operations array 2001 indicates that after five re-calculations of the operations array 2001, "List B" is ejected and processing stops.

Step S2452 shows values of the operations array 2001 after three re-calculation cycles. The output array 2401 shows a further row of values to be copied to the output destination. At this stage, two rows have already been copied to the output destination.

Figure 25:
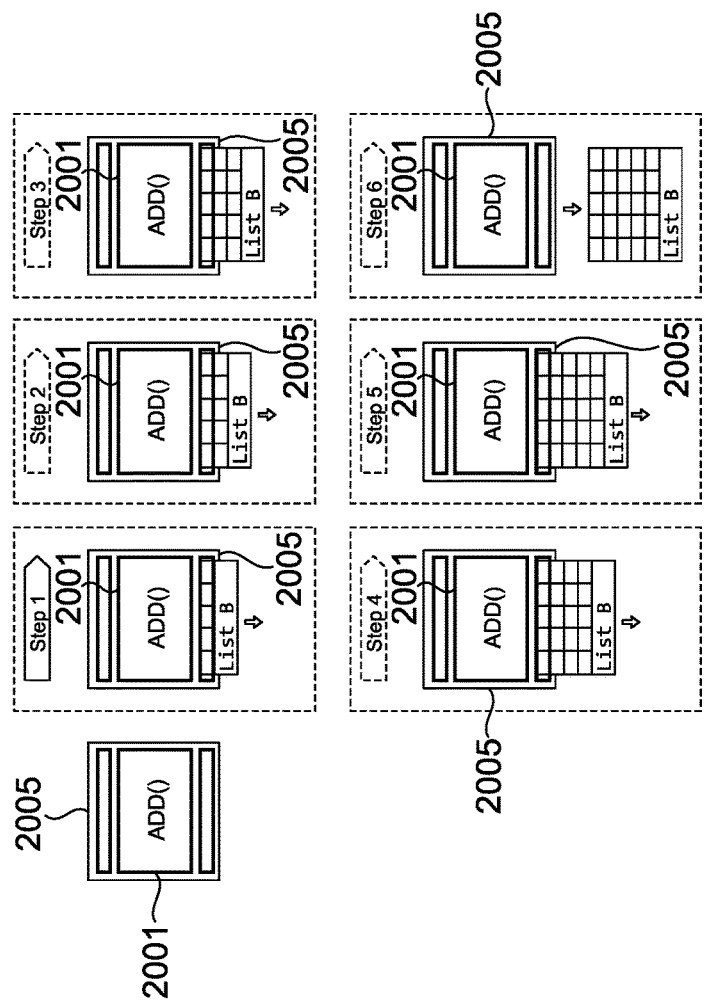
FIG. 25 shows five re-calculations of a further operations array before finishing performance of operations on tabular data from the input source.

FIG. 25 shows the five re-calculation cycles that would be carried out in view of the formulas in the operations array 2001 of the transactor 2005, as depicted in FIG. 24.

Figure 26:
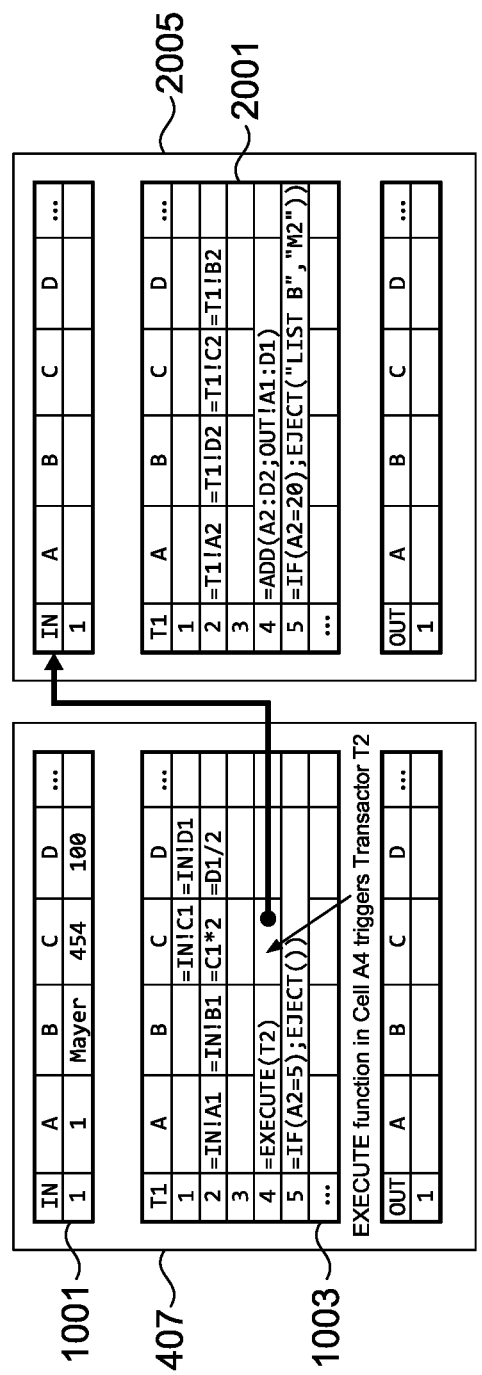
FIG. 26 shows how the execute function in one transactor triggers the ADD function in another transactor.

FIG. 26 shows an example of triggering execution of the add function.

In particular, a function in the operations array 1003 triggers re-calculation of the further operations array 2001. In this example, the function is the execute function and it is called with an identifier of the operations array 2001 as an argument. Re-calculation of the operations array 2001 will be triggered for each row of tabular data inserted into the input array 1001. Upon the completion of performance of operations on tabular data from the input source supplying tabular data to the transactor 407 and an input source supplying tabular data to the transactor 2005, the same number of rows will be provided to the output destination of the transactor 407 as are provided to the output destination of the transactor 2005. However, because the operations array 1003 has different formulas than the operations array 2001, different values will be sent to the output destination of the transactor 407 in comparison to the values sent to the output destination of the transactor 2005.

Figure 27:
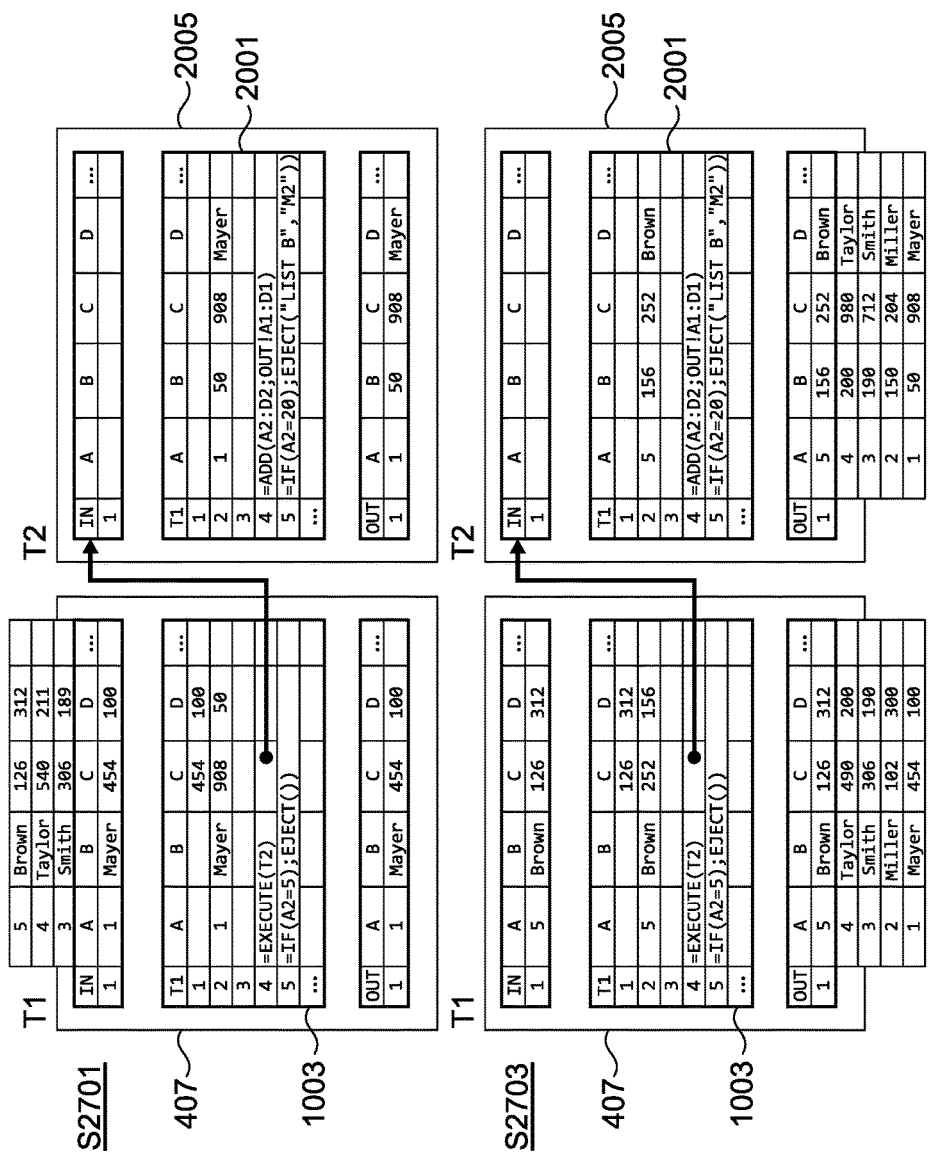
FIG. 27 illustrates performing operations on the five rows of tabular data.

FIG. 27 shows an example of the operations array 1003 triggering re-calculation of the operations array 2001. Step S2701 shows the transactor 407 and the transactor 2005 after one re-calculation has been performed or both transactors. Step S2703 shows the transactor 407 and the transactor 2005 after five re-calculations have been performed by both transactors. In both steps S2701 and S2703, rows 1 and 2 of the operations arrays 1003 and 2001 show values corresponding to the contents shown in FIG. 26. In particular, rows 1 and 2 of the operations array 1003 of FIG. 26 and row 2 of the operations array 2001 of FIG. 26 include formulas. The values of these formulas are shown in rows 1 and of the operations array 1003 of FIG. 27 and row 2 of the operations array 2001 of FIG. 27, respectively.

Figure 28:
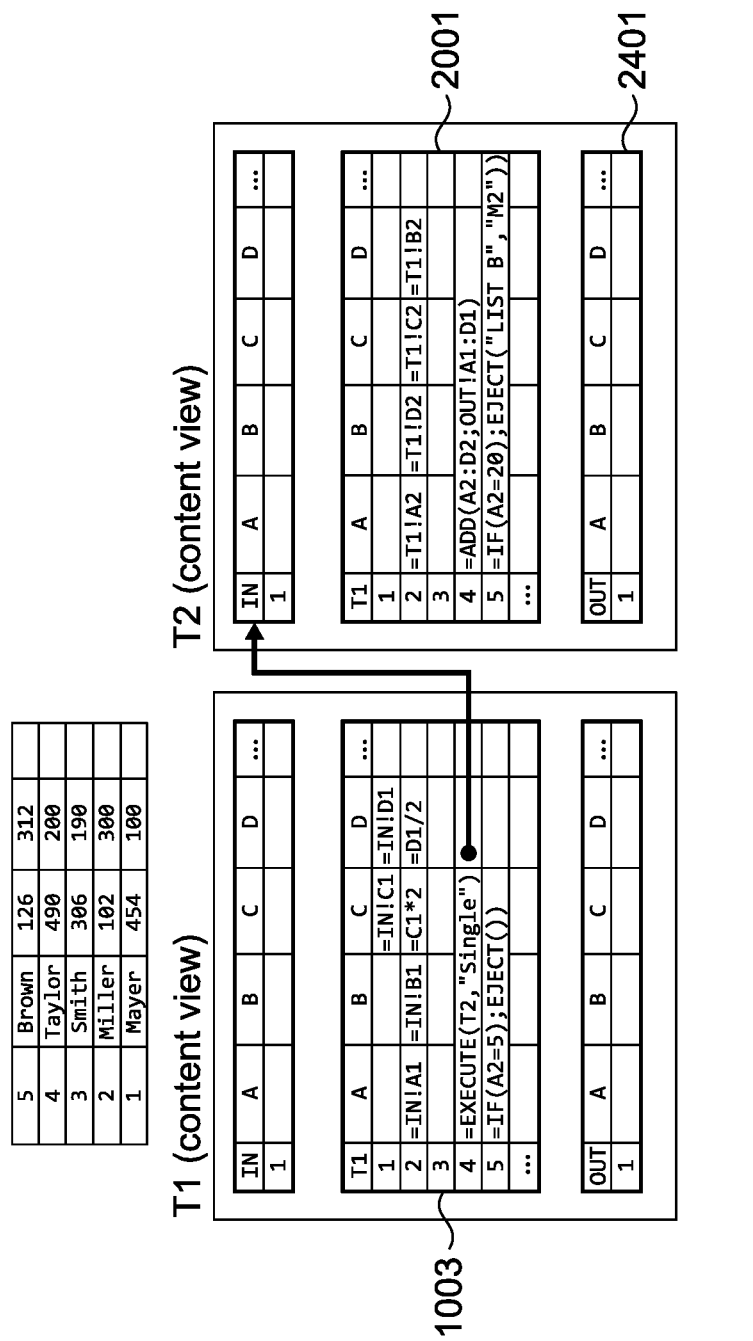
FIG. 28 shows a content view of cells of two transactors before performing operations on the five rows of tabular data.

FIG. 28 shows another example of use of the execute function to trigger re-calculation of the operations array 2001 from the operations array 1003. In addition, use of the add function in the operations array 2001 causes a new row to be inserted in the output destination before copying the output array 2401 to the output destination.

Figure 29:
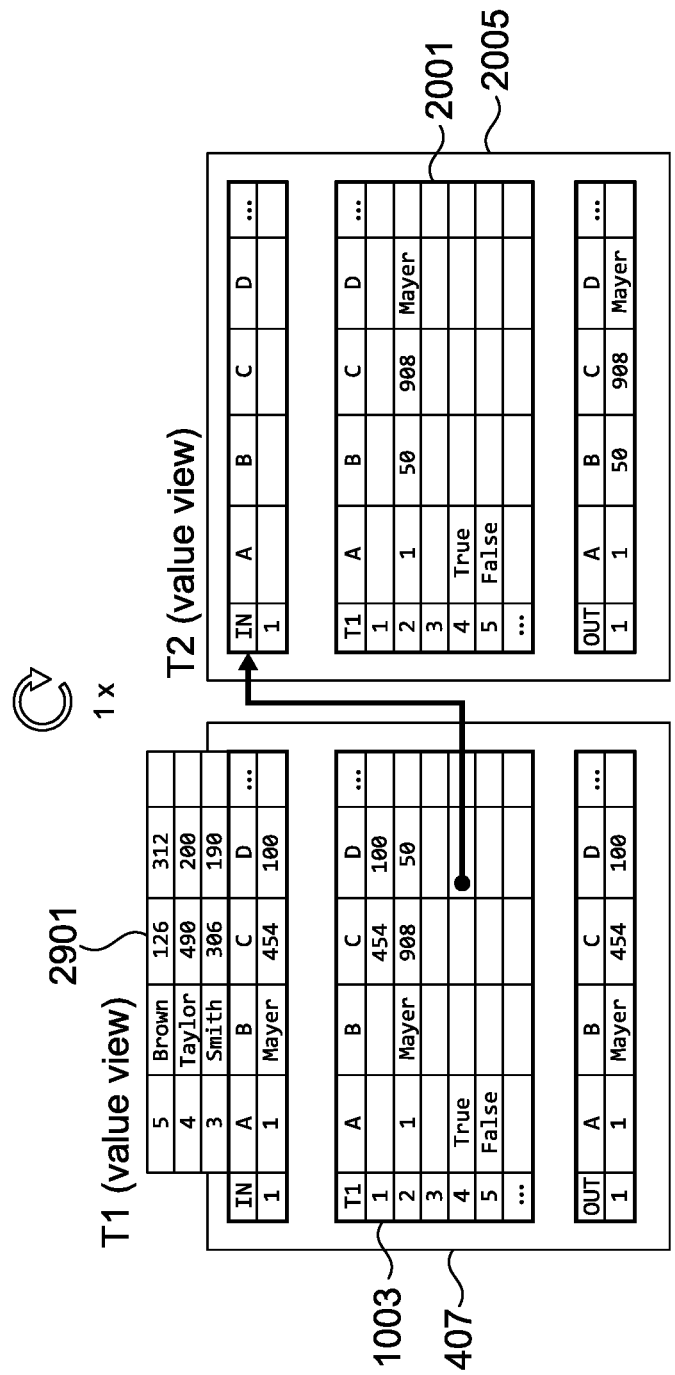
FIG. 29 shows a value view of the two transactors after performing operations on one row out of the five rows of tabular data.

FIG. 29 shows processing of a list by the transactors 407 and 2005. The operations array 1003 includes the formulas depicted in FIG. 29. Similarly, the operations array 2001 includes the formulas depicted in FIG. 26.

FIG. 29 also shows the values in each cell of the operations array 1003 and the operations array 2001 after processing one row of a list 2901 and evaluating the formulas shown in FIG. 26.

Figure 30:
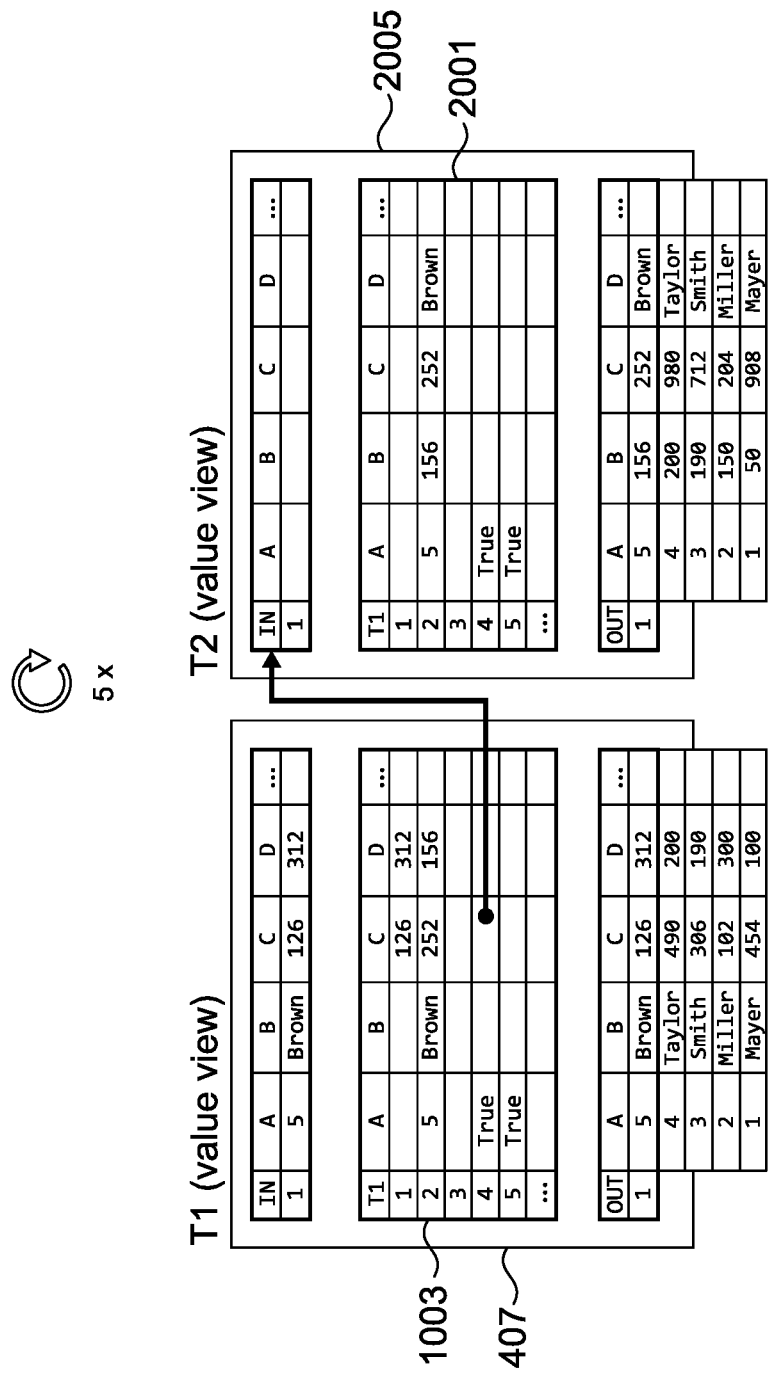
FIG. 30 shows the value view of the two transactors after performing operations on the five rows of tabular data.

FIG. 30 shows the values in each cell of the operations array 1003 and the operations array 2001 after processing five rows of the list 2901. Each cell of the operations array 1003 contains the formulas depicted in FIG. 26. Similarly, each cell of the operations array 2001 contains the formulas depicted in FIG. 26. FIG. 30 shows the values of each of the formulas depicted in FIG. 26 after five re-calculation cycles.

Figure 31:
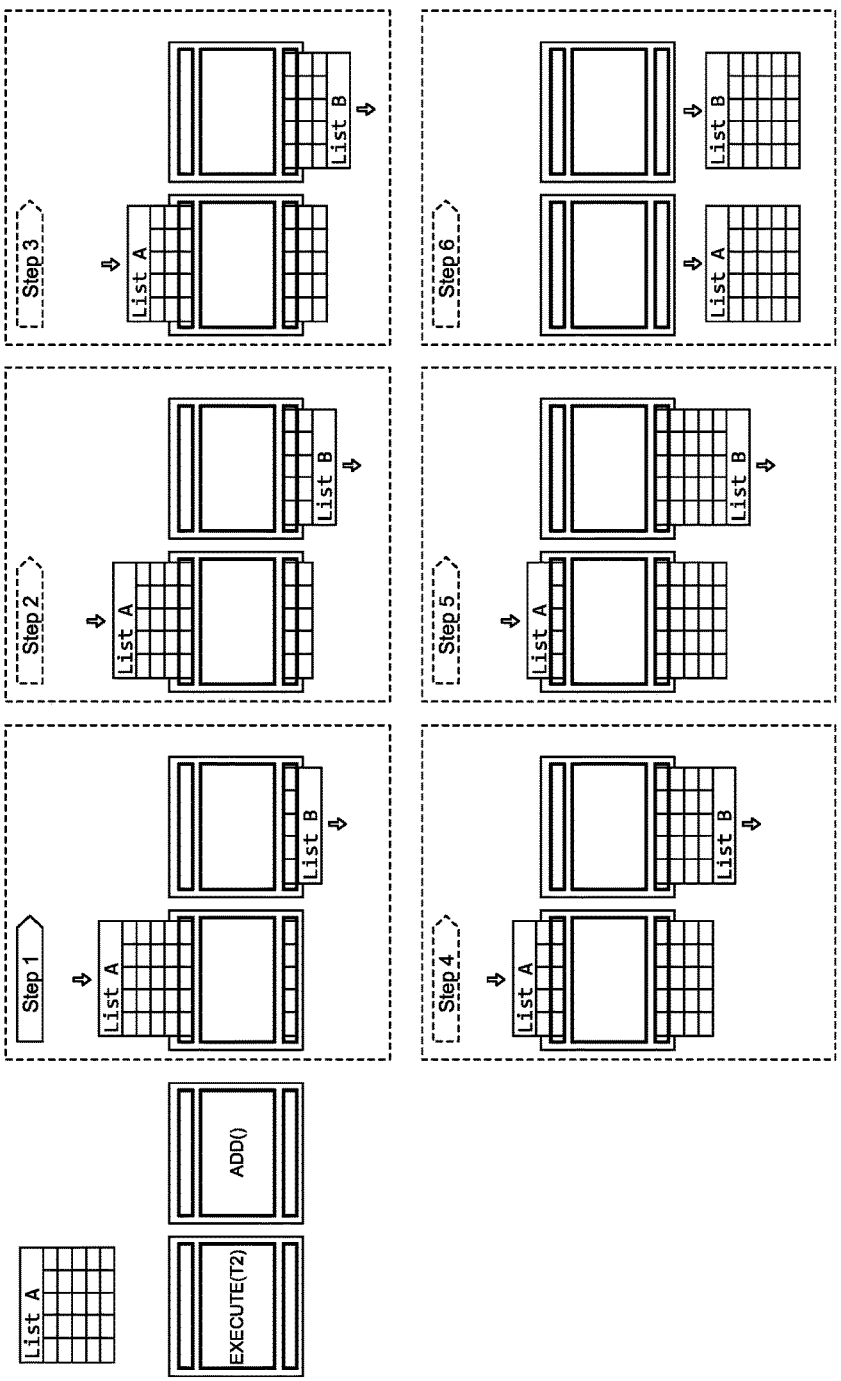
FIG. 31 shows five re-calculation cycles of the two transactors when performing operations on the five rows of tabular data.

FIG. 31 shows the results of five re-calculation cycles and an ejection step after the fifth recalculation cycle. In particular, FIG. 31 shows the steps of applying the formulas depicted in the operations array 1003 and the operations array 2001 as shown in FIG. 26.

Figure 32:
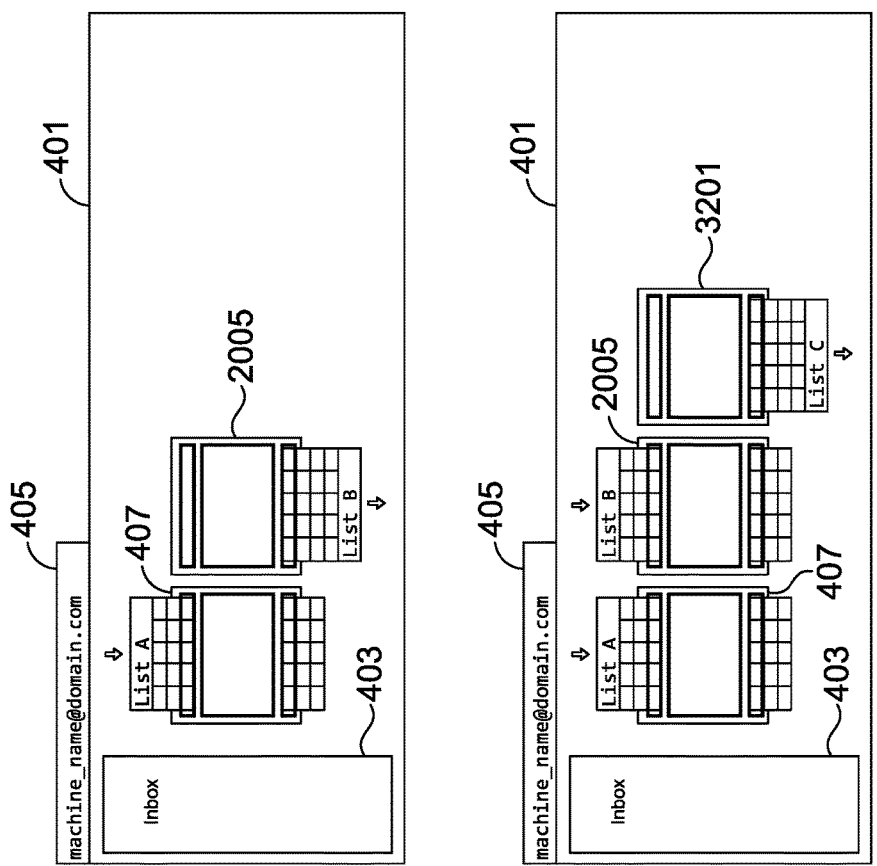
FIG. 32 shows the machine with two transactors and with three transactors when performing operations on tabular data.

FIG. 32 shows a combination of multiple transactors in the machine 401. The machine 401 may be a device capable of detecting an event and generating serialized event data in response to the event.

In one example the transactor 407 and the transactor 2005 are combined in the machine 401. In a further example, the transactor 407, the transactor 2005, and a transactor 3201 are combined in the machine 401. Processing in the transactor 2005 may be triggered by calling the execute function from the transactor 407. Similarly, processing in the transactor 3201 may be triggered by use of the execute function in the transactor 2005.

In the context of performing operations on tabular data, each call to the execute function may be made with the "single" argument, as discussed in connection with FIG. 20.

Figure 33:
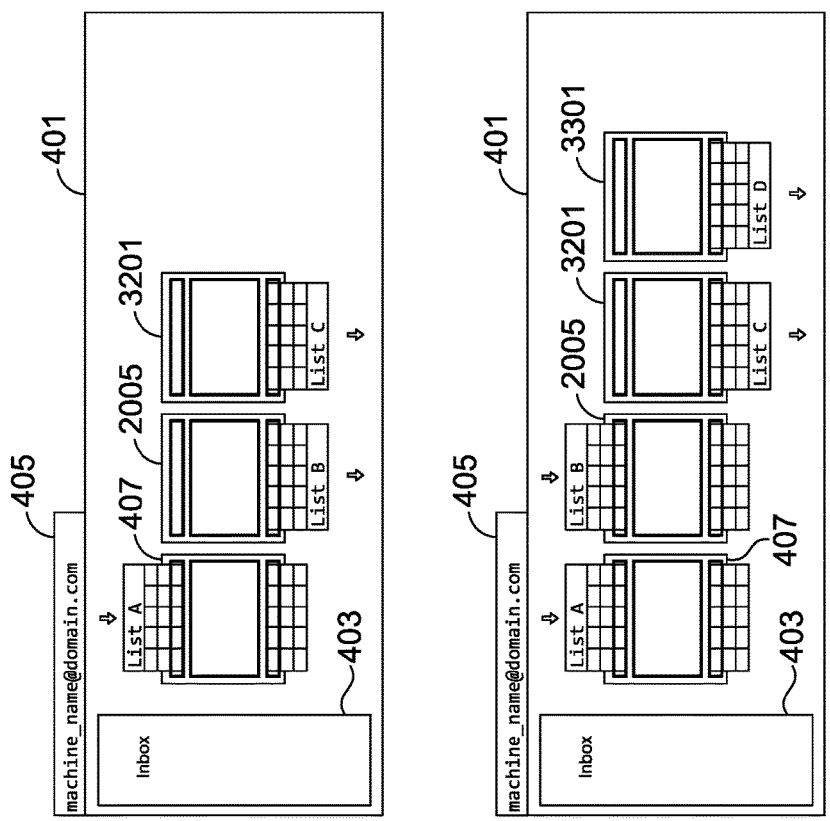
FIG. 33 shows another way of combining three transactors and a way of combining four transactors when performing operations on tabular data.

FIG. 33 shows two examples of the machine 401 processing multiple transactors. In the first example, three transactors are being processed. In particular, the transactor 407, the transactor 2005, and the transactor 3201 are being processed. In the first example, the transactor 407 is reading a list while triggering the transactors 2005 and 3201 in parallel, each of which write two separate lists.

In the second example, four transactors are processing lists within the machine 401. In particular, in the second example, the transactor 407, the transactor 2005, the transactor 3201, and a transactor 3301 are each processing separate lists.

Processing in the transactors to the right of the transactor 407 may be triggered via an execute function in the previous transactor. As in the examples of FIG. 32, when the examples of FIG. 33 are carried out in the context of performing operations on tabular data, the execute function may be called with the "single" argument, as discussed in connection with FIG. 20.

Figure 34:
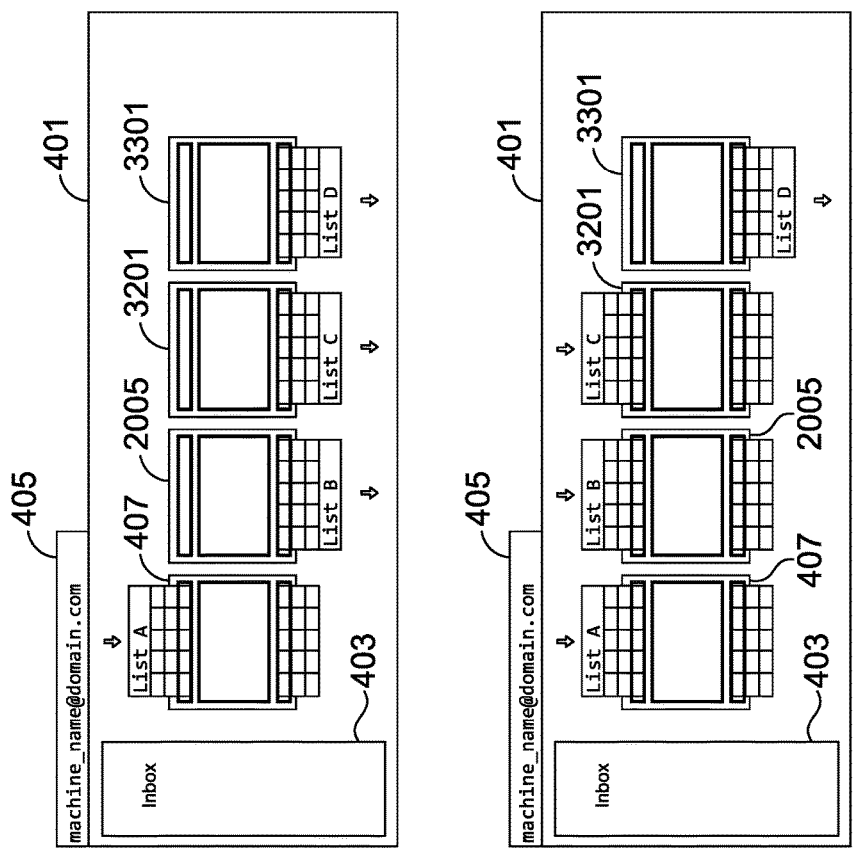
FIG. 34 shows two other ways of combining four transactors when performing operations on tabular data.

FIG. 34 shows two examples of the machine 401 including four transactors. Processing in one of the transactors, other than the transactor 407, may be triggered by the execute function in one of the previous transactors. In particular, processing in the transactor 2005 may be triggered by the execute function in the transactor 407. Similarly, processing in the transaction 3201 may be triggered by the execute function in the transactor 2005. Further, processing in the transactor 3301, may be triggered by the execute function in the transactor 3201.

When these examples are carried out in the context of performing operations on tabular data, the execute function may be called with the "single" argument (i.e., the word "single" passed as an argument to the function), as discussed above with respect to the processing mode parameter.

FIGS. 35 to 38 show processing to modify the content of a list according to an example. Similar modifications may be made when performing operations on serialized event data that is not tabular data.

Figure 35:
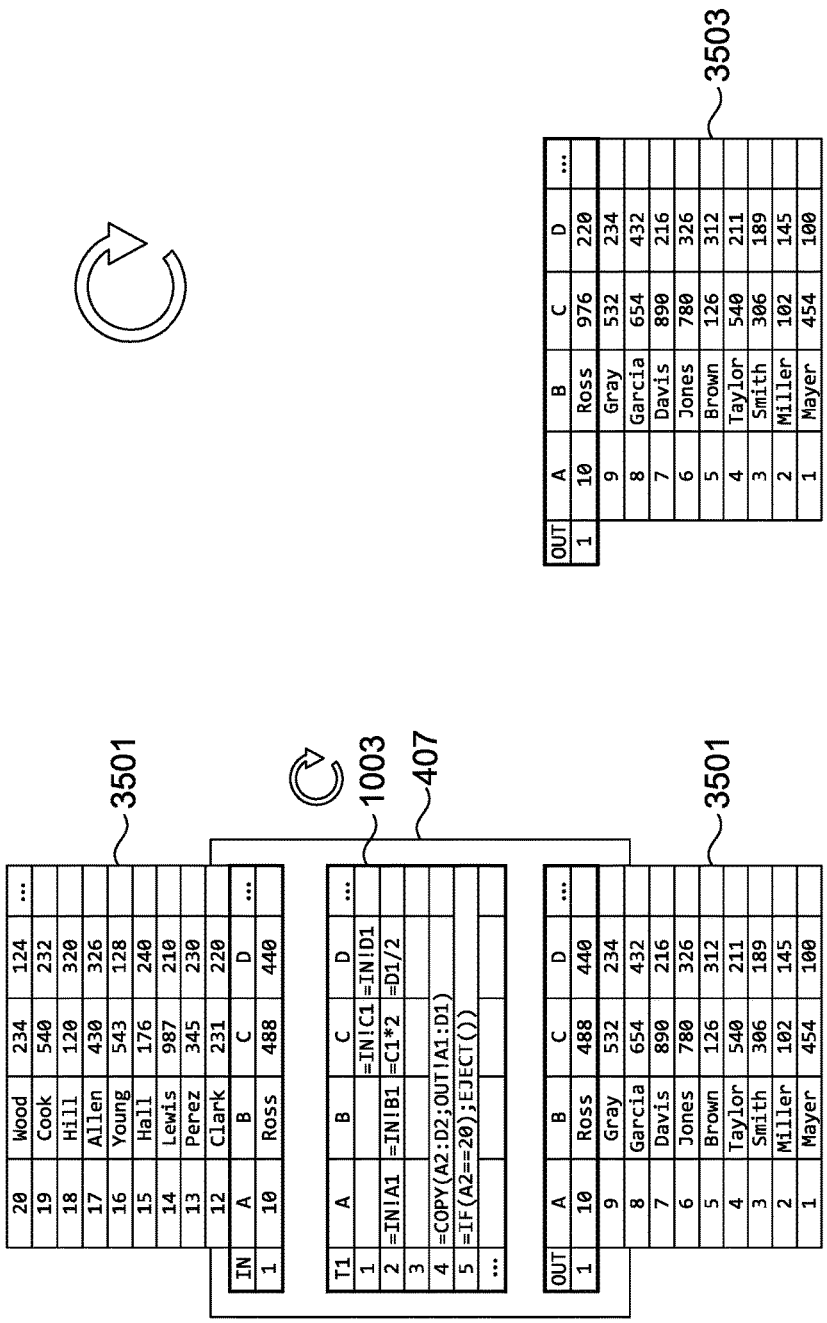
FIG. 35 shows a first example of interactively performing operations on tabular data.

FIG. 35 shows the transactor 407 and the operations array 1003. The operations array 1003 includes formulas for processing a list 3501. According to the example, the input source is the same as the output destination. In particular, the list 3501 may be received from the input source (e.g., a machine of a refrigerator), operations are performed on the list 3501, and then the list 3501 is sent to the output destination (i.e., the machine of the refrigerator). Accordingly, carrying out the example of FIGS. 35 to 38 will result in the list 3501 having modified values.

The formulas in the operations array 1003 will swap the values in the third and fourth columns of the list 3501. In addition, the formulas in the operations array 1003 will cause the values in the third column of the list 3501 to be multiplied by two and the values in the fourth column of the list 3501 to be divided by two. This is shown in the first row of intermediate list 3503. After all the rows of tabular data in the list 3501 have been processed, i.e., after operations have been performed on the rows of tabular data in the list 3501 according to the formulas received as input in the operations array, a finished list will be ejected from the transactor 407 and processing will stop.

Figure 36:
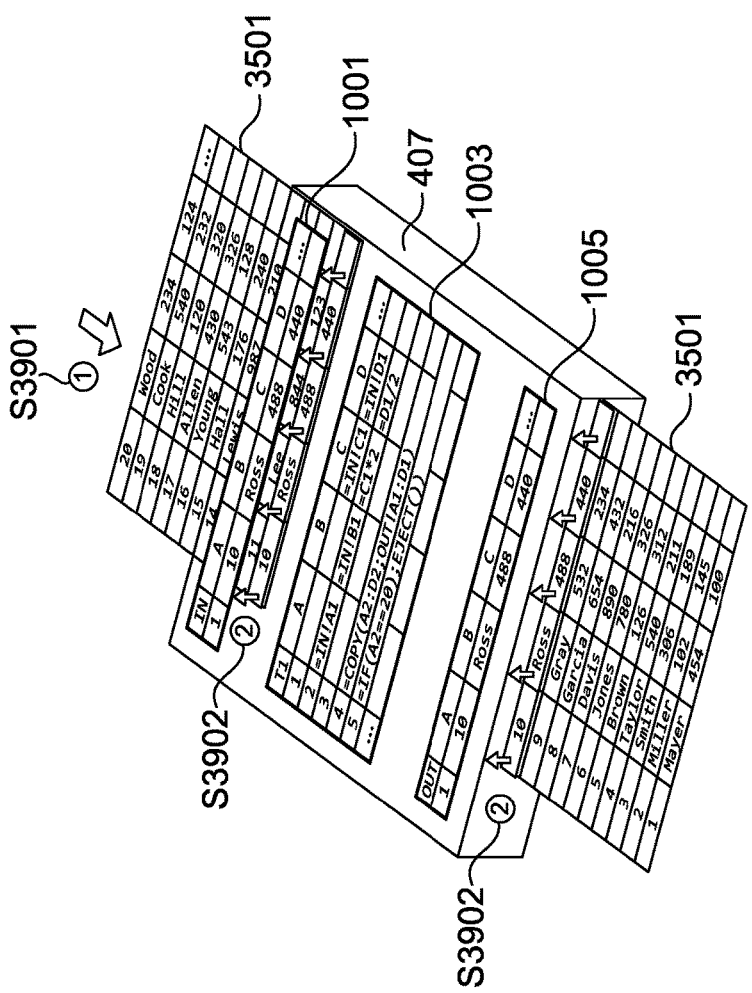
FIG. 36 continues the first example of interactively performing operations on tabular data.

FIG. 36 shows steps according to the example. In particular, at step S3901, a row of tabular data is taken from the list 3501. At step S3902, the row of tabular data from the list 3501 may be inserted into the input array 1001. Further, at step S3902, the row of tabular data from the list 3501 that was inserted into the input array 1001 may also be inserted into the output array 1005.

Figure 37:
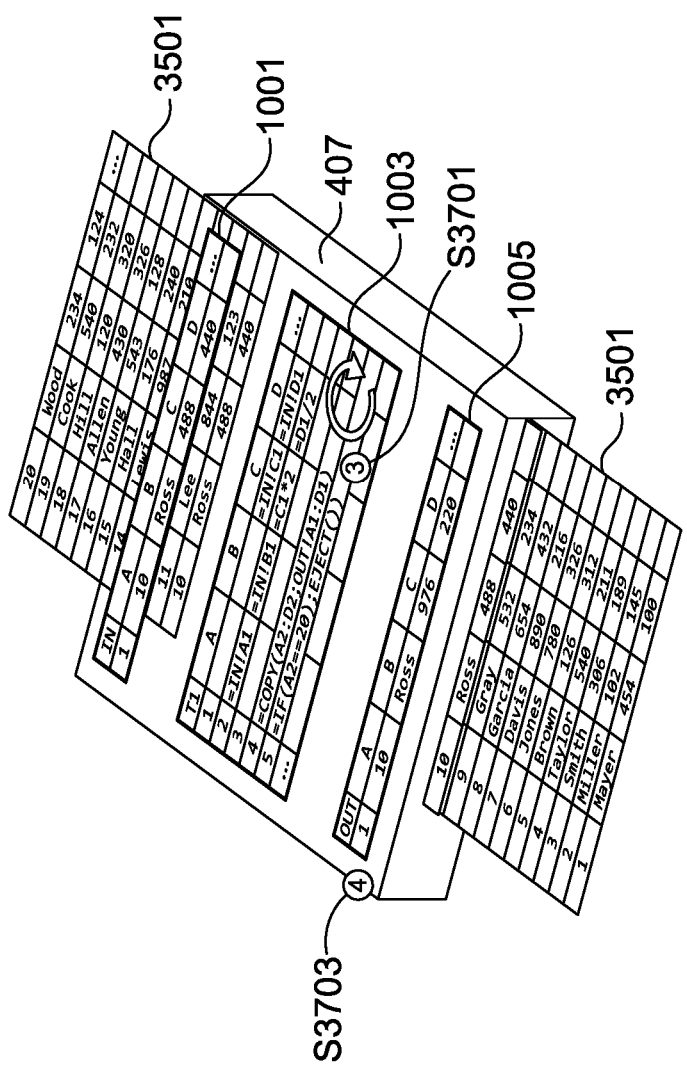
FIG. 37 continues the first example of interactively performing operations on tabular data.

FIG. 37 shows further steps according to the example. In particular, at step S3701, a re-calculation of the operations array 1003 is performed. At step S3703, the copy function in the operations array 1003 causes determined values in the second row of the operations array 1003 to be stored in cells of the output array 1005.

Figure 38:
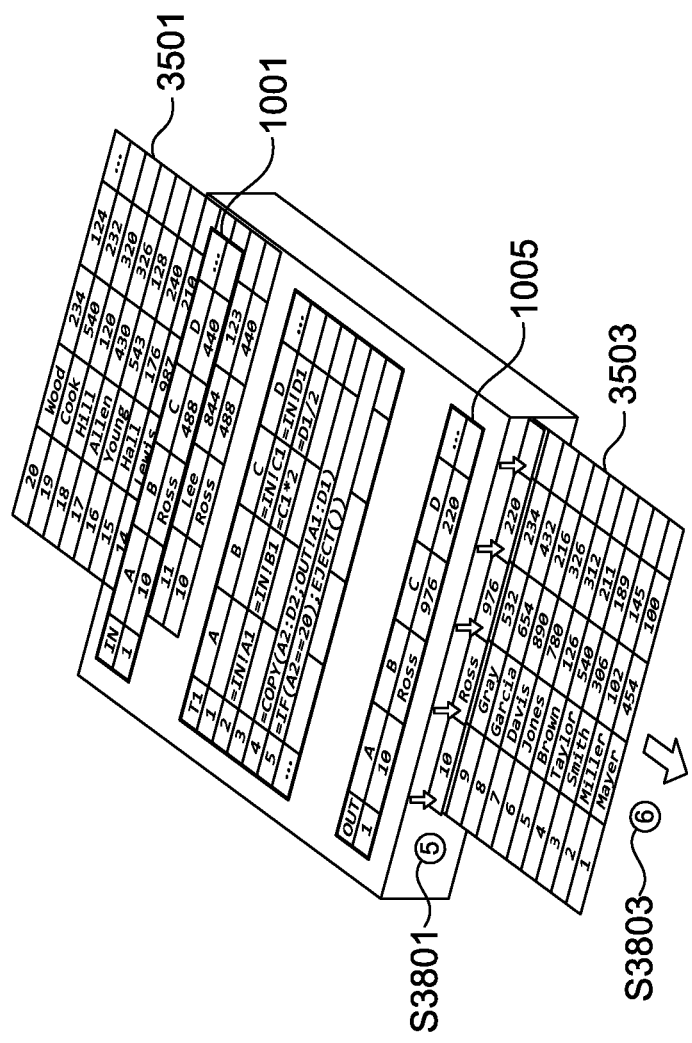
FIG. 38 continues the first example of interactively performing operations on tabular data.

FIG. 38 shows further steps according to the example. At step S3801, the values stored in the output array 1005 are copied to the output destination. Accordingly, the values stored in the output array 1005 are copied to the intermediate list 3503, which may be copied to or sent to the output destination after it is ejected. After step S3803, it is possible to insert the next row of the list 3501 into the input array 1001.

Figure 39:
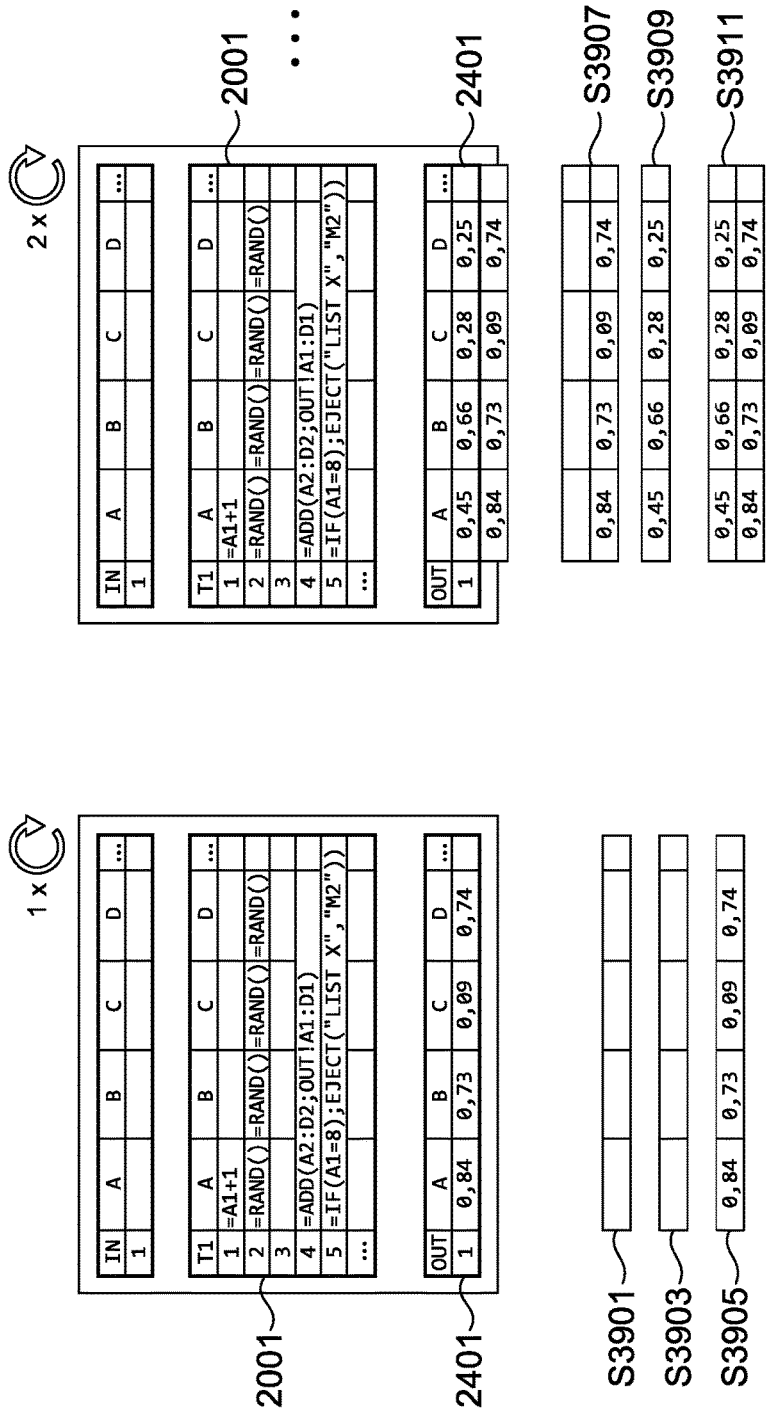
FIG. 39 shows an example of generating an output list.
Figure 40:
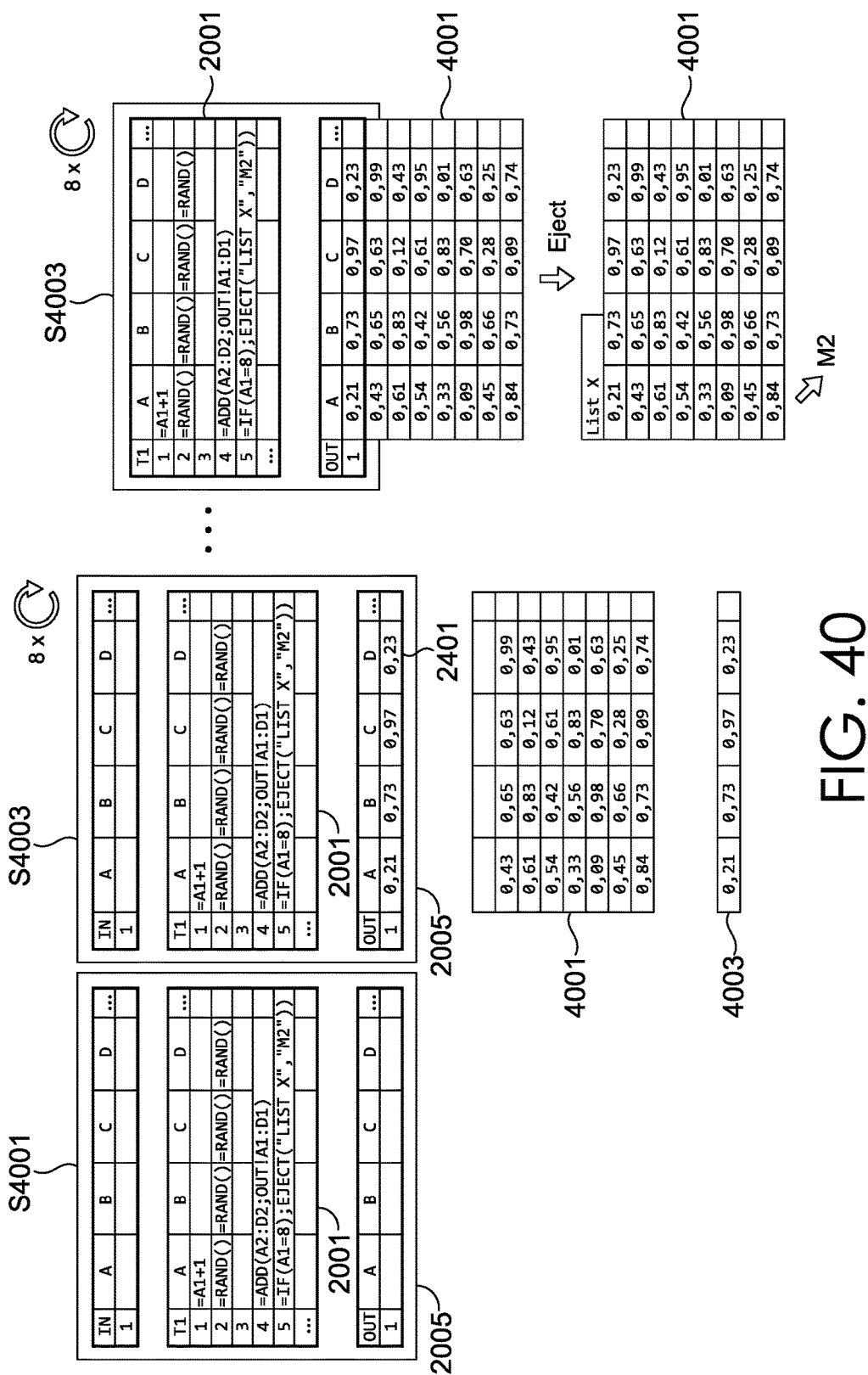
FIG. 40 continues the example of generating the output list and shows ejection of the output list.
Figure 41:
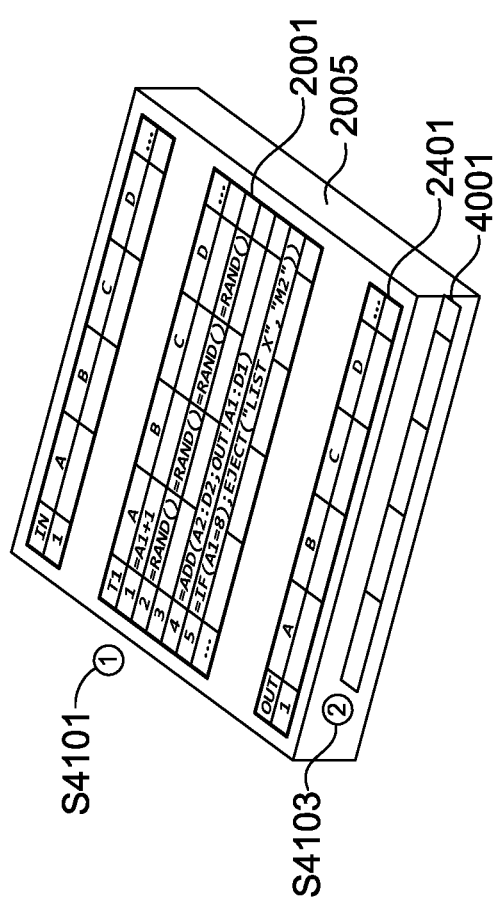
FIG. 41 shows a second example of interactively performing operations on tabular data.

FIGS. 39 to 41 show a second example of interactively performing operations on tabular data. The functions discussed below (e.g., arithmetic functions) may also be used in performing operations on serialized event data that is not tabular data.

FIG. 39 shows re-calculation of the operations array 1003. Because the add function is included in the operations array 1003, step S3901 shows insertion of a new row at the output list. At step S3905, values from the output array 1005 are copied to the output list.

After a second re-calculation of the operations array 1003, step S3907 shows a new row being added to the output list. Step S3909 shows the values from the output array being copied to the new row at the output list. Step S3911 shows the output list after the second re-calculation of the operations array 1003.

FIG. 40 shows results of performance of further operations on tabular data according to the example.

Step S4001 shows formulas initially present as contents of the operations array 1003. Step S4003 shows the transactor 2005 after eight re-calculations of the operations array 1003. A list 4001 is shown as the output list. Further, an additional row 4003 is copied from the output array 1005 to the list 4001. Since the IF condition in the operations array 1003 is met at step S4003, the output list 4001 is ejected at step S4003. FIG. 40 also shows that the list 4001 is sent to machine "M2". Machine "M2" may be considered the output destination. The sending of the list 4001 to the machine "M2" is triggered by the second argument to the eject function in the operations array 1003.

FIG. 41 shows the first steps of the example of FIGS. 39 to 48. According to the example, the input array is part of the operations array 2001. In particular, the input array is the second row of the operations array 2001. Further, although the output array 2401 is shown as being separate from the operations array 2001, it is possible that the output array is part of the operations array 2001. According to the example, tabular data is received from an input source. In the example, the input source is a random number generator. Accordingly, the tabular data is received as a row of random numbers. Input received as formulas in other cells of the operations array 2001 describes operations to perform on the input array. At step S4101, before any addition operation is performed, cell "A1" of the operations array 2001 evaluates to "0".

At step S4103, no output is shown in the output array 2401.

Figure 42:
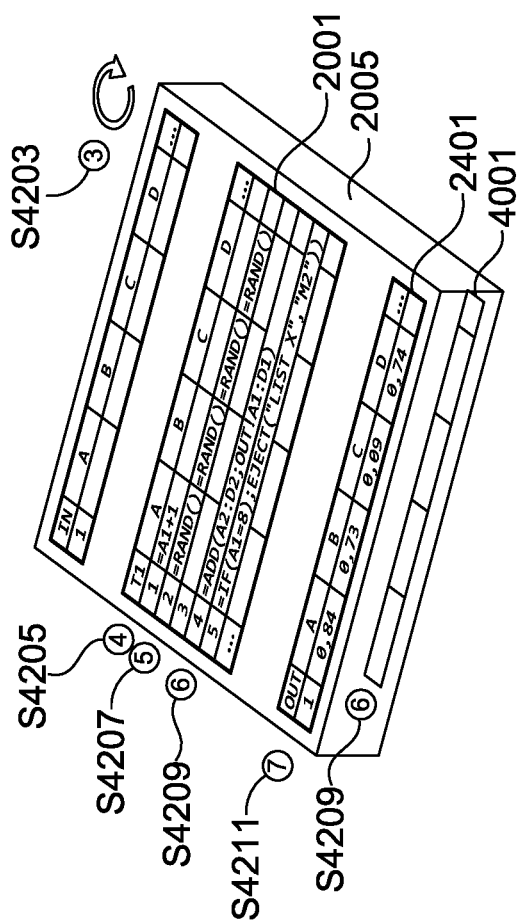
FIG. 42 continues the second example of interactively performing operations on tabular data.

FIG. 42 shows further steps according to the example. In particular, step S4203 follows step S4103. At step S4203, re-calculation of the operations array 2001 is triggered. The re-calculation may be triggered by user input. Other means of triggering the re-calculation, e.g., from another operations array, are also possible. At step S4205, the content of cell "A1", i.e., the formula "=A1+1", increments the value of cell "A1" of the operations array 2001 from 0 to 1.

At step S4207, the functions in cells A2:D2(i.e., the cells in row 2) generate random numbers. In other words, the functions in the cells of the input array generate random numbers. The random numbers may be considered tabular data and may be inserted into the input array. At step S4209, the add function in cell A4 of the operations array 2001 causes the creation of a new output list. The new list has one row. At step S4211, values of cells of the input array referenced by the add function are stored in cells of the output array 2401. In particular, the add function in the operations array 2001 references four cells of the input array which are also cells of the operations array 2001. The value of the cell containing the add function is determined based on the cells referenced by the add function.

Figure 43:
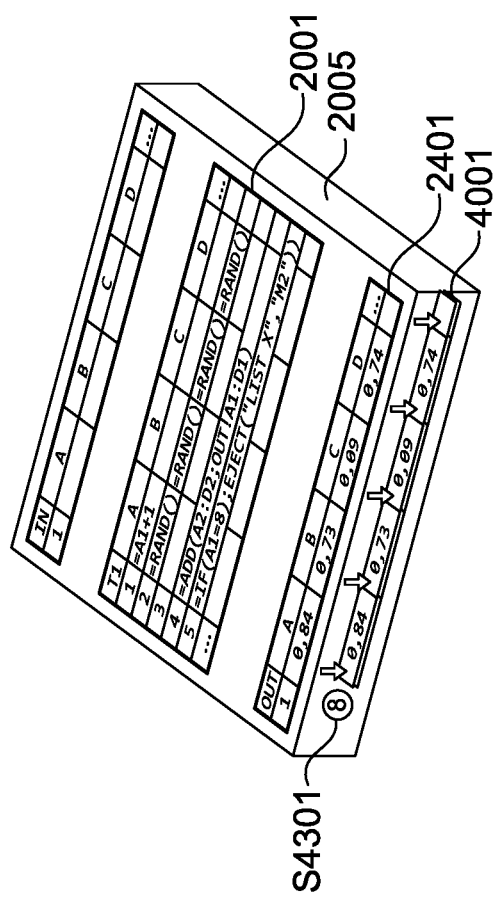
FIG. 43 continues the second example of interactively performing operations on tabular data.

FIG. 43 shows a further step according to the example.

Step S4301 is carried out after step S4211. At step S4301, the output array 2401 is copied to the output list 4001. Accordingly, copying the output array 2401 to an output destination may include copying the output array 2401 to then output list 4001 and copying the output list 4001 to the output destination.

Figure 44:
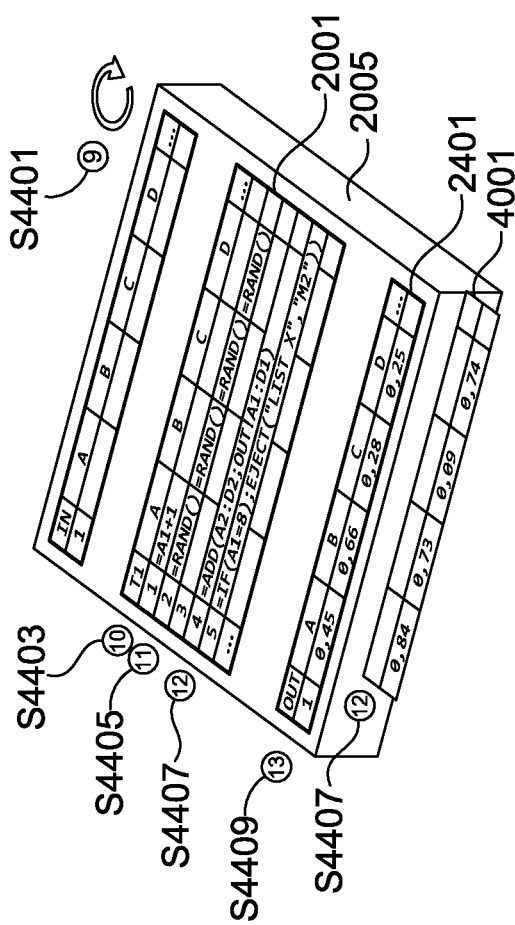
FIG. 44 continues the second example of interactively performing operations on tabular data.

FIG. 44 shows further steps according to the example. Step S4401 is carried out after step S4301. At step S4401, a re-calculation of the operations array 2001 is carried out. At step S4403, the formula in cell A1 of the operations array 2001 increments the value of cell A1 from 1 to 2 in view of the re-calculation triggered at step S4401. Step S4405 is also triggered by the re-calculation of step S4401. At step S4405, random numbers are generated in the cells of row 2 of the operations array 2001. Row 2 of the operations array 2001 is also the input array according to the example. Step S4407 is also triggered by the re-calculation of the operations array 2001 carried out at step S4401.

At step S4407, the add function in cell A4 of the operations array 2001 adds a new row to the output list 4001. At step S4409, the add function in cell A4 of the operations array 2001 copies values of cells of the input array referenced by the add function to the output array 2401. In other words, the add function stores values of cell of the input array referenced by the add function in the output array 2401.

Figure 45:
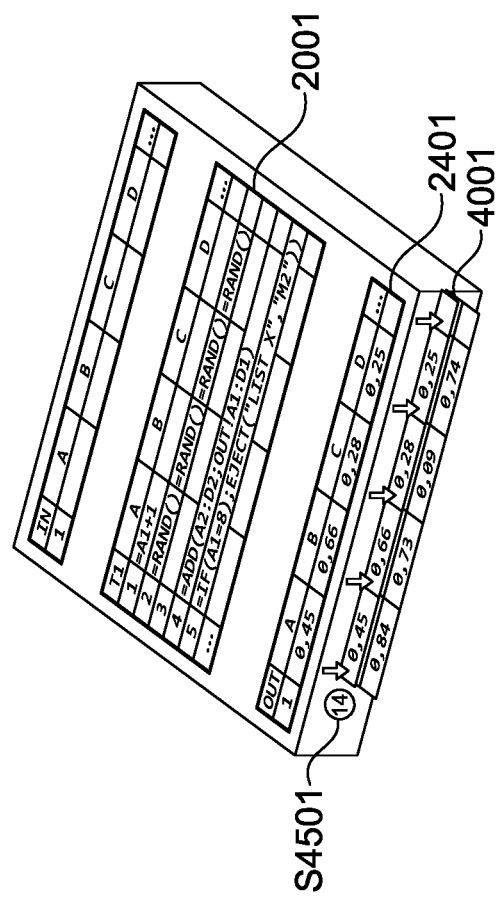
FIG. 45 continues the second example of interactively performing operations on tabular data.

FIG. 45 shows a further step according to the example. Step S4501 is carried out after step S4409. At step S4501, the output array 2401 is copied to the output list 4001. In particular, the output array 2401 is calculated to the new row of the output list 4001 created by the add function.

The steps of FIGS. 44 and 45 are repeated five more times according to the example.

Figure 46:
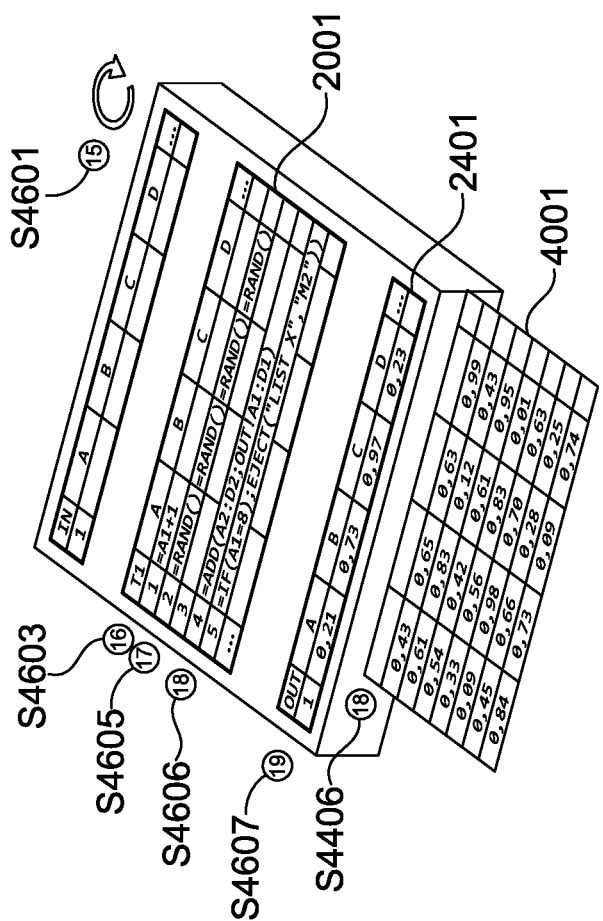
FIG. 46 continues the second example of interactively performing operations on tabular data.

FIG. 46 shows further steps according to the example. At step S4601, a re-calculation of the operations array 2001 is triggered. At step S4603, the formula in cell A1 of the operations array 2001 is incremented from 7 to 8. At step S4605, the formulas in row 2 of the operations array 2001 generate random numbers. In particular, the four cells A2:D2 generate random numbers.

At step S4606, the add function in cell A4 adds an empty new row to the output list 4001. At step S4607, execution of the add function in the operations array 2001 also causes the values of the cells of the input array referenced by the add function to be stored in the output array 2401. The values are displayed, e.g., so that the user can verify that the values are correct.

Figure 47:
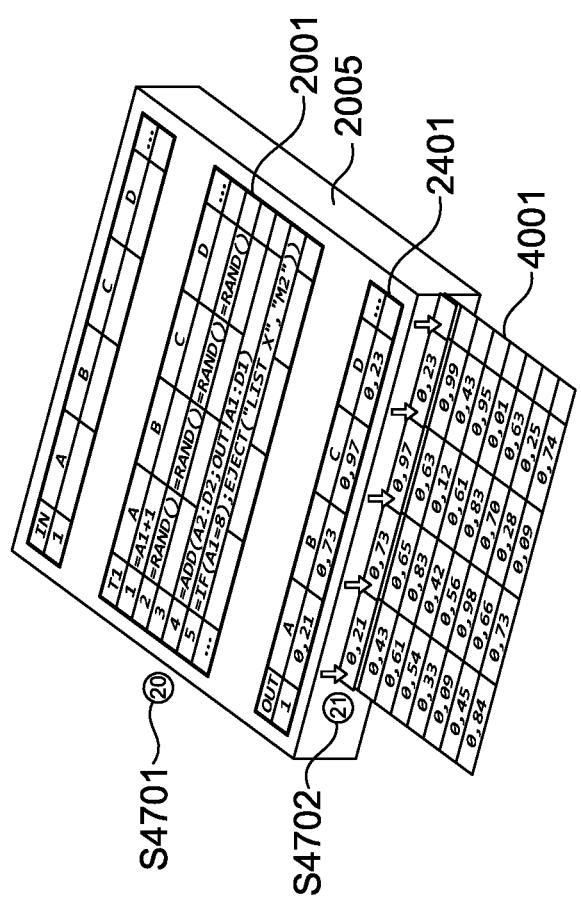
FIG. 47 continues the second example of interactively performing operations on tabular data.

FIG. 47 shows further steps carried out according to the example. At step S4701, the "if" condition in row 5 of the operations array 2001 evaluates to TRUE. Accordingly, the output list 4001 is ejected from the transactor 2005. Step S4702 shows the contents of the output array 2401 being written to the output list 4001. In particular, step S4702 shows the copying of the output array 2401 to the output list 4001. The copying may occur before the output list 4001 is ejected from the transactor 2005. Steps S4603 to S4702 may have been triggered by the re-calculation of the operations array 2001 carried out at step S4601.

Figure 48:
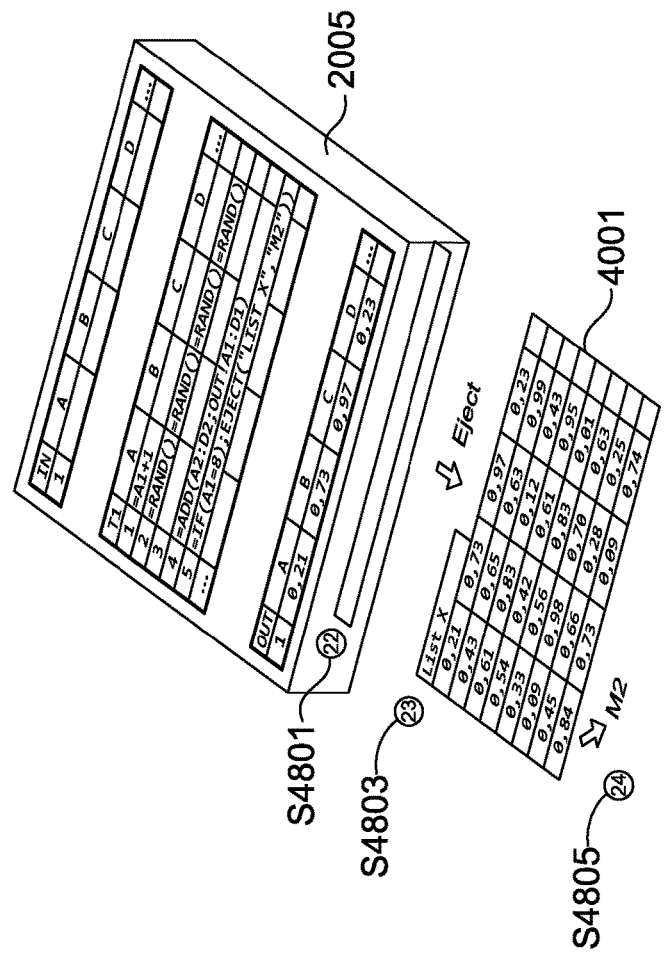
FIG. 48 shows the final steps of the second example of interactively performing operations on tabular data.

FIG. 48 shows the final steps of the example.

Step S4801 shows the transactor 2005 after completion of performance of operations on the tabular data received from the input source and execution of the eject function. At step S4803, the output list 4001 is completed. At step S4805, the list 4001 is forwarded to machine "M2". The machine M2 may be understood as the output destination. Thus, copying the output array 2401 to the output destination may include copying the output array 2401 to the output list 4001 and copying the output list 4001 to the output destination.

The list 4001 may undergo further processing at machine M2.

FIGS. 49 to 52 show yet another example of interactively performing operations on tabular data. Operations corresponding to those discussed below (e.g., arithmetic and conditional operations) may also be performed on serialized event data that is not tabular data.

Figure 49:
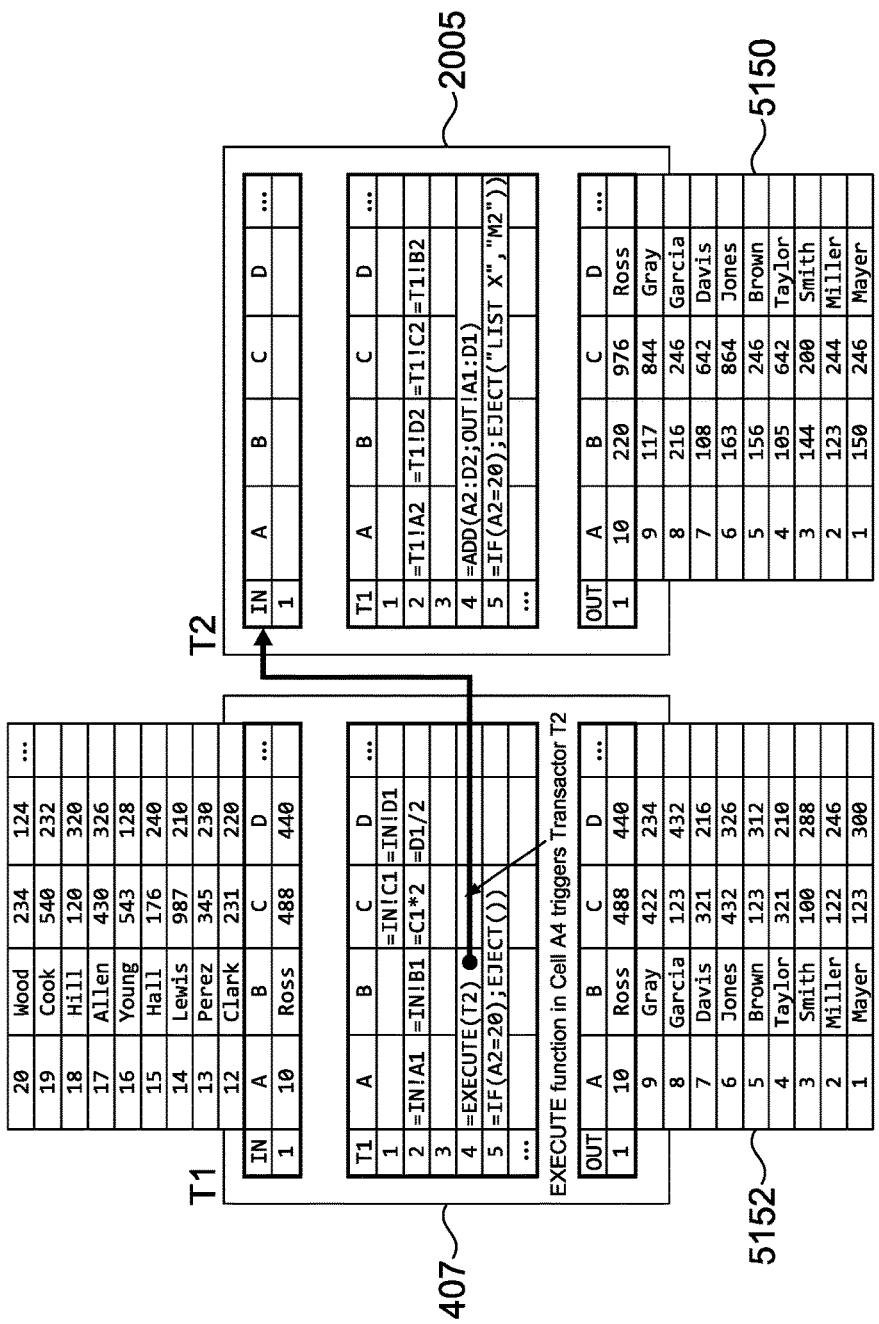
FIG. 49 shows transactors and list processing in a third example of interactively performing operations on tabular data.

FIG. 49 shows interaction between two transactors when processing lists according to the example.

Since the transactor 407 does not include the add function or the copy function, the transactor 407 does not alter its input list. In particular, tabular data in an output list 5152 is identical to the tabular data received from an input source.

In the example discussed in connection with FIGS. 49 to 52, two transactors work together to create a new list that is a modified version of a list (including tabular data) received from an input source.

Figure 50:
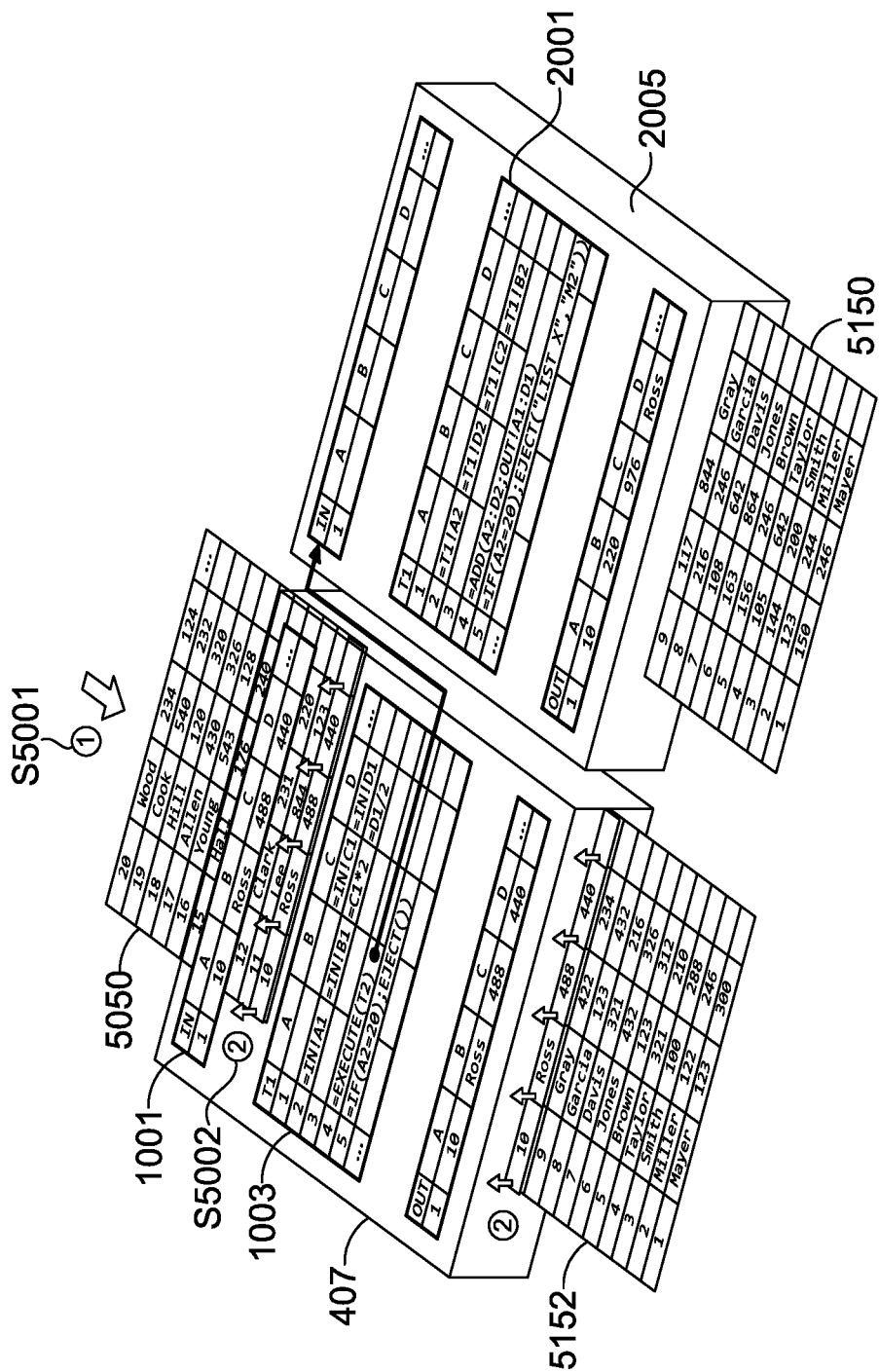
FIG. 50 shows initial steps of the third example of interactively performing operations on tabular data.

FIG. 50 shows the first steps according to the example.

At step S5001, tabular data is received from an input source. The tabular data is received in the form of an input list 5050. At step S5002, a row of the tabular data is inserted into the input array 1001.

Figure 51:
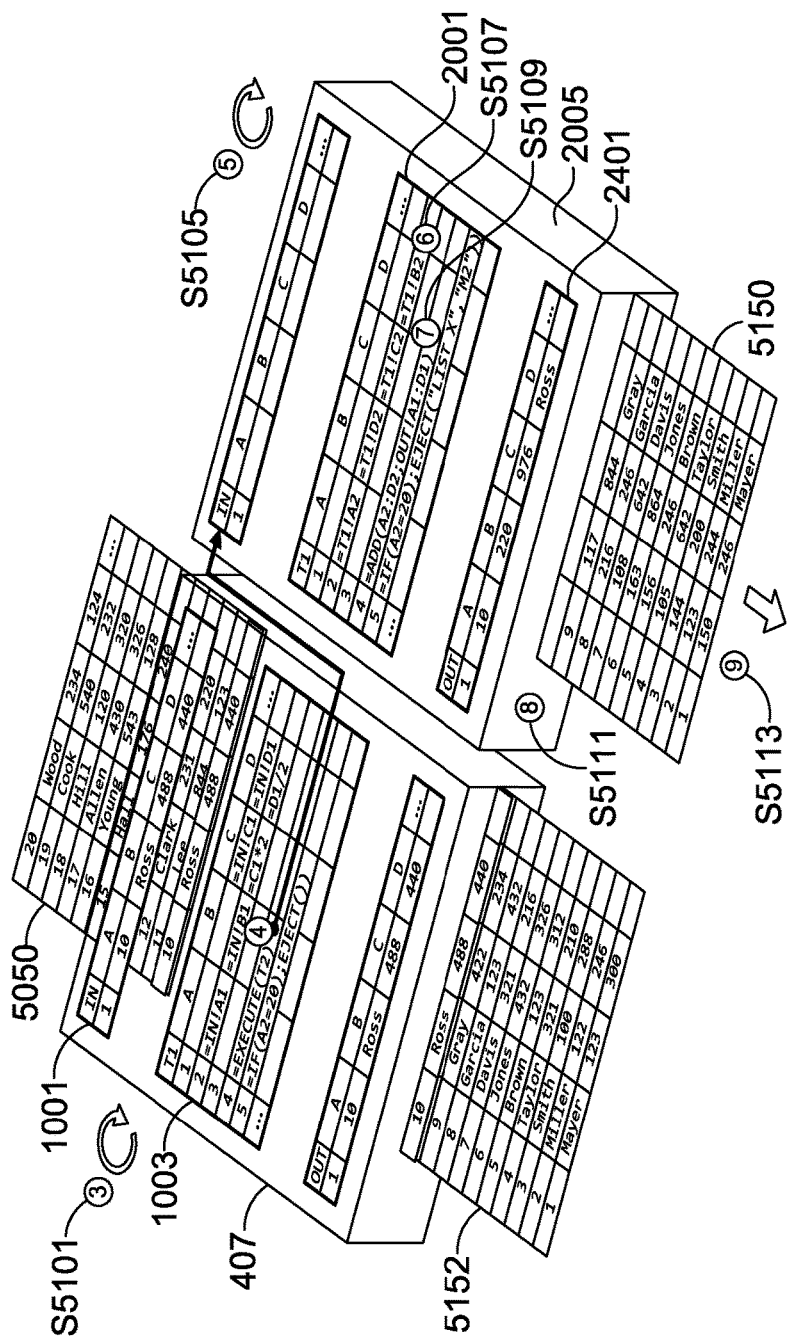
FIG. 51 continues the third example of interactively performing operations on tabular data.

FIG. 51 shows further steps according to the example.

At step S5101, insertion of a row of tabular data into the input array 1001 may trigger re-calculation of the operations array 1003. At step S5103, an execute function in cell "A∝" of the operations array 1003 may trigger re-calculation of the operations array 2001. The execute function may be carried out in view of the re-calculation of step S5101.

At step S5105 the operations array 2001 is re-calculated. Step S5105 may be understood as an example of the re-calculation of a further operations array triggered by performance of operations on the rows of tabular data, e.g., according to received input in the operations array 1003.

At step S5107, references in the operations array 2001 cause values to be copied from the operations array 1003 in response to the re-calculation in step S5105. At step S5109, an add function in the operations array 2001 causes data from the operations array 2001 to be stored in cells of the output array 2401. Step S5111 is carried out in response to the add function called in step S5109. In step S5111, a new row is added to an output list 5150 as a result of calling the add function in step S5109. Step S5113 may be carried out in preparation for inserting the output array in the output list 5150.

The output list 5152 is identical to the input list 5050 because the operations array 1003 does not include the add function or the copy function. Accordingly, data from the input list 5050 is simply copied to the output list 5152.

In contrast, because the operations array 2001 of the transactor 2005 includes the add function, the output list 5150 differs from the input list 5050.

Figure 52:
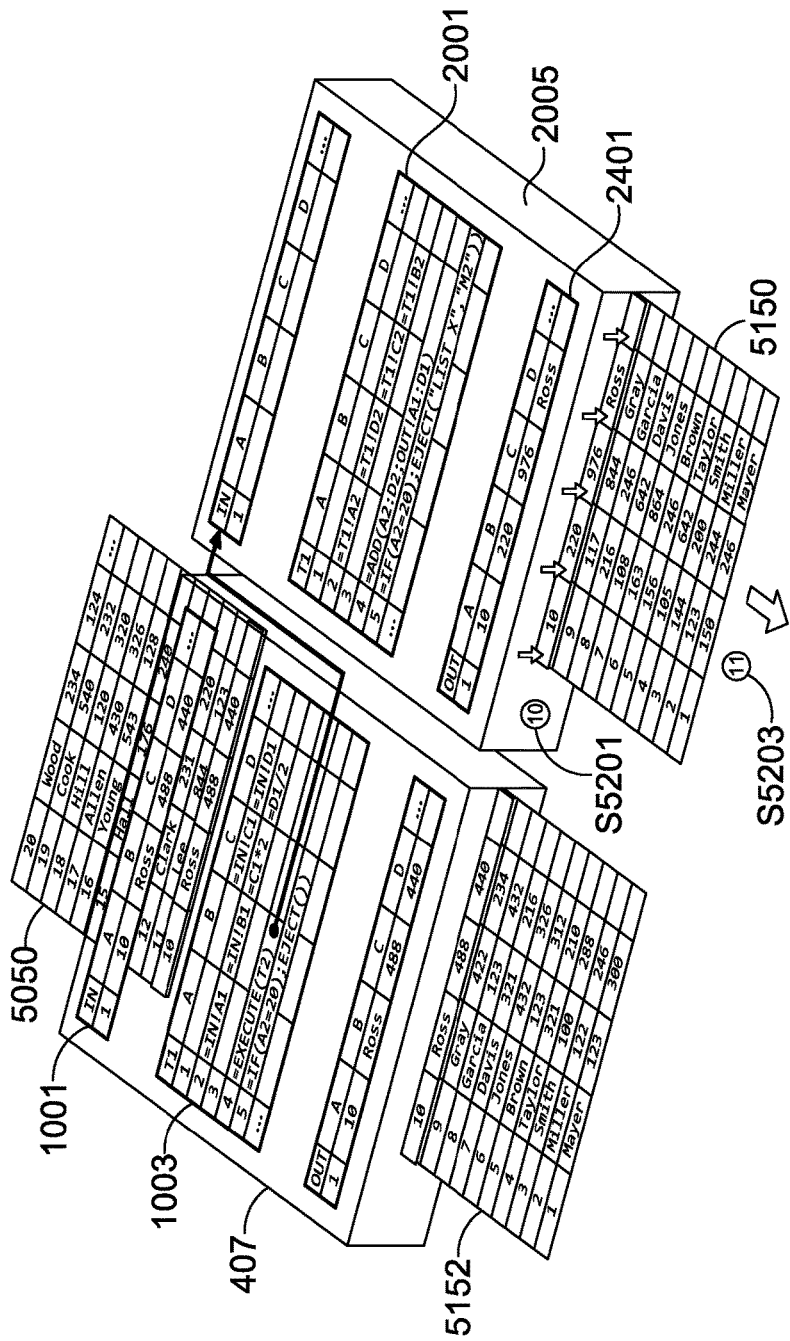
FIG. 52 shows final steps of the third example of interactively performing operations on tabular data.

FIG. 52 shows further steps of the example. Step S5201 is carried out after step S5113.

At step S5201, the output array 2401 is copied to the output list 5150. In particular, values in the output array 2401 are copied to the output list 5150. At step S5203, this processing may continue.

The output list 5152 is shown for the transactor 4007. The output 5152 includes unmodified tabular data as received from the input source.

The output list 5152 may be ejected from the transactor 407 if an IF function in the operations array 1003 evaluates to TRUE. The output list 5150 may be ejected if an IF function in the operations array 2001 evaluates to TRUE. The output list 5150 may be sent to an output destination. Accordingly, copying the output array 2401 to the output destination may include copying the output array 2401 to the output list 5150 and sending the output list 5150 to the output destination.

FIGS. 53 to 56 show an additional example of interactively performing operations on tabular data. Corresponding operations may also be performed on serialized data that is not tabular data. According to the example, two transactors operate in combination to merge content of one list into the content of a second list.

Figure 53:
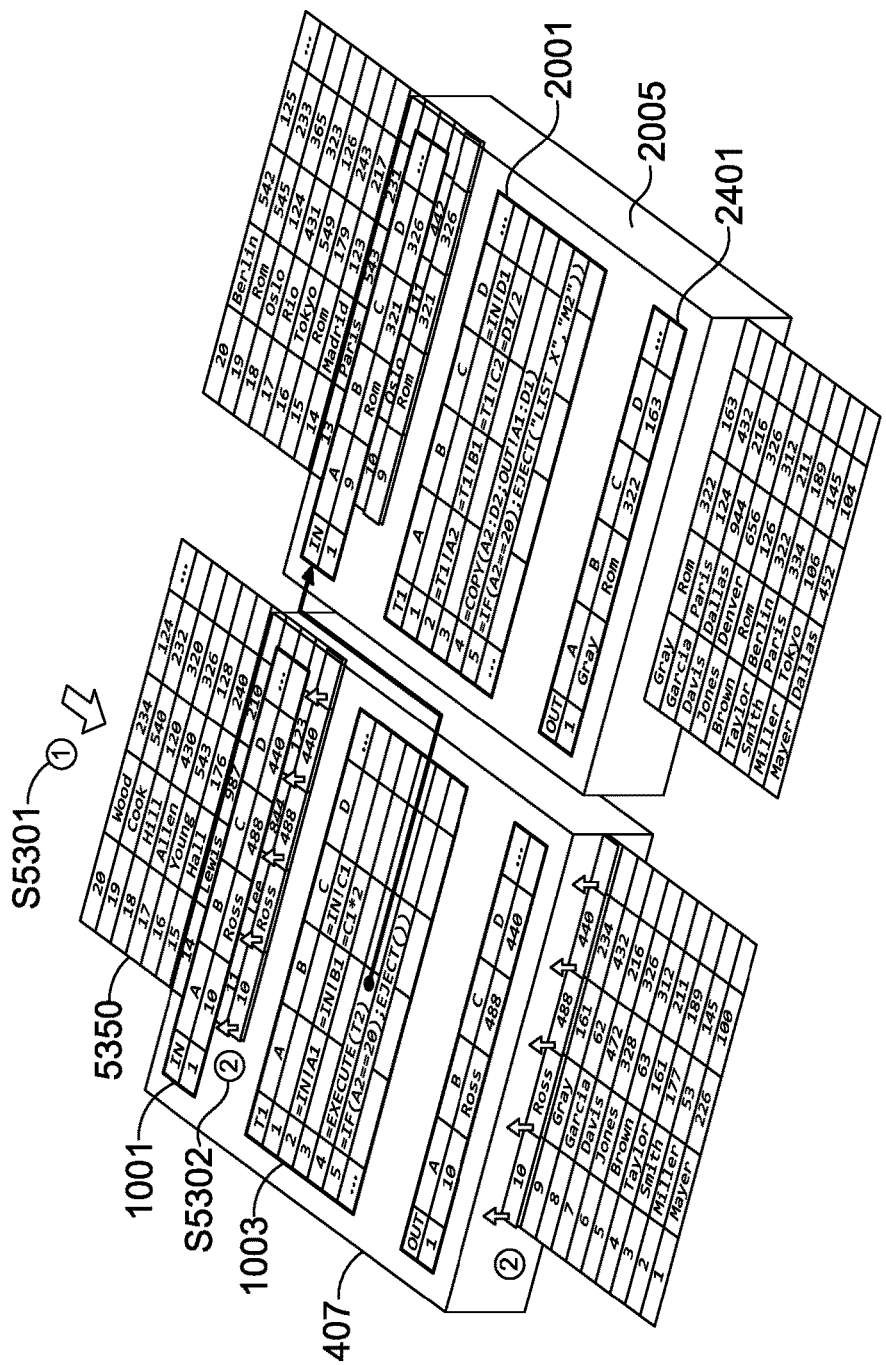
FIG. 53 shows an initial step of a fourth example of interactively performing operations on tabular data.

FIG. 53 shows the first steps according to the example. At step S5301, tabular data in the form of a list 5350 is received from an input source. At step S5302, a row of the tabular data is inserted into the input array 1001.

Figure 54:
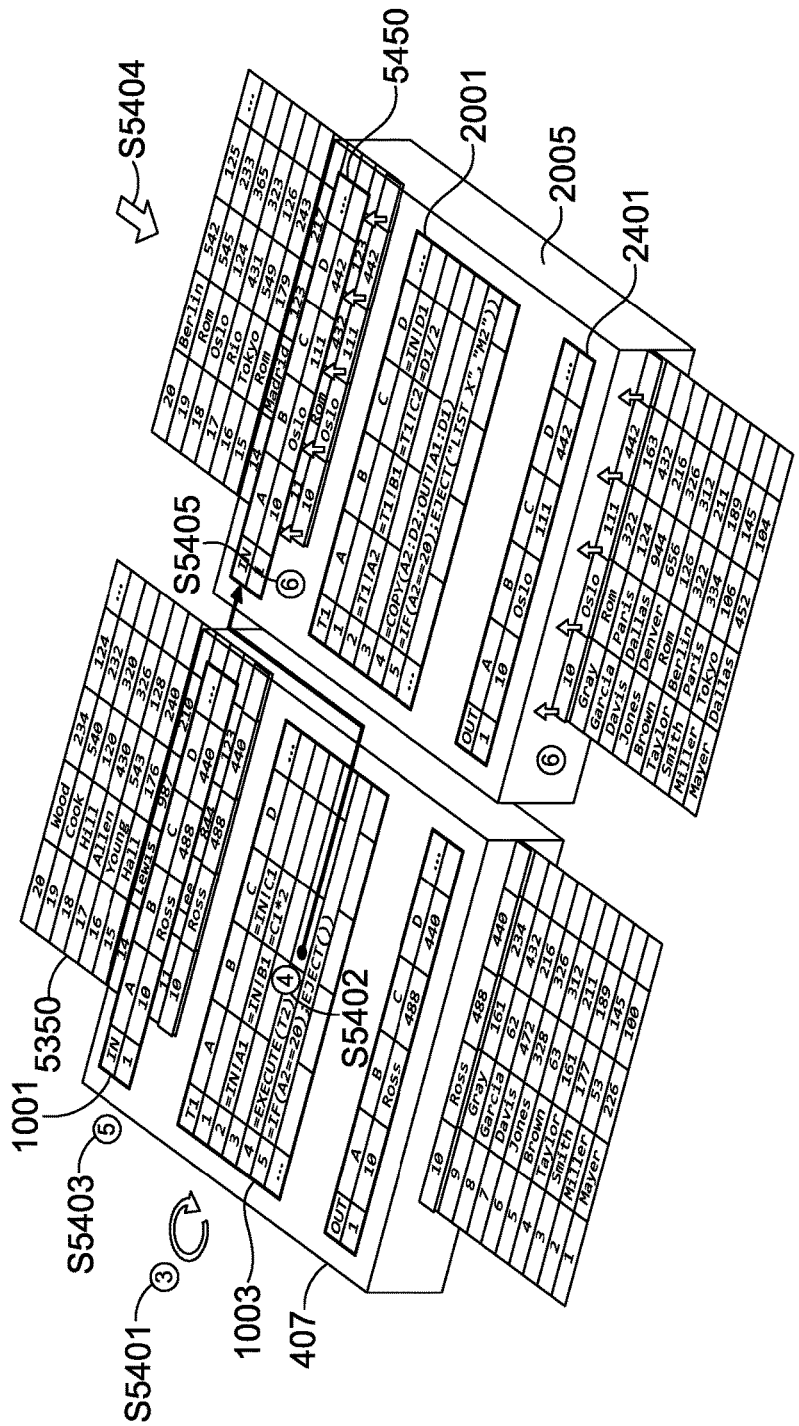
FIG. 54 continues the fourth example of interactively performing operations on tabular data.

FIG. 54 shows further steps carried out according to the example. At step S5401, insertion of the row of tabular data into the input array 1001 triggers performance of further operations on the row of tabular data. In particular, the operations array 1003 is re-calculated at step S5401. Re-calculation of the operations array 1003 causes the execute function in the operations array 1003 to be executed at step S5402. Accordingly, performance of operations on the rows of tabular data triggers re-calculation of a further operations array from the operations array 1003. The further operations array is shown as the operations array 2001.

Upon re-calculation of the operations array 2001, tabular data is received from a further input source at step S5404. At step S5405, a row of the tabular data received from the further input source is inserted into a further input array 5450 and into the output array 2401.

Figure 55:
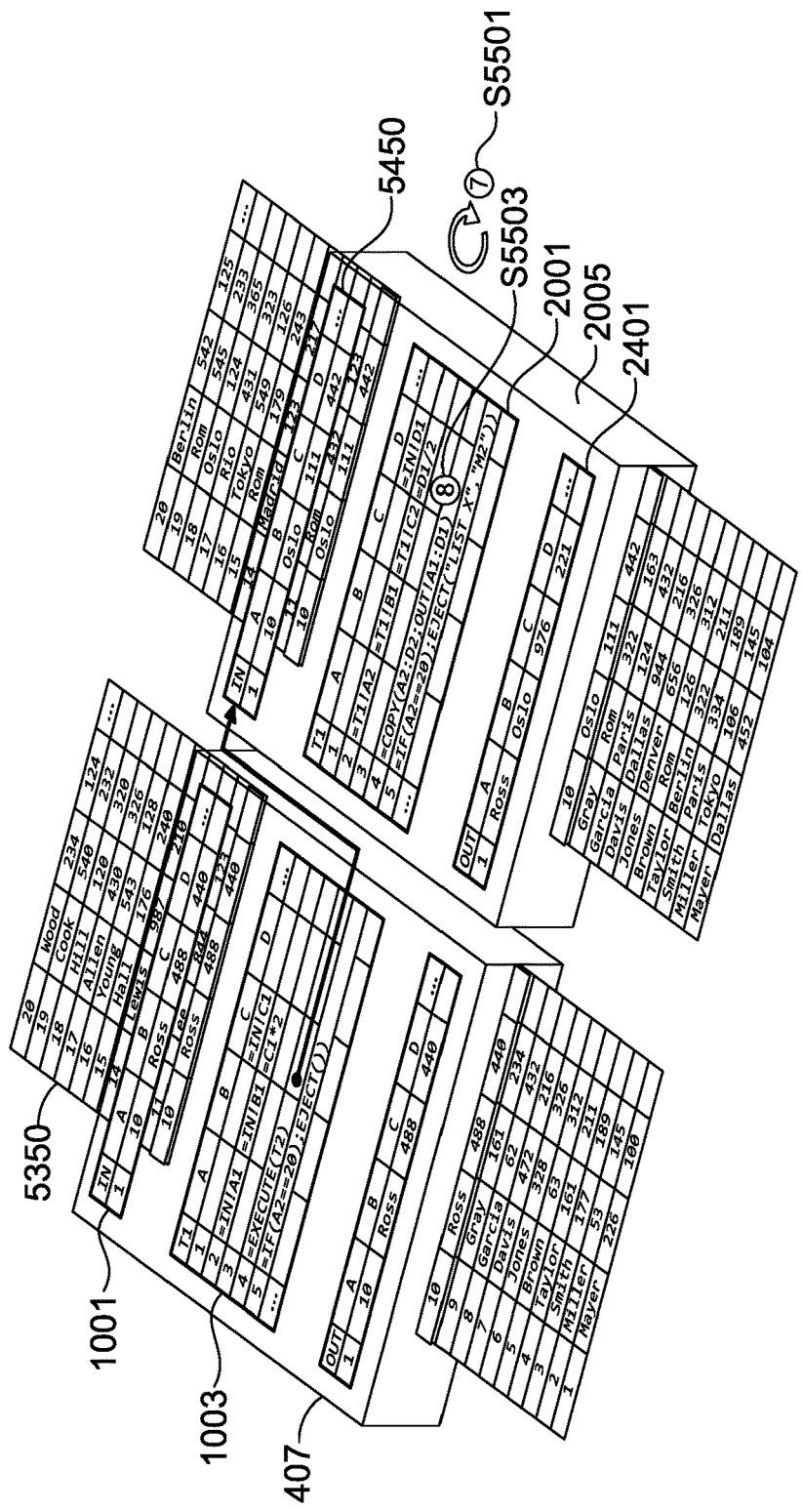
FIG. 55 continues the fourth example of interactively performing operations on tabular data.

FIG. 55 shows further steps carried out according to the example. At step S5501, the operations array 2001 is re-calculated. Steps S5404, S5405, and S5501 may be triggered by the execute function executed in step S5402. At step S5503, a copy function in the operations array 2001 causes the second row of the operations array 2001 to be copied to the output array 2401.

Figure 56:
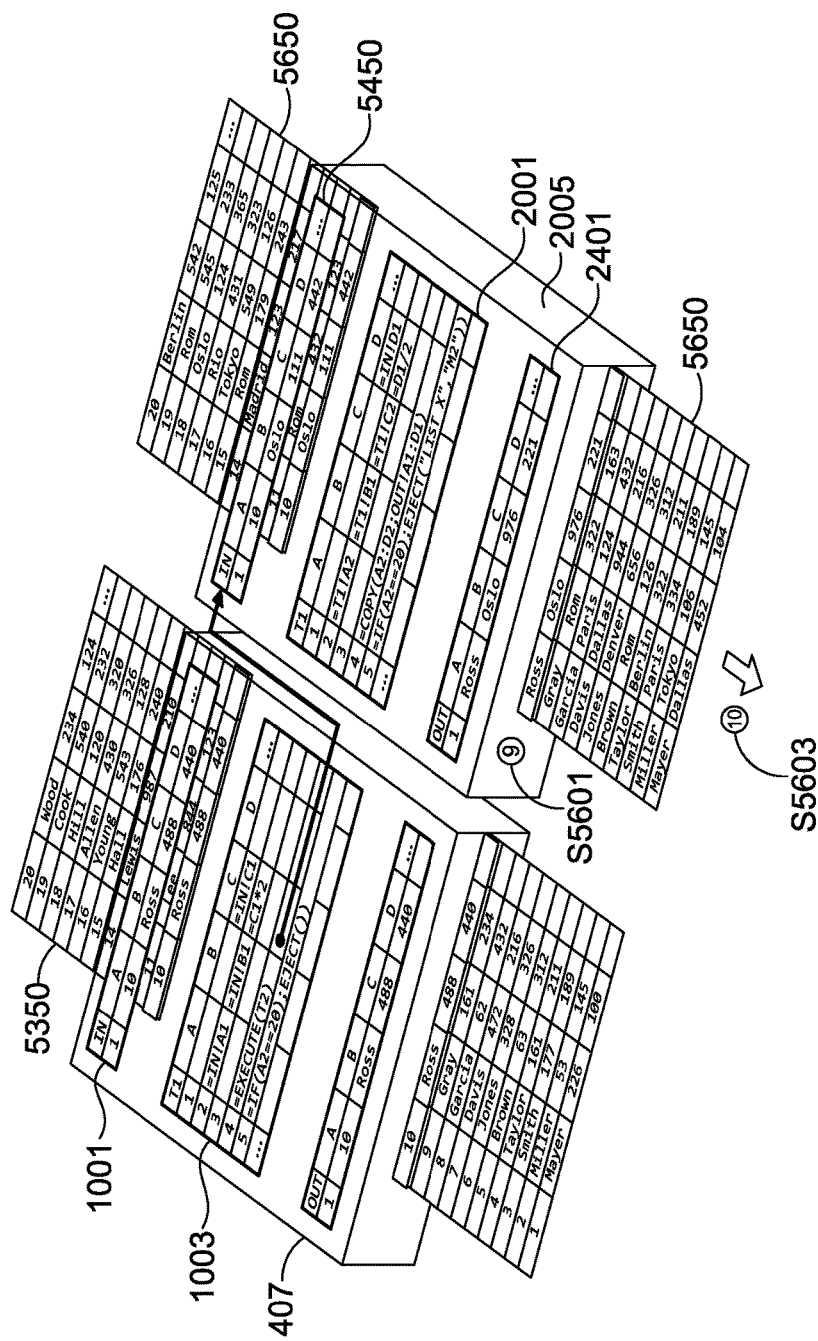
FIG. 56 shows final steps of the fourth example of interactively performing operations on tabular data.

FIG. 56 shows the final steps according to the example. At step S5601, the output array 2401 is copied to a list 5650. At step S5603, processing of data continues. When the IF condition in the transactor 407 evaluates to TRUE the list 5350 is ejected from the transactor 407. When the IF condition in the operations array 2001 evaluates to TRUE, the list 5650 currently being processed by the transactor 2005 is ejected. The list 5650 is then sent to an output destination. Accordingly, copying the output array 2401 to the output destination may include copying the output array 2401 to the list 5650 and then sending the list 5650 to the output destination.

Ejection of a list from a transactor means that processing on that list by the transactor ceases. The transactor may process another list or may stop processing altogether.

Alternatively, the stop function may be used to stop processing by the transactor. The stop function may cause processing of a transactor to stop and may cause event data being processed by the transactor to be ejected. In particular, the stop function may cause processing of an object (e.g., a JSON object) to be stopped and cause the object to be ejected from the transactor.

FIGS. 57 to 63 show a device (e.g., a smart kitchen device) that can be configured by means of serialized event data. In particular, FIGS. 57 to 63 show a system to automatically create a grocery shopping list for grocery orders based on consumption monitored via radio frequency identification (RFID) at smart kitchen devices.

Other practical implementations of the method for configuring or controlling a device are also possible. For example, another possible implementation involves an automated system for grocery stores or retailers with a frequently changing range of products. The system may read order lists sent from consumers (generated by machines implementing the method for interactively performing operations on tabular data) and automatically send the order lists to a number of machines in a warehouse that each run the method for configuring or controlling a device. The machines may act as automated order selection systems to perform tasks (i.e., order items) based on the event data in the lists.

Another possible scenario involves a manufacturing plant with frequent product changes. In particular, the devices in the manufacturing plant must be frequently reconfigured to produce various products. The production devices in the plant process orders to produce a quantity of goods and simultaneously use machines for interactively performing operations on tabular data to order new material that is needed by devices in the plant.

Figure 57:
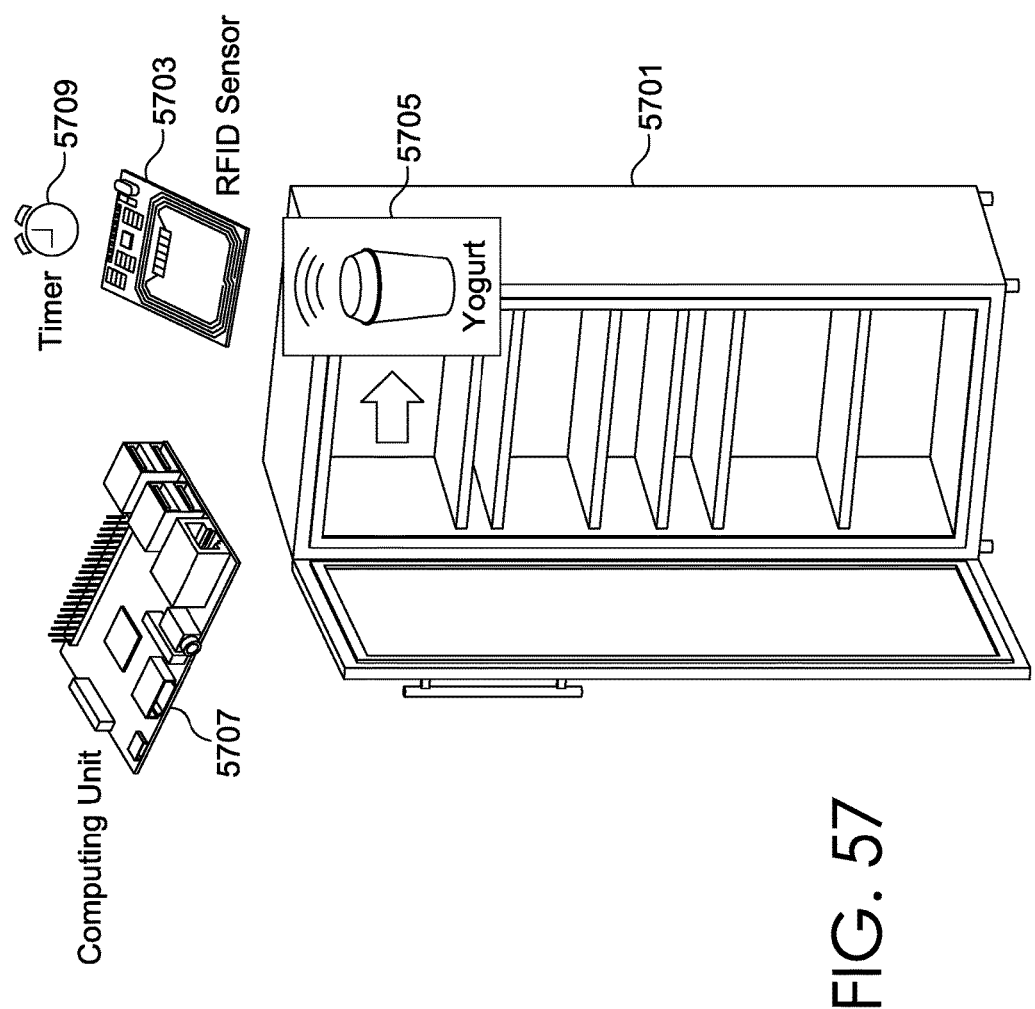
FIG. 57 shows physical components of a fifth example of interactively performing operations on tabular data.

FIG. 57 shows a device that may be configured or controlled according to embodiments disclosed in the application. FIG. 57 also shows a method for configuring or controlling the device.

According to the depicted example, the device is configured to automatically create a list or grocery orders based on consumption monitored via RFID at the device. Other technologies for monitoring consumption at the device are also possible.

According to the example, a refrigerator 5701 is provided as the device. Other examples of smart kitchen devices that can be configured or controlled according to embodiments are a cupboard and a freezer.

The refrigerator 5701 may be equipped with a sensor 5703 that detects near field movement of RFID equipped groceries. In particular, the refrigerator 5701 may be able to sense when RFID tagged items are put into or taken out of the refrigerator 5701. This may be accomplished via the sensor 5703. The sensor 5703 may be implemented as an RFID sensor. A container of yogurt 5705 is shown as an example of an RFID-tagged grocery item that can be detected when it is placed inside or taken out of the refrigerator 5701.

The refrigerator 5701 may include a computing unit 5707. The computing unit 5707 may be capable of processing information from the sensor 5703. In particular, the computing unit 5707 may be capable of generating serialized event data when the sensor 5703 detects an event, e.g., the yogurt 5705 (or another grocery item) is taken out of or placed inside of the refrigerator 5701.

The refrigerator 5701 may also include a timer 5709 (e.g., a system clock). The timer 5709 may be used to trigger time-based actions. Accordingly, serialized event data operated on according to the method for controlling or configuring a device may have been generated in response to events detected by the refrigerator 5701 (more particularly by the sensor 5703), or a similar device.

Since grocery orders differ for every household, it would be impossible for standard software to provide all possible variations even when offering a wide variety of customization parameters. Accordingly, it may be advantageous to enable a user to provide input into an operations array, where the input may include references and calculations that can affect operations performed on the serialized event data received from the refrigerator 5701 or more particularly from the computing unit 5703.

In particular, the input may include an expression to identify at least one element of the event data. For example, the identified element of the event data may include a time specified by the timer 5709.

Figure 58:
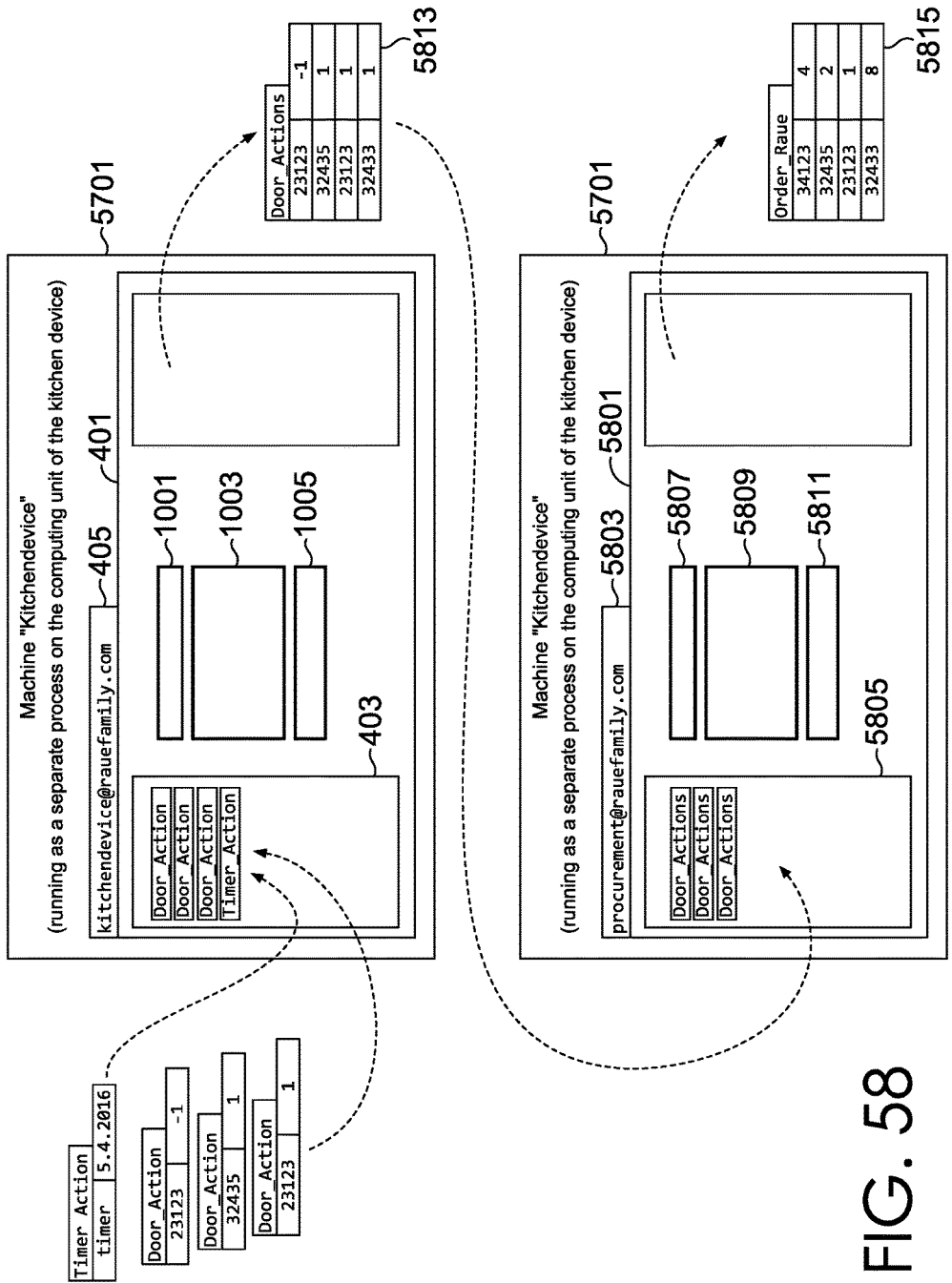
FIG. 58 provides a process description of a primary kitchen device according to the fifth example.

FIG. 58 shows an example of configuring or controlling a device. In the context of FIG. 58, operations are interactively performed on tabular data in the context of the components shown in FIG. 57. However, other forms of serialized event data (e.g., JSON data) could also be operated on.

The device may be implemented as the refrigerator 5701 or as a generic kitchen device as shown in FIG. 58. The refrigerator 5701 is an example of a primary kitchen device. The primary kitchen device may perform procurement, i.e., organize the ordering of items, for other devices in the kitchen. The primary kitchen device 5701 may also organize procurement for other RFID-equipped entities, such as a kitchen cabinet or a pantry. These other RFID-equipped entities may also be equipped with electronics corresponding to the computing unit 5707, the sensor 5703, and the timer 5709 as shown in FIG. 57. Accordingly, there may be a number of RFID-equipped devices that can be configured or controlled according to the described embodiments, e.g., devices that are equipped to perform operations on tabular data, generate events, and trigger the procurement of items by the primary kitchen device.

Accordingly, the sensor 5703 may detect that an RFID-equipped grocery item, such as the yogurt 5705, has been added to the refrigerator 5701. In particular, the sensor 5703 may detect that the yogurt 5705 has passed through the door of the refrigerator 5701. The sensor 5703 may read the identifier of the yogurt 5705 and determine the direction that the yogurt has passed, e.g., into the refrigerator 5701 or out of the refrigerator 5701.

According to the example of FIG. 58, removing the yogurt 5705 from the refrigerator may be represented by a "138 in the event data. Further, adding the yogurt 5705 to the refrigerator 5701 may be represented as "−1" in the event data. The computing unit 5707 is an example of an input source. The computing unit 5707 collects event data for each event. An event may be detected by the sensor 5703 each time an item (e.g., the yogurt 5705) passes into or out of the refrigerator 5701.

Event data produced by the computing unit 5707 may be provided by the computing unit 5707 to the inbox 403 as a list. Each list may be labeled "door_action".

In the context of tabular data, each "door_action" list may contain two cells, the first cell containing the identifier of the item that passed through the door of the refrigerator 5701 and the second cell containing the representation of the direction in which the item passed (i.e. "−1" for going into the refrigerator 5701 and "1" for going out of the refrigerator 5701). The door actions may be combined in a list 5813.

In the context of (name,value) pairs, each door action may include an identifier and a representation of the direction in which the item passed (i.e. "−1" for going into the refrigerator 5701 and "1" for going out of the refrigerator 5701). For example, the list 5813 may be represented as a set of objects: {"identifier":23123,"direction":−1}, {"identifier": 32435,"direction":1}, {"identifier":23123,"direction":1}, {"identifier":23123,"direction":1}, {"identifier":32433,"direction": 1}. Each object may be serialized event data generated in response to an event (e.g., an item passing through the door of the refrigerator). An element of one of the objects may be identified via an expression, e.g., a reference to the name of the (name,value) pair. The element indicates a state of the refrigerator 5701 in the sense that the content of the refrigerator 5701 has changed (the contents have increased or decreased by one item).

In the example of FIG. 58, the machine 401 and a machine 5801 run as separate processors on the computing unit 5707.

The machine 5801 may also include an inbox 5805, and a transactor. The transactor includes an operations array 5809. The transactor may include an input array 5807 and an output array 5811. The machine 5801 is identified via a machine name 5803.

Accordingly, a stop function or an eject function in the operations array 1003 can be used to send the list of door actions 5813 from the machine 401 to the machine 5801. Upon receipt of the door actions at machine 5801, the door actions are placed in the inbox 5805. The transactor of the machine 5801 may perform operations on the list of door actions 5810 in order to produce a list of order actions 5815.

Figure 59:
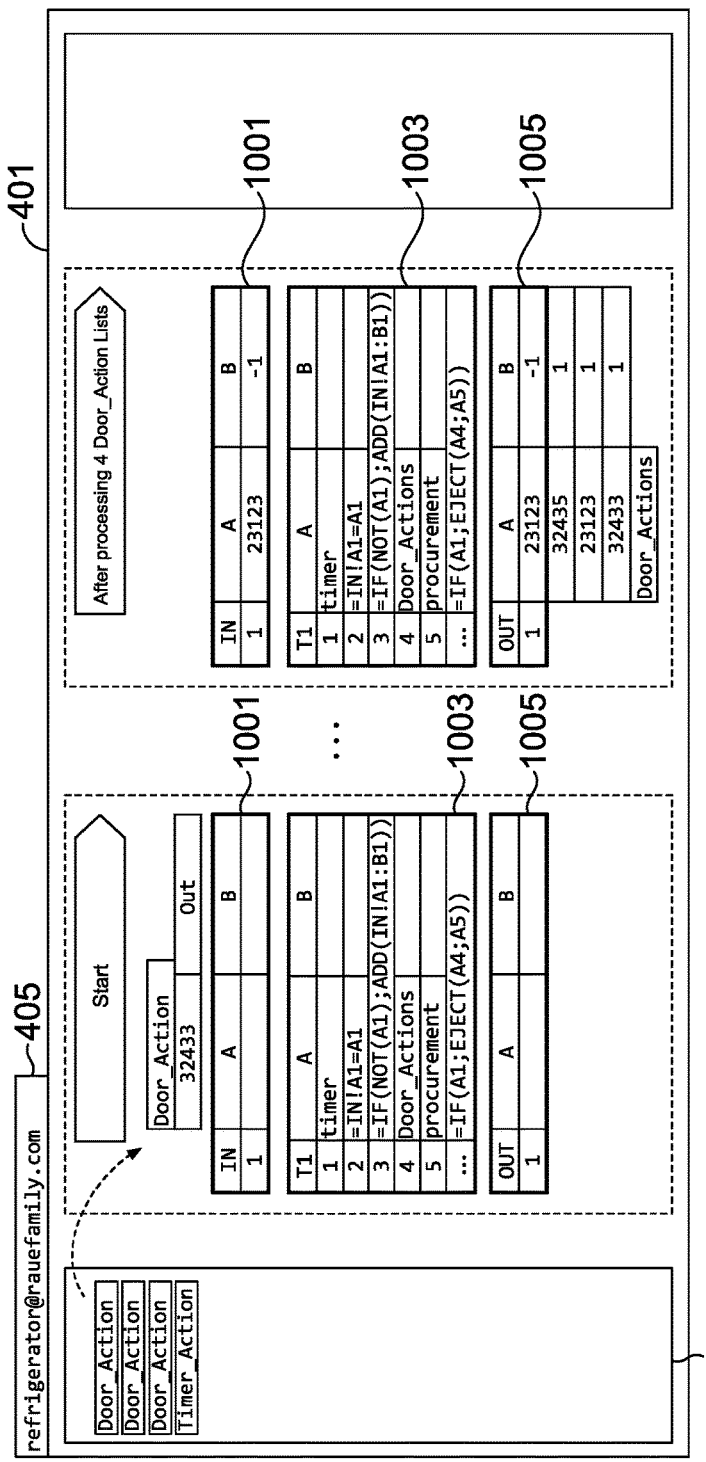
FIG. 59 shows processing of door action lists by the primary kitchen device according to the fifth example.

FIG. 59 shows the machine 401 of the refrigerator 5701 in more detail according to one example. The machine 401 may be implemented as a process on the refrigerator 5701. The operations array 1003 includes received input (e.g., a reference to a cell of the input array 1001) used to control the performance of operations on the event data produced in response to events detected by the refrigerator 5701. Each event may have been detected (e.g., by the sensor 5703) when an item passed through the door of the refrigerator 5701. Accordingly, FIG. 59 shows the processing of door actions by the machine 401 of the refrigerator 5701.

Figure 60:
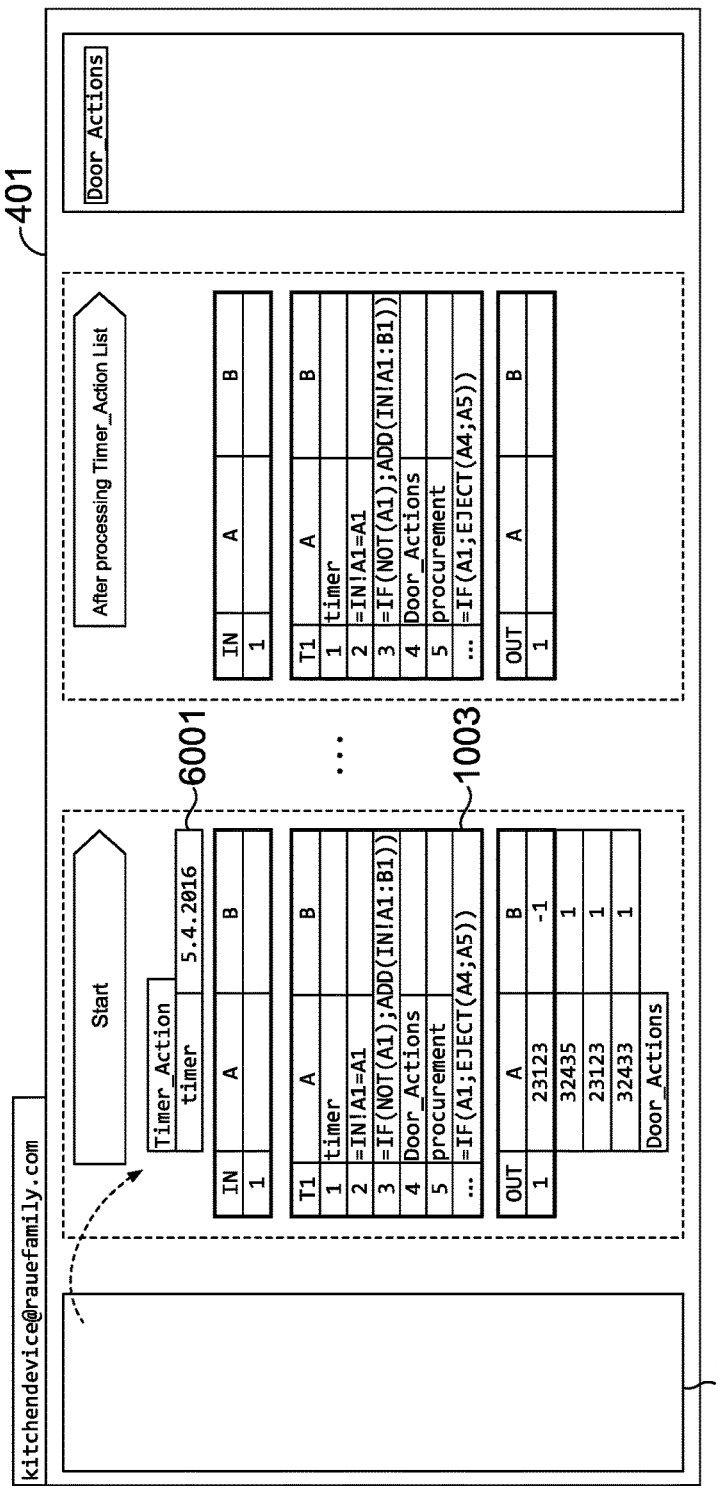
FIG. 60 shows processing of a timer action list by the primary kitchen device according to the fifth example.

FIG. 60 depicts processing of a "timer action" list by the machine 401 of the refrigerator 5701. According to the example, at a pre-determined time (e.g., at 3 am) the computing unit 5707 may send a timer action list 6001 to the machine 401. The timer action list 6001 may include a first cell with the string "timer" and a second cell with a date. The timer action list 6001 may be used to trigger a procurement action. In particular, the timer action list 6001 may cause an IF condition in the operations array 1003 to evaluate to TRUE. Accordingly, the list of door actions being processed in the machine 401 may be ejected and may be sent to the procurement machine 5801 so that an order for items can be generated. The order for items may be implemented as the order list 5815.

Figure 61:
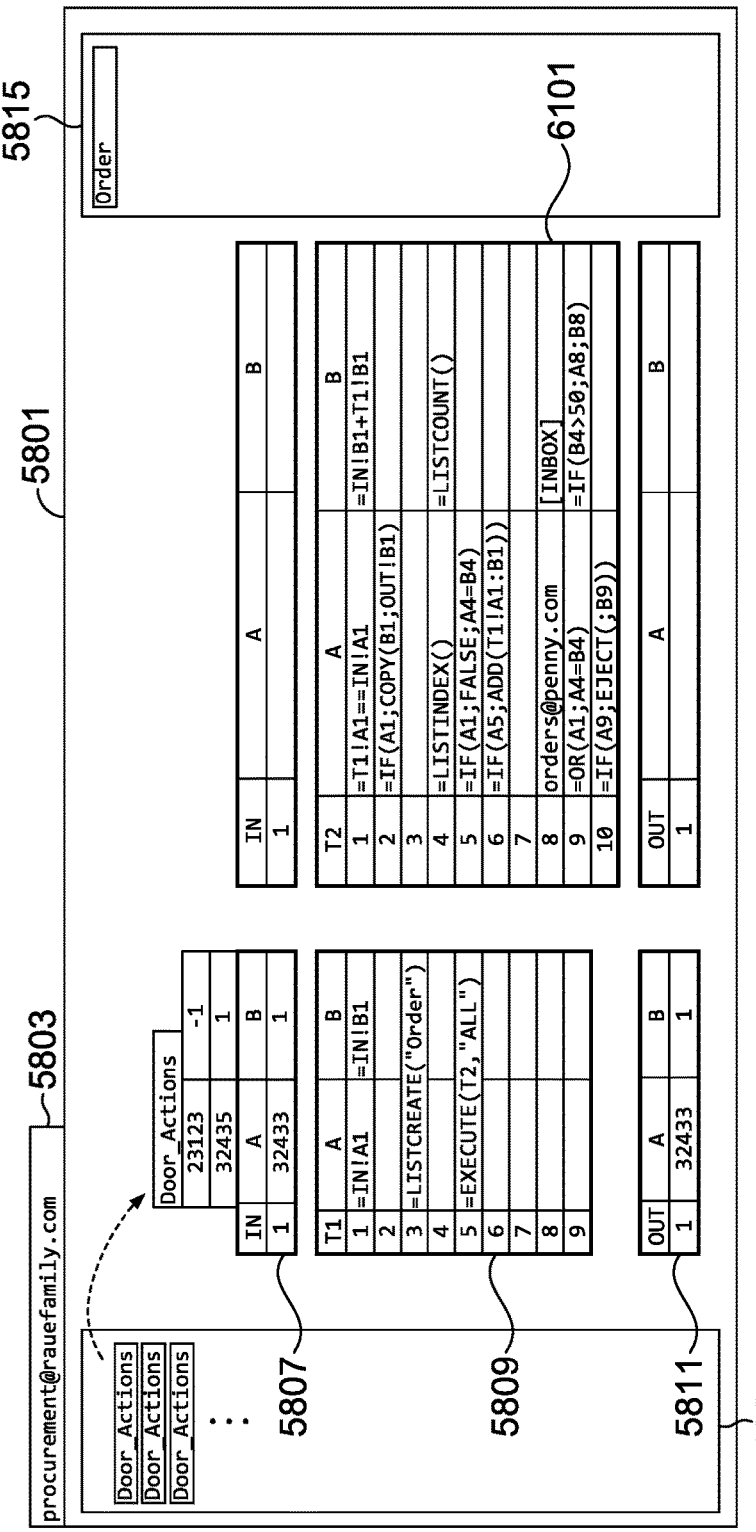
FIG. 61 shows processing of door action lists by a procurement machine according to the fifth example.

FIG. 61 shows the procurement machine 5801 in more detail.

The procurement machine may be configured to accumulate incoming door actions from the refrigerator 5701 and other kitchen devices in order to create the order list 5815. The procurement machine 5801 may include two transactors.

The "listcreate" function called from the operations array 5809 may include a first argument specifying the name of a list. When the listcreate function is executed in the operations array 5809, the function checks whether a list with the name provided as an argument exists in the inbox 403. If such a list does not exist, the listcreate function creates an empty list with the name provided as an argument. If a list already exists with the list name provided as an argument to the listcreate function, the listcreate function does nothing.

Row 4 of the operations array 6101 includes a listindex function and a listcount function. The listindex function may be called without an argument. When the listindex function is executed in the operations array 6101, the function returns the index of the row of the list that is currently being processed in the operations array 6101. If there is no list being processed by the operations array 6101, then the listindex function returns −1. The listcount function may also be called with no argument. When the listcount function is executed in the operations array 6101, the function returns the number of elements in the current list that is being processed by the transactor of the operations array 6101. If there is no list in the current transactor, the listcount function returns −1.

In particular, the procurement machine 5801 may receive serialized event data generated by the refrigerator 5701. When event data corresponding to a specified number of events has been received (e.g., at least 10 events) and a determination is made that there is no indication of an error, it may be determined whether the state of the refrigerator 5701 is a specified state. In this case, the specified state is a condition of the contents of the refrigerator. For example, if the refrigerator 5701 only contains a specified number of items (e.g., less than 10) or a specified number of a particular item (e.g., less than two cartons of milk), the state of the refrigerator 5701 is the specified state.

The error may relate to setting the specified state. For example, it may be desirable to order more milk when there is less than three cartons of milk in the refrigerator 5701, rather than when there is less than two cartons of milk in the refrigerator 5701.

If the state of the device (e.g., the refrigerator 5701) is the specified state, then the device may perform a task. In this case, the task may be sending an order list (e.g., the order list 5815) to a printer 6301. The error may also relate to the task. For example, instead of sending the order list to the printer 6301, it may be desirable to email the order list to a machine.

Figure 63:
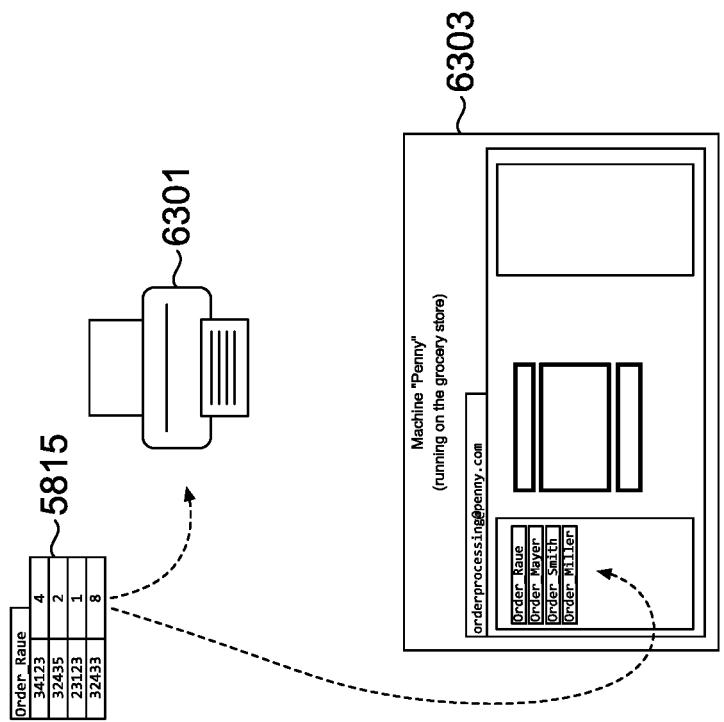
FIG. 63 shows order handling according to the fifth example.

More particularly, an operations array 6101 of the second transactor may be configured to send the order list 5815 to a printer 6301 (as shown in FIG. 63). The printer 6301 may be considered an output destination. The order list 5815 may be sent to the printer 6301 when the size of the order list 5815 exceeds a pre-determined number of rows. In the example of FIG. 61, the predetermined number of rows is 50. Accordingly, if more than 50 entries are on the order list 5815, the order list 5815 may be ejected and sent to a machine having the name "orders@penny.com". Otherwise the order list 5815 is sent back to the inbox 403. The inbox 403 in the procurement machine 5801 may have the same functionality as the inbox 403 in the machine 407.

In addition or alternatively, the order list may be sent directly to a different output destination (e.g., a grocery store) for further processing.

Figure 62:
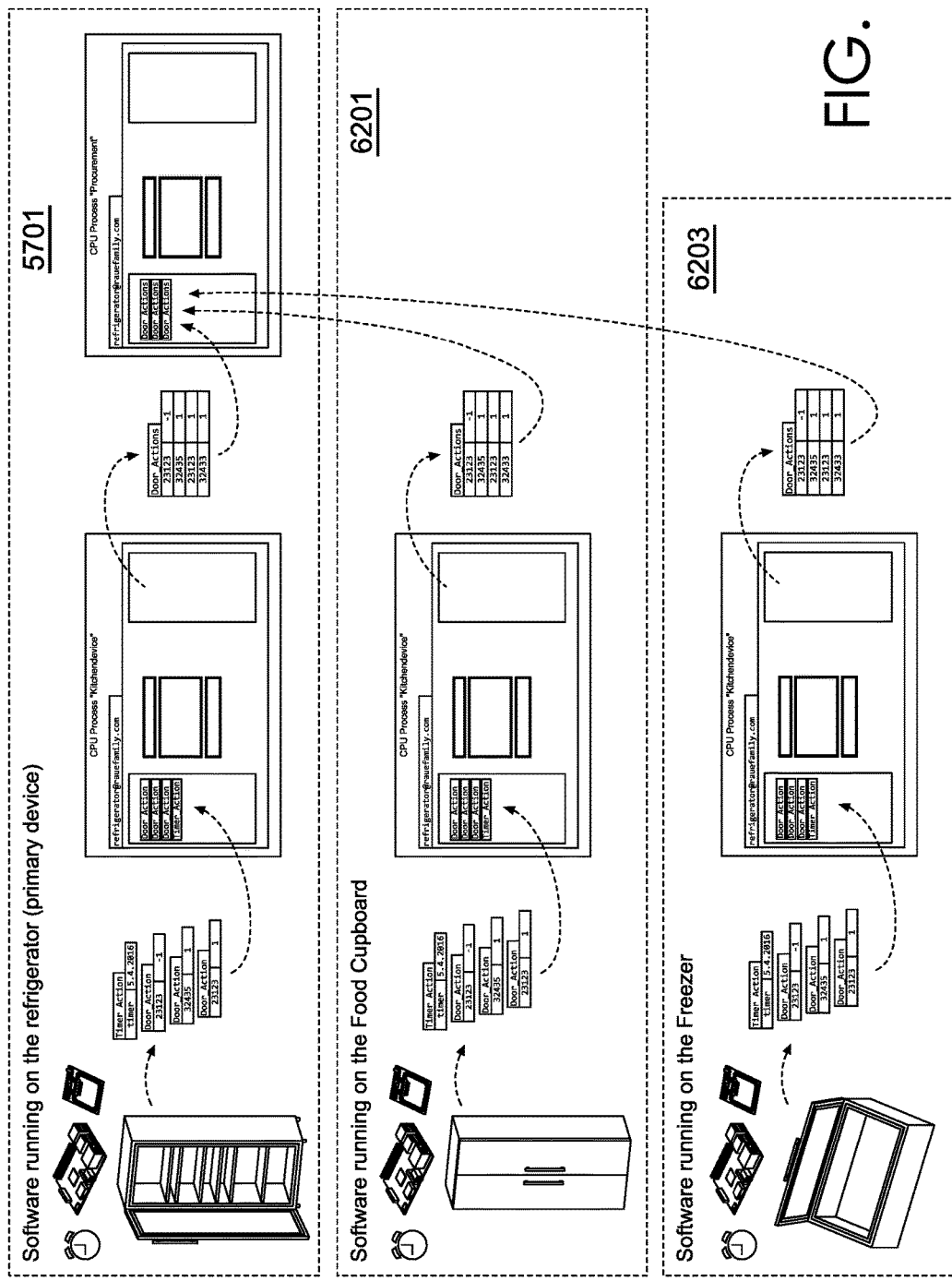
FIG. 62 shows processing carried out by multiple kitchen devices according to the fifth example.

FIG. 62 shows interaction between a primary kitchen device and other kitchen devices. According to the specific example, the primary kitchen device is implemented as the refrigerator 5701. Other devices connected to the refrigerator 5701 may include a kitchen cabinet 6201 and a freezer 6203. The other kitchen devices 6201 and 6203 may function similarly to the refrigerator 5701. The devices 6201 and 6203 may each include a machine similar to the machine 401 of the refrigerator 5701. However, according to the example, the devices 6201 and 6203 do not include procurement machines corresponding to the procurement machine 5801 of the refrigerator 5701. Instead, the devices 6201 and 6203 are configured to send their door action lists to the procurement machine 5801 of the refrigerator 5701. These door action lists are processed by the procurement machine 5801 similar to the way the procurement machine 5801 handles door action lists from the machine 401 of the refrigerator 5701.

FIG. 63 shows the order list 5815 being sent to the printer 6301 or a machine 6303 of the grocery store for further processing.

The example discussed above in the context of FIGS. 57 to 63 may be expanded. In particular, there may be multiple suppliers or various items. Accordingly, the procurement machine 5801 may be configured to send lists to different places depending on various conditions. In addition, the procurement machine 5801 may be configured to release orders for items only when certain quantities of the items are reached. This may allow a household to take advantage of discounts for larger quantities of items. This system could also be configured to receive special deals via the inbox and condition the distribution of orders according to the special deals. Other rules may also be configured. In particular, a user may provide input to configure the procurement machine such that milk is not ordered on Tuesdays except when it is May or October. Virtually any type of ordering can be carried out.

Conventionally, in order to provide a solution to the problem solved via the example of FIGS. 57 to 63, a database in conjunction with a procedural programming language would be provided. This would require at least the following resources: a database, e.g., an SQL database, a collection of custom software modules programmed in a procedural language (e.g., Java, C++, Basic), an application server to host the software module, a development environment integrated with a debugging environment, a programming resource capable of modeling and altering database designs, and a programming resource capable of writing and testing procedural software code.

Accordingly, the conventional implementation would require significant computing power and significant skilled programming resources. In other words, the conventional solution would be more expensive in terms of required equipment and training.

FIG. 64 shows settings to control operations of the transactor. The settings window is an alternative to the window discussed in connection with FIG. 12.

A data source 6401 (i.e., input source) may be specified. The data source 6401 may be a machine, such as a device, or a queue. The queue may be a memory that stores event data, and outputs the stored event data in a First-In First-Out (FIFO) manner. When a NoSQL database (e.g., MongoDB) is selected as the data source 6401, then Database Query fields, e.g., "Collection" and "JSON Filter", may also be accessed. Event data may be received from the data source 6401.

A trigger 6403 specifies conditions for processing event data. For example, event data received from the queue may be copied to the inbox and processed in a FIFO manner. Other processing options include EXECUTE(), Machine Start, Machine Stop, Time, and Random Time.

Processing options 6405 include an enable loop field. Cell references may be specified to control which cells in the operations array 1003 are processed.

A repeat re-calculation until STOP() option enables the operations array 1003 (or portions thereof) to be recalculated until a STOP() function is reached.

FIG. 65 shows the exemplary object of FIG. 1 in an easily readable display form. A metadata field 6501 includes all metadata for the object. Individual metadata elements (e.g., ID) are specified below the metadata field 6501. A data field 6503 includes all data for the object. Individual data elements (e.g., CustomerName) are specified below the data field 6503. The positions element includes an array of position objects (e.g., position 0, position 1, etc.) each including further elements. "PosNo" refers to position number.

Figure 66:
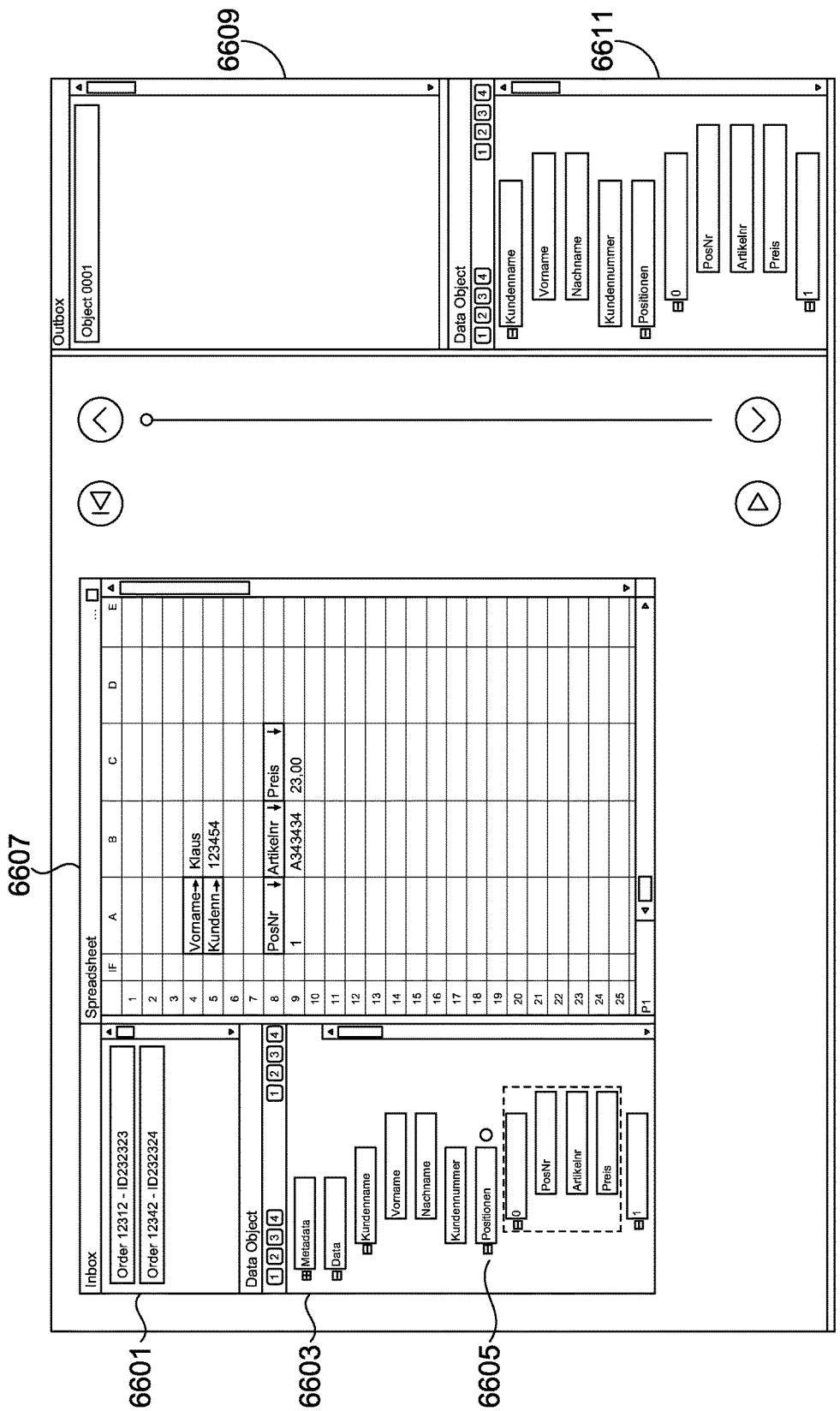
FIG. 66 shows a user interface for configuring or controlling a device.

FIG. 66 shows a user interface for configuring or controlling the device 5701. Serialized event data may be received in an inbox 6601. The event data in the inbox 6601 may be expanded into to show details of an object in an object window 6603. An array within the event data (e.g., the positions array) can be identified as a loop element 6605, e.g., to repeatedly perform operations on elements of the array. An operations array 6609 may function similarly to the operations array 1003.

After processing, an object may be copied to an outbox 6607. The outbox 6607 may be a temporary storage location where the object may be stored until the object is sent to an output destination. The outbox 6607 may include "Object 0001" discussed above. A further window 6611 may be provided to display details of the object in the outbox 6607.

What is claimed is:

1. A computer-implemented method for configuring or controlling a device, the method comprising:
   detecting, by the device, an event;
   generating serialized event data in response to the event;
   receiving the event data from the device;
   identifying, via an expression, at least one element of the event data, wherein the at least one element indicates a state of the device;
   performing at least one operation on the at least one element of the event data, wherein the at least one operation includes determining the state of the device;

displaying a result of the at least one operation;
determining whether an indication of an error in the result is received; and
when a determination is made that there is no error and the result indicates that the state of the device is a specified state, performing, by the device, a task, wherein the specified state is one or more of the following:
an occurrence of a specified time;
a condition of contents of the device;
a condition of an environment of the device; or
use of a specified amount of energy by the device.

2. The computer-implemented method of claim 1, further comprising supplementing the event data with metadata, wherein determining whether an indication of an error in the result is received further comprises determining whether the metadata indicates an error.

3. The computer-implemented method of claim 2, wherein determining whether the metadata indicates an error comprises:
comparing an identifier in the metadata with an identifier of a previously received element of event data; and/or
determining whether at least one messaging protocol used by the device has been used to send any event data received from the device during a specified period.

4. The computer-implemented method of claim 1, wherein the event is one or more of the following:
a change of the environment of the device, particularly an external temperature of the device, the surroundings of the device, or a location of the device, more particularly, detection of a type of item on the device;
a change of an operational state of the device, wherein the operational state may indicate whether the device is fully functional or an extent of partial functionality;
an indication of the passing of a period of time;
a change in the contents of the device;
a change of energy use of the device, wherein the change of energy use is characterized by increased energy use, use of a specified amount of energy independently of the passage of time or use of a specified amount of energy within a specified period of time; or
a request received from a virtual assistant, wherein the virtual assistant is Siri, Google Assistant, or Amazon Alexa.

5. The computer-implemented method of claim 1, wherein the at least one operation is specified within an array, and wherein an operation for at least one other device may be specified within the array.

6. The computer-implemented method of claim 1, wherein the device is one of a group of devices engaged in a manufacturing process, and wherein the devices in the group of devices perform different sets of tasks to further the manufacturing process.

7. The computer-implemented method of claim 1, wherein the task comprises a plurality of manufacturing tasks, wherein the plurality of manufacturing tasks are the same, wherein performing the task comprises sending a message to one of a plurality of nodes according to a distribution mechanism, wherein each one of the plurality of nodes is a device or an array associated with a device, and wherein each array is associated with a different device.

8. The computer-implemented method of claim 7, wherein the distribution mechanism is load balancing or quality-based distribution, wherein the quality-based distribution comprises determining a quality of an output of each device and sending the message according to the quality, and wherein a higher quality is preferred to a lower quality.

9. The computer-implemented method of claim 1, wherein the task includes one of the following:
changing a configuration of the device affecting future operation of the device, particularly energy consumption of the device;
furthering a manufacturing process, particularly by placing an item on one of multiple conveyers and/or sending a message to another device that causes the other device to place the item on the one of multiple conveyers; or
sending a message to another device, particularly via a network and/or by including instructions in the message, particularly by ordering an item.

10. The computer-implemented method of claim 1, wherein the event data is in a human-readable serialization format or the event data is in a binary serialization format.

11. The computer-implemented method of claim 1, wherein determining whether an indication of an error in the result is received comprises receiving user input after displaying the result.

12. The computer-implemented method of claim 11, wherein when the indication of the error in the result is received, the method further comprises:
receiving, via user input, a modification of the at least one operation;
performing the modified at least one operation on the at least one element of the event data;
displaying a result of the modified at least one operation;
determining whether the result of the modified at least one operation indicates an error; and
when no error is indicated and the result indicates that the state of the device is the specified state, performing the task.

13. A device, comprising:
a sensor configured to:
detect an event;
a computing unit configured to:
generate serialized event data in response to the event,
identify, via an expression, at least one element of the event data, wherein the at least one element indicates a state of the device,
perform at least one operation on the at least one element of the event data, wherein the at least one operation includes determining the state of the device,
determine whether an indication of an error in a result of the at least one operation is received, and
when a determination is made that there is no error and the result indicates that the state of the device is a specified state, perform a task; and
a display configured to:
display the result of the at least one operation,
wherein the specified state is one or more of the following:
an occurrence of a specified time;
a condition of contents of the device;
a condition of an environment of the device; or
use of a specified amount of energy by the device.

14. A manufacturing system, comprising:
a control system;
a programmable logic controller;
a gateway for translating messages from the control system to the programmable logic controller;
at least one conveyor; and
at least one industrial robot, wherein the at least one industrial robot is configured to place an item on the conveyor, wherein the conveyor is configured to:
detect placement of the item as an event, and
generate serialized event data in response to the event,
wherein the control system is configured to:
receive the event data from the conveyor,
identify, via an expression, at least one element of the event data, wherein the element indicates a change in the state of the conveyor,
perform at least one operation on the element of event data, wherein the operation includes determining the change in the state of the conveyor,
display a result of the operation,
determine whether an indication of an error in the result is received, and
when a determination is made that there is no error and the result indicates that the state of the conveyor is a specified state, perform a task.

15. A non-transitory computer program product comprising computer-readable instructions, which, when loaded and executed on a computer system, cause the computer system to perform a method comprising:

detecting an event;
generating serialized event data in response to the event;
identifying, via an expression, at least one element of the event data, wherein the at least one element indicates a state of a device;
performing at least one operation on the at least one element of the event data, wherein the at least one operation includes determining the state of the device;
displaying a result of the operation;
determining whether an indication of an error in the result is received; and
when a determination is made that there is no error and the result indicates that the state of the device is a specified state, performing, by the device, a task, wherein the specified state is one or more of the following:
an occurrence of a specified time;
a condition of contents of the device;
a condition of an environment of the device; or
use of a specified amount of energy by the device.

* * * * *